United States Patent
Kawada et al.

(10) Patent No.: US 8,297,142 B2
(45) Date of Patent: Oct. 30, 2012

(54) ACTUATOR

(75) Inventors: Daisaku Kawada, Fujisawa (JP); Koji Hashimoto, Fujisawa (JP); Shingo Saito, Fujisawa (JP); Shinobu Mogi, Fujisawa (JP); Toru Harada, Fujisawa (JP); Manabu Horikoshi, Fujisawa (JP); Tomofumi Yamashita, Fujisawa (JP); Naoya Aoki, Fujisawa (JP); Atsushi Hirabayashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 1107 days.

(21) Appl. No.: 12/052,073

(22) Filed: Mar. 20, 2008

(65) Prior Publication Data
US 2008/0289442 A1 Nov. 27, 2008

(30) Foreign Application Priority Data

Mar. 22, 2007 (JP) ................. 2007-074598
May 17, 2007 (JP) ................. 2007-131817
Nov. 7, 2007 (JP) ................. 2007-289597
Feb. 13, 2008 (JP) ................. 2008-031694
Feb. 20, 2008 (JP) ................. 2008-038833

(51) Int. Cl.
*B60K 17/04* (2006.01)
(52) U.S. Cl. .................. 74/473.12
(58) Field of Classification Search .......... 74/89, 89.23, 74/89.31, 89.37, 473.12, 424.71, 441
See application file for complete search history.

(56) References Cited

U.S. PATENT DOCUMENTS

| 5,306,772 | A | * | 4/1994 | Mimura et al. | 525/92 A |
| 5,916,325 | A | * | 6/1999 | Madrid et al. | 74/89.38 |
| 6,286,380 | B1 | * | 9/2001 | Imao et al. | 74/335 |
| 6,927,513 | B2 | * | 8/2005 | Schreier | 310/75 D |
| 2007/0051847 | A1 | * | 3/2007 | Quitmeyer et al. | 244/99.2 |

FOREIGN PATENT DOCUMENTS

| DE | 102005030052 A1 | * 12/2006 |
| JP | 61-173661 A | 8/1986 |
| JP | 34962 U | 1/1991 |
| JP | 4-283164 A | 10/1992 |
| JP | 7-305753 A | 11/1995 |
| JP | 9-224348 A | 8/1997 |
| JP | 10-201173 A | 7/1998 |
| JP | 2000-116055 A | 4/2000 |
| JP | 2000-201451 A | 7/2000 |
| JP | 2001045708 A | 2/2001 |

(Continued)

OTHER PUBLICATIONS

Communication from the Japanese Patent Office dated Jun. 26, 2012, in a counterpart application No. 2008-038833.

(Continued)

*Primary Examiner* — Vicky Johnson
(74) *Attorney, Agent, or Firm* — Sughrue Mion, PLLC

(57) ABSTRACT

Since centers of a second gear, a fourth gear and a sixth gear coincide with each other and are disposed rotatably round a circumference of the same long shaft, a compact configuration can be realized while using a gear train of five gears to obtain a reduction gear ratio of a high gear ratio. The configuration in which the three gears have the same rotational center shaft in the way described above in an actuator which incorporates a plurality of gears is advantageous in that the number of center shafts is reduced and that the number of supporting holes in a housing which support center shafts is reduced.

16 Claims, 45 Drawing Sheets

FOREIGN PATENT DOCUMENTS

| | | |
|---|---|---|
| JP | 2001124171 A | 5/2001 |
| JP | 2001-280438 A | 10/2001 |
| JP | 2003-207013 A | 7/2003 |
| JP | 2004-249773 A | 9/2004 |
| JP | 2007-097327 A | 4/2007 |

OTHER PUBLICATIONS

Communication from the Japanese Patent Office dated Jul. 18, 2012, in a counterpart application No. 2008-031694.

* cited by examiner

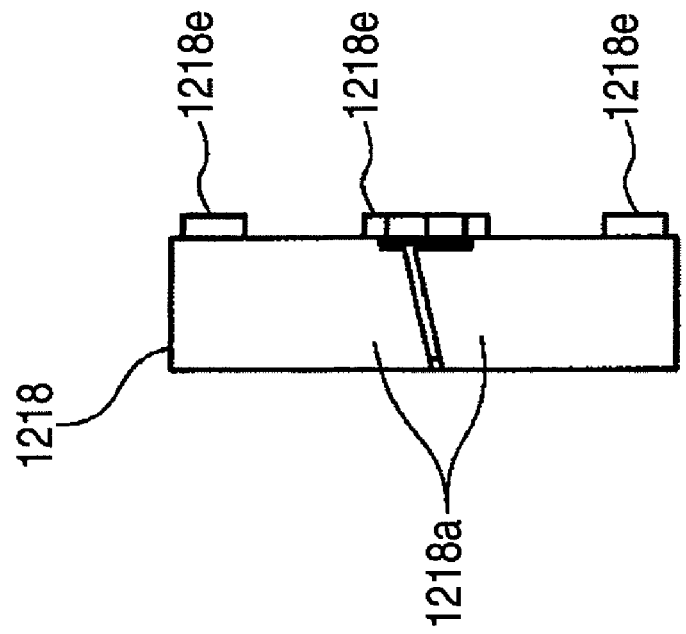
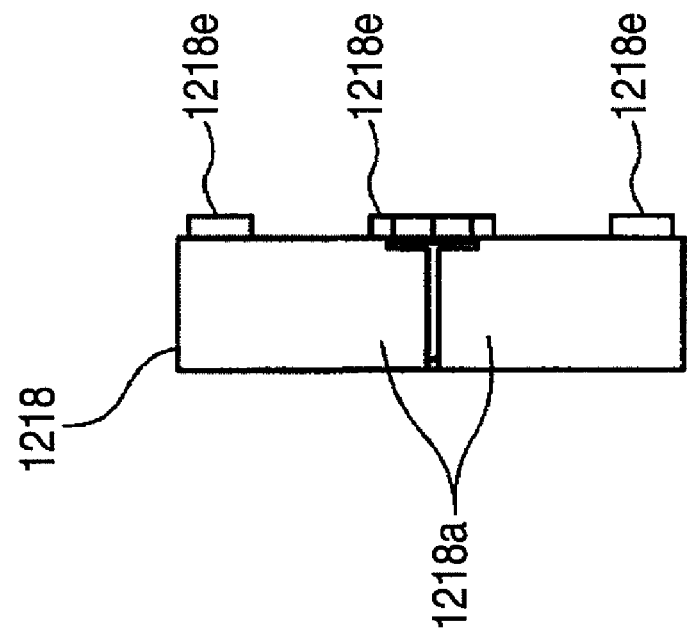

ACTUATOR

BACKGROUND OF THE INVENTION

1. Field of the Invention

The present invention relates to an electric actuator for use in general industrial electric motors, motor vehicles and boats.

2. Description of Related Art

In a relatively small boat in which a propeller is driven by an internal combustion engine, switching between the propeller's forward rotation and reverse rotation is implemented by switching a dog clutch via a wire connected to a lever that is operated by an operator in such a manner as to bring the dog clutch into engagement with a forward gear or a reverse gear. In recent years, however, there have been demands for electric dog clutch switching for the sake of conservation of energy. Here, various types of actuators have been developed for motor vehicle actuators, for example, (refer to Japanese Patent Unexamined Publication JP-A-9-224348), and it is considered that those actuators are used to satisfy the demands.

However, as to actuators for boats, it has to be considered that boats are used in the open sea, and it is desired that boat actuators are developed under a concept which differs from development concepts for general actuators.

For example, in general linear actuators, since they are controlled after an axial displacement is detected in many cases, those linear actuators are used with a limit switch provided in a portion which is displaced in the axial direction. In addition, an electric motor which constitutes a drive source for the actuator is assembled in such a state that the electric motor is exposed on an exterior wall of the housing in many cases.

In the event that a stroke position detection of the linear actuator is attempted to be implemented by a limit switch, however, a forward position and a reverse position of the dog clutch are detected in two positions. In this case, since no intermediate position can be detected, in the event that the dog clutch is stopped between the two positions for some reason, there is caused a problem that the drive circuit cannot determine in which direction the dog clutch is to be shifted.

In addition, in general linear actuators in which electric motors are used as drive sources, in many cases, electric motors are mounted on housings in an exposed fashion for the reason that heat dissipation is promoted. However, the following properties are required for actuators for use in boats.

(1) Water Resistance: In the majority of cases, electric motors, which are electric components, are made inoperable by infiltration of water into the interior thereof. In addition, since it is inevitable that casings of electric motors are made of iron-system metal, there is also caused a problem that the casings are easy to rust. In particular, under an environment in which an electric motor is splashed with sea water, this problem becomes more significant, and a high-function surface treatment needs to be applied to the casing of the electric motor.

(2) Weather Resistance: When used outside, since resin or rubber materials are subjected to attack by sunlight or become open to attack by ozone, functions which can resist the attack are required.

(3) Oil Resistance: When used in the vicinity of an internal combustion engine, since there is a fear that gear oil, anti-corrosion oil or gasoline is scattered, resistances thereagainst are required.

(4) Electromagnetic Wave Resistance Characteristic: When used in a boat equipped with, in particular, a radar system, since there is a fear that the electric motor is exposed to a strong electromagnetic wave environment, a characteristic which can resist thereagainst becomes necessary. An electric motor which meets all the characteristics that have been described heretofore has a problem that the motor is very hard to be mass produced or a production costs thereof becomes very high.

(5) Dust Resistance: When used outside, in the event that foreign matters such as dust infiltrate into the interior of the electric motor, due to the foreign matters being bitten between rolling components such as a ball screw and a bearing and meshing components such as gears, there may be caused a problem that the wear of the components involved is promoted significantly or the operating components are locked.

Furthermore, in an actuator in Japanese Patent Unexamined Publication JP-A-2001-280438, the actuator is coupled to a link member via a supporting hole in a distal end of a cylinder which moves in an axial direction. In this case, a load exerted on the cylinder is not necessarily only an axial load, and in many cases the cylinder is subjected to a radial component of force. In addition, there occurs a state in which all the mass of an actuator main body is exerted on the supporting hole. Although this conventional example relates to the actuator for driving a chair or the like, should the actuator be mounted on an outboard engine of a boat, there may occur a case where vibrations of an internal combustion engine are added directly to the actuator, and since the mass of the actuator main body is exerted in the form of a force amplified by vibration acceleration, producing a more stringent load condition.

In the event that a housing in which gears and the like are housed and a cover member which shields the housing are mounted individually on the body of a boat under this condition, a large magnitude of force is applied to the cover member. In particular, in an actuator which is used in a boat, it is an absolute requirement that infiltration of foreign matters and water into a closed space where the gears or the like are housed should strictly be avoided, and consequently, joining of mating surfaces of the housing and the cover member which define the closed space requires high accuracy and a construction which holds the joining of the mating surfaces. The realization of the construction which takes into consideration even a deformation that is caused by a further external force being exerted on the housing and the cover member that constitute the object construction to which such a high accuracy is given entrains difficulty.

In addition, there are a problem of how to lay out wirings to an electric motor and a problem that when applying a sealing agent to the mating surfaces of the actuator with a view to enhancing the water resistance, the sealing agent cannot be applied with good efficiency.

[Second Problem]

In addition, in an actuator disclosed, for example, in the JP-A-9-224348, a nut is coupled to an output shaft thereof, and this output shaft is positioned radially in place by a support member which is fitted in an inside diameter side of a distal end of a cover which is fitted in a housing. In addition, a seal ring is assembled to the vicinity of the support member for preventing the infiltration of foreign matters.

Here, in the actuator shown in the JP-A-9-224348, the support member of the output shaft is formed into a simple tubular shape having an inside diameter which permits the passage of the output shaft therethrough and an outside diameter which enables the fitting thereof in the cover, and the seal ring is annexed to the support member for the purpose of preventing the infiltration of foreign matters into a threaded portion. However, in general, this seal ring is made of rubber materials represented by a nitrile rubber in many cases. The sealing performance of the output shaft by the seal ring is, however, dependent largely on the elasticity of the rubber material.

In the case of the seal ring whose sealing performance has to be dependent on the elasticity of the rubber material in this way, the center of the seal ring needs to accurately be aligned with the center of the output shaft in order for the seal ring to exhibit its sealing function sufficiently. However, since the seal ring itself has generally no aligning function to align the housing with the output shaft, normally, a support member is provided in the vicinity of the seal ring for guiding the output shaft so as to be made to play a role of aligning the center of the seal with the center of the output shaft. Consequently, highly accurate inside diameter dimension, outside diameter dimension and concentricity of the inside and outside diameters, including a fitting gap between the support member itself and the housing, are required for the support member, causing a problem that the production costs are increased.

Furthermore, in providing the support member that has been described above, it has to be considered that no damage be given to the surface of the output shaft by the support member in guiding the output shaft. The reason for this is obvious; a damage given to the surface of the output shaft can be a direct cause for reduction in sealing performance.

Due to these requirements, many support member materials adopt resin members. In particular, where the surface hardness of the output shaft cannot be increased due to various requirements for the actuator (as one of such requirements, in order to impart an anti-rust capability to the output shaft, an SUS material which is not heat treated has to be used as a material for the output shaft), a resin material is generally used. In addition, since the support member has to fulfill the requirement described above, it is natural that no glass fiber, which acts as a dimension stabilizer, can be mixed in a resin material used. This is because there may be a fear that should they be mixed, glass fibers damage the surface of the output shaft.

In mass production of resin support members under the restriction described above, in general, injection molding is used. Although injection molding is suitable for mass production, in injection molding, there is an inherent problem that a sink mark is produced on the surface an injection-molded resin piece when it is set, and the injection-molded resin piece has to suffer from a problem that its dimensions become unstable.

In many cases actuators are used under a highly humid environment. In particular, in the case of actuators being used in boats, the humidity becomes significantly high in the environment where they are used. Consequently, a particularly high sealing performance is required for actuators for use in boats. On the other hand, as has been described above, the support member which is largely involved in the sealing performance needs to be manufactured from resin. However, it is not always true that any resin materials can satisfy the function, and in particular, nylon-based resin materials have a water absorbing characteristic and hence are difficult to be used for this purpose. This is because a material which absorbs water increases the inside diameter of the support member, which increases, in turn, the gap between the output shaft and the support member, leading to a problem that the sealing performance is eventually affected by the increased gap.

[Third Problem]

In an actuator of Japanese Patent Unexamined Publication JP-A-10-201173, a motor, which is a drive source, is constructed to have a centering location relative to a housing, so as to be positioned relative to the housing so that a flange of the motor is brought into abutment with the housing and is then fixed thereto. This motor is disposed parallel to a threaded member, so as to suppress the overall axial length of the actuator.

In the actuator configured according to the related art, the motor, which is the drive source, is exposed to the outside of the housing. Consequently, the motor can be assembled from the outside of a gearbox. In the case of the actuator itself being used in an environmentally stringent location as in an outboard engine of a boat, the motor is preferably configured to be accommodated within the housing. Here, when the motor is accommodated with the housing, it is considered that a bag-like compartment is provided in part of the housing, so that the motor is assembled into the housing from an opening in the housing.

However, in many cases an outer circumferential frame member which covers the motor is formed of sheet metal by pressing, and in many cases the position of a centering location of the motor which positions a rotational axis of a rotational shaft thereof is restricted to an outside diameter portion lying near where a bearing is disposed within the motor. Furthermore, the centering location is in many cases disposed on an output shaft side of the flange, as a boundary, by which the motor is mounted on the housing. According to this configuration, although the motor has to be mounted in the bag-like compartment of the housing from a rear end side of the rotational shaft, this causes a problem that the centering location cannot be secured in the appropriate position.

On the other hand, in the related art actuator that has been described above, a motor side actuator gear is fitted on a distal end of the motor shaft, and a slider side actuator gear is disposed concentrically with the threaded member. A counter side actuator gear is disposed intermediately between the two gears, and a rotational center thereof is disposed on the housing.

When the motor shaft gear and the threaded member gear are coupled by the intermediate counter side actuator gear, there are encountered restrictions such as: normally, the rotational axis must be disposed in a position where it does not interfere with outside diameters of the motor shaft gear and the threaded member gear; the rotational center must be disposed outside a projected shape of the motor in the axial direction; and the rotational center must be disposed in a position where it does not interfere with a screw shaft supporting bearing. Furthermore, a restriction with respect to gear ratio is also imposed from a problem of an inter-gear shaft distance, leading to a problem that the degree of freedom in design is reduced.

In addition, when the motor is disposed within the closed compartment within the housing, there is caused a problem of how to suppress an increase in temperature due to heat dissipated from the motor.

To deal with this problem, in an actuator of Japanese Patent Unexamined Publication JP-A-4-283164, the increase in temperature due to heat dissipated from the motor is suppressed by introducing cool air via a duct which branches from an air conditioning air supply duct of a vehicle. However, in the case of the actuator for use in the outboard engine of the boat, for example, the air conditioning air supply duct itself does not exist on the boat, and hence, a cooling fan needs to be provided separately, leading to a problem that the production costs are increased or the size is enlarged.

Furthermore, in a general linear actuator which uses an electric motor as a drive source, in many cases the electric motor is mounted on a housing in an exposed fashion for the reason that heat dissipation is promoted. Consequently, heat generated from the electric motor tends to be confined within the housing, and this anticipates troubles that would be caused by the confined heat. In the event that the capacity of the motor is reduced to deal with this, the heating value thereof can be reduced to some extent. However, since an output torque is reduced in accordance with the reduction in the heat value, in order to provide sufficient power, the reduction gear ratio has to be increased, this making difficult the realization of a compact actuator.

SUMMARY OF THE INVENTION

The invention has been made in view of the problems inherent in the related art.

A first object of the invention is to provide an actuator which can be used under a stringent environment while using a general purpose and low cost electric motor therein.

A second object of the invention is to provide an actuator which can exhibit a sealing function while the actuator is provided at low cost.

A third object of the invention is to provide an actuator in which a motor can be mounted with high accuracy while securing the degree of freedom in design and which has a superior cooling performance to enable the utilization in a stringent environment while a general purpose and low cost electric motor is used therein.

With a view to attaining the first object, according to an aspect of the invention, there is provided an actuator for driving a driven member including:

a housing;

an electric motor mounted on the housing and including a rotational shaft;

a driving mechanism which drives the driven member by a rotational force being transmitted thereto from the rotational shaft;

a first power transmission mechanism including a plurality of gears for transmitting the rotational force of the rotational shaft of the electric motor to the driving mechanism;

a sensor which detects a rotational angle of a measuring shaft; and a second power transmission mechanism including a plurality of gears for transmitting the rotational force of the rotational shaft to the measuring shaft of the sensor, wherein a center of at least one or more gears of the first power transmission mechanism coincides with a center of at least one or more gears of the second power transmission mechanism.

With a view to attaining the first object, according to another aspect of the invention, there is provided an actuator for driving a driven member including:

a housing;

an electric motor mounted on the housing and including a rotational shaft;

a driving mechanism which drives the driven member by a rotational force being transmitted thereto from the rotational shaft;

a power transmission mechanism including a plurality of gears for transmitting the rotational force of the rotational shaft of the electric motor to the driving mechanism; and a cover member which is mounted on the housing to shield the power transmission mechanism, wherein a leg portion for fixing the actuator is formed on only the housing.

With a view to attaining the first object, according to a further aspect of the invention, there is provided an actuator for driving a driven member including:

a housing;

an electric motor mounted on the housing and including a rotational shaft;

a driving mechanism which drives the driven member by a rotational force being transmitted thereto from the rotational shaft; and a power transmission mechanism including a plurality of gears for transmitting the rotational force of the rotational shaft of the electric motor to the driving mechanism, wherein the housing is formed from a conductive material, the electric motor is accommodated within the housing; and a wiring connected to the electric motor passes through a breather pipe which establishes a communication between an interior and an exterior of the housing to be connected to an outside circuit.

With a view to attaining the first object, according to an aspect of the invention, there is provided an actuator for driving a driven member including:

a housing;

an electric motor mounted on the housing and including a rotational shaft;

a driving mechanism which drives the driven member by a rotational force being transmitted thereto from the rotational shaft; and a power transmission mechanism including a plurality of gears for transmitting the rotational force of the rotational shaft of the electric motor to the driving mechanism, wherein a recessed portion is formed on the housing for application of a sealing agent.

With a view to attaining the first object, according to another aspect of the invention, the center of at least one or more gears of the first power transmission mechanism coincides with the center of at least one or more gears of the second power transmission mechanism. Consequently, even in the event that a gear train of a plurality of gears is used to obtain a reduction gear ratio of a high gear ratio, the actuator can still be made compact.

The driving mechanism includes a ball screw mechanism having a rotational element which rotates relative to the housing, an axially movable element which is coupled to the driven member, and rolling elements which are disposed between the rotational element and the axially movable element, for transforming a rotational motion of the rotational element into an axial motion of the axially movable element. In this case, since the driving mechanism can be made to operate reversely, the axially movable element side can be moved. Because of this, for example, even in the event that the actuator fails, the driven member side can be moved manually.

Since a large reduction gear ratio can be produced when the second power transmission mechanism includes a gear train of two or more gears, a sensor whose permissible detection range extends round one or less rotation can be used as a sensor which finally assumes a detecting function. In addition, a potentiometer whose permissible detection range extends round one or less revolution has a large cost merit compared with one whose permissible detection range extends round a multiplicity of rotations.

In the event that the sensor is a potentiometer whose measuring shaft has a measurable range of 360 degrees or less, in order to secure a large stroke of the driven member, since the second power transmission mechanism becomes necessary to have a gear train of a multiplicity of gears, the configuration of the invention becomes effective.

In the event that the housing is formed from a conductive material and that the electric motor is accommodated within the housing, the electric motor is shielded to thereby become difficult to be affected by exterior electromagnetic waves.

In the event that the housing is formed from a conductive material and that the sensor is accommodated within the housing, the sensor is shielded to thereby become difficult to be affected by exterior electromagnetic waves.

In the first power transmission mechanism, in the event that a material of one of the gears which mesh with each other is resin while a material of the other gear is metal, not only can the welding of the gears be prevented but also noise can be reduced.

The leg portion for fixing the actuator is formed on only the housing. Consequently, when the housing is mounted on a body, since no useless force is inputted into the cover member from the body in any case, the occurrence of a water leakage between the housing and the cover member is suppressed.

In the event that the cover member is formed from a resin material, preferably, not only can reductions in weight and cost be realized but also the cover member does not rust even in the event that it is exposed to sea water.

According to the aspect of the invention, the housing is formed from a conductive material, the electric motor is accommodated within the housing, and the wiring connected to the electric motor passes through the breather pipe which allows the interior of the housing to communicate with the exterior thereof so as to be connected to the exterior circuit. Thus, a sealing problem can be avoided which would otherwise be caused when the wiring is so provided by passing through other locations than the breather pipe. In addition, the breather pipe means a pipe (including a hose) which allows an interior of the actuator to communicate with the atmosphere.

According to the aspect of the invention, since the recessed portion for application of a sealing agent is formed on the housing, there is provided an advantage that the sealing agent adhering to the recessed portion is made difficult to be removed therefrom.

The driving mechanism can be a ball screw mechanism which includes a rotational element which rotates relative to the housing, an axially movable element which is coupled to the driven member, and rolling elements which are disposed between the rotational element and the axially movable element, transforming a rotational motion of the rotational element into an axial motion of the axially movable element. In this case, since the driving mechanism can be made to operate reversely, the axially movable element side can be moved. Thus, for example, even in the event that the actuator fails, the driven member side can be moved manually.

In the power transmission mechanism, in the event that a material of one of the gears which mesh with each other is resin while a material of the other gear is metal, not only can the welding of the gears be prevented but also noise can be reduced.

The driving mechanism includes a drive shaft which can move relatively to the housing to drive the driven member, and in the event that a seal member disposed between the housing and the drive shaft has a double lip construction, the deterioration of the seal can be suppressed, and the sealing performance can be maintained over a long period of time.

The driving mechanism includes a drive shaft which can move relatively to the housing to drive the driven member, and a main hole for coupling to the driven member and an extra hole which is different from the main hole are formed in the drive shaft. Consequently, in the event that the main hole is worn through coupling to the driven member, the coupling can be implemented by using the extra hole in place of the main hole.

With a view to attaining the second object, according to an aspect of the invention, there is provided an actuator for driving a driving rod including:

a housing;

an electric motor mounted on the housing and including a rotational shaft; and a driving mechanism which drives the driving rod by the rotational force being transmitted thereto from the rotational shaft, wherein the driving mechanism includes:

a rotational element which rotates relative to the housing;

an axially movable element which is coupled to the driving rod; and rolling elements which are disposed between the rotational element and the axially movable element, so as to transform a rotational motion of the rotational element into an axial motion of the axially movable element, wherein the driving rod is slidably supported by an annular support member which fits in an inner circumference of the housing, and wherein the support member is interrupted in part of a circumferential direction.

According to the aspect of the invention, the driving rod is slidably supported by the annular support member which fits in the inner circumference of the housing, and the support member is interrupted in part of the circumferential direction. Consequently, both an outside diameter and an inside diameter of the support member can follow along the inside diameter of the housing which has a relatively large rigidity even though they are made to be values which are particularly determined based on the elastic properties that a material used possesses. Thus, in the event that the inside diameter of the housing is formed with good accuracy, the position of the center of the driving rod which is accommodated in the center of the housing is determined by only a difference in thickness between the outside diameter and the inside diameter when the support member is in a free state. Consequently, when forming the support member, it is sufficient to control only the difference in thickness between the outside diameter and the inside diameter, which is a far easier control than the restraining conditions with respect to the outside diameter, inside diameter and concentricity of both the diameters, and this eventually allows the manufacturing an inexpensive support member. Note that a "temporary outside diameter" means the outside diameter of the support member when it is in the free state, and a "temporary inside diameter" means the inside diameter of the support member when it is in the free state.

In particular, in the event that the support member is manufactured of a resin material formed through injection molding, a further advantage can be expected. More specifically, although in injection molding using a resin material, a drawback is easy to be generated in which the dimensions of an injection molded resin piece become unstable due to a sink mark produced on the surface of the injection molded resin piece when it is set, with the support member according to the aspect of the invention, only the thickness of an injection molded resin piece has to be controlled. Thus, there is provided an advantage that the diameter of an injection molded resin piece does not have to be controlled with good accuracy. Consequently, the support member can be mass produced using injection molding, and the flexibility inherent in the resin material used is allowed to be exhibited more effectively, thereby making it possible to implement the centering of the driving rod with respect to the inside diameter of the housing with good accuracy.

Furthermore, in the event that the support member is injection molded from a material having low water absorption properties, there is no need to take a dimension expansion due to water absorption into consideration. Because of this, an initial gap can be set to a smaller value by ignoring a post expansion of the support member due to water absorption, this eventually contributing to the enhancement of the sealing performance. This is advantageous with actuators for use in boats. Note that as a resin material having low water absorption properties, a polyacetal resin can be raised.

The support member is formed integrally by an outer tubular portion, an inner tubular portion which is surrounded by the outer tubular portion and a central wall portion which couples the outer tubular portion and the inner tubular portion together in a central position therebetween. In the event that the outer tubular portion, the inner tubular portion and the central wall portion are each interrupted in part in the circumferential direction, the effect of a sink mark that would otherwise be generated in the support member when it is cooled after having been injection molded can preferably suppressed.

In the event that an interrupted amount of the outer tubular portion is smaller than an interrupted amount of the inner tubular portion or the central wall portion, the passage of the driving rod into the supporting member is facilitated.

In the event that the inner tubular portion has chamfered portions at end portions on an inner circumferential side, the passage of the driving rod into the support member is facilitated.

In the event that a projection which is brought into engagement with the recessed portion on the housing when the support member is mounted on the housing projects in the axial direction from the support member, the rotation of the support member can be prevented through the engagement of the projection with the recessed portion.

With a view to dealing with the third problem, according to an aspect of the invention, there is provided an actuator for driving a driven member including:

a housing;

an electric motor including a rotational shaft and a frame;

a driving mechanism which drives the driven member by a rotational force being transmitted thereto from the rotational shaft;

a power transmission mechanism including a plurality of gears for transmitting the rotational force of the rotational shaft of the electric motor to the driving mechanism; and a positioning plate which is disposed between a gear mounted on the rotational shaft and the frame of the electric motor, wherein the positioning plate has a hole or a notch which fits on part of the frame and is mounted on the housing.

With a view to dealing with the third problem, according to another aspect of the invention, there is provided an actuator for driving a driven member including:

a housing including a motor compartment;

an electric motor disposed in the motor compartment and including a rotational shaft;

a driving mechanism which driving the driven member by a rotational force being transmitted thereto from the rotational shaft;

a power transmission mechanism including a plurality of gears for transmitting the rotational force of the rotational shaft of the electric motor to the driving mechanism; and a heat conductive member which is disposed in such a manner as to be brought into abutment with an outer circumference of the electric motor and an inner wall of the housing.

With a view to dealing with the third problem, according to a further aspect of the invention, there is provided an actuator for driving a driven member including:

a housing;

an electric motor mounted on the housing and including a rotational shaft;

a driving mechanism which drives the driven member by a rotational force being transmitted thereto from the rotational shaft; and a power transmission mechanism including a plurality of gears for transmitting the rotational force of the rotational shaft of the electric motor to the driving mechanism; wherein the driving mechanism is a ball screw mechanism which includes:

a rotational element which rotates relative to the housing;

an axially movable element which is coupled to the driven member; and rolling elements which are disposed between the rotational element and the axially movable element, wherein the ball screw mechanism transforms a rotational motion of the rotational element into an axial motion of the axially movable element, and wherein a passage is provided whose end portions are made to open, respectively, to a first position which is close to the axially movable element and a second position which is close to the electric motor.

With a view to dealing with the third problem, according to a further aspect of the invention, there is provided an actuator for driving a driven member including:

a housing;

an electric motor mounted on the housing and including a rotational shaft;

a driving mechanism which drives the driven member by a rotational force being transmitted thereto from the rotational shaft; and a power transmission mechanism including a plurality of gears for transmitting the rotational force of the rotational shaft of the electric motor to the driving mechanism; wherein the driving mechanism is a ball screw mechanism which includes:

a rotational element which rotates relative to the housing;

an axially movable element which is coupled to the driven member; and rolling elements which are disposed between the rotational element and the axially movable element, wherein the ball screw mechanism transforms a rotational motion of the rotational element into an axial motion of the axially movable element, and wherein part of the housing has an opening which is made to open towards the outside, so that in response to an axial motion of the axially movable element, a fluid is made to be introduced into or discharged from the housing via the opening.

With a view to dealing with the third problem, according to an aspect of the invention, there is provide an actuator adapted for use in a boat for driving a driven member including:

a housing;

an electric motor mounted on the housing and including a rotational shaft; and a driving mechanism which drives the driven member by the rotational force being transmitted thereto from the rotational shaft, wherein the housing has a cooling construction.

According to the aspect of the invention, the actuator has the positioning plate which is disposed to be positioned between the gear mounted on the rotational shaft and the frame of the electric motor, and the positioning plate has the hole or the notch which fits on part of the frame and is mounted on the housing. Because of this, for example, even when the electric motor is mounted in the back-like motor compartment within the housing by inserting the electric motor from the rear end side (the opposite side to the gear) of the rotational shaft, a centering location can be constructed to be secured by the gear side frame, whereby by positioning the positioning plate with respect to the housing, a correct intershaft distance can be provided by the meshing gears.

Furthermore, according to the aspect of the invention, by bringing the bearing stored within the motor and the centering location of the frame that is provided in the vicinity thereof into fitting contact with the hole in the positioning plate, an effect can be expected which enhances the heat dissipating action by the bearing. In addition, in the event that this positioning plate is formed of a metallic material such as aluminum having high heat conductivity, a higher heat dissipating effect can be expected.

By providing the positioning plate in the way described above, the restrictions that the rotational axis of the intermediate gear which meshes with the gear mounted on the rotational shaft of the electric motor and the gear provided on the driving mechanism must be disposed outside the projected shape of the motor in the axial direction and that the rotational axis must be disposed in the position where it does not interfere with the bearing of the driving mechanism are eliminated, and the restriction with respect to gear ratio from the inter-gear shaft distance problem is solved, whereby the degree of freedom in design is increased.

A shaft which supports at least one of the plurality of gears is preferably disposed on the positioning plate.

Since the heat conductive member is provided which is disposed in such a manner as to be brought into abutment with the outer circumference of the electric motor and the inner wall of the housing, heat generated from the electric motor can be quickly transmitted to the housing. Because of this, since the heat can be dissipated into the air via an outer circumferential surface of the housing, the increase in temperature inside the housing can be suppressed.

Passages whose end portions are opened are provided for a first position which is near the axially movable element and a second position which is near the electric motor. Because of this, air on the side of the second position whose temperature tends to be increased due to being near the electric motor is moved to the side of the first position which is near the axially movable element via the passage, or air on the side of the first position whose temperature tends to be relatively low is moved to the side of the second position, whereby the periphery of the electric motor can be cooled effectively. Consequently, no separate fan is required, and hence, an actuator can be provided which is manufactured at lower costs and is made more compact. Note that the "first position which is near the axially movable element" can be any position which lies at least closer to the axially movable element than the electric motor, and the "second position which is near the electric motor" can be any position which lies at least closer to the electric motor than the axially movable element.

The part of the housing has the opening which is made to open towards the outside, so that in response to an axial motion of the axially movable element, the fluid is made to be introduced into or discharged from the housing via the opening. Because of this, air lying inside the housing and whose temperature is increased is discharged from the housing while outside air whose temperature is relatively low is taken into the housing via the opening in response to reciprocating motions of the axially movable element, whereby the periphery of the electric motor can be cooled. Consequently, no separate fan is required, and hence, an actuator can be provided which is manufactured at lower costs and is made more compact.

Since the housing has the cooling construction, heat generated from the electric motor mounted inside the housing can be transmitted or dissipated to the outside effectively, whereby an electric motor having a large capacity can be used, thereby making it possible to realize a sufficient reduction in power.

The cooling construction is preferably formed on an outer circumference of the housing and is made up of fins each having a block-shaped cross section. However, a water jacket construction may be provided which uses, for example, sea water as cooling water. Note that the cross section of the fin is preferably tapered.

In the event that the cooling construction is formed on an inner circumference of the housing and into a raised portion which contacts the electric motor, since heat generated from the electric motor can be conducted to the housing via the raised portion to thereby be dissipated from the outer circumference of the housing, the cooling effect can be exhibited.

In the event that the electric motor includes an NTC (Negative Temperature Coefficient) thermistor, no separate fan is required, and hence, an actuator can be provided which is manufactured at lower costs and is made more compact.

The driving mechanism can be configured to include a ball screw mechanism which includes a rotational element which rotates relative to the housing, an axially movable element which is coupled to the driven member, and rolling elements which are disposed between the rotational element and the axially movable element, so as to transform a rotational motion of the rotational element into an axial motion of the axially movable element. Because of this, since the driving mechanism can be operated reversely, the axially movable element side can be moved, whereby for example, even in the event that the actuator fails, the driven member side can be moved manually.

BRIEF DESCRIPTION OF THE DRAWINGS

FIG. 26A is a diagram showing an example of an edge shape of an abutment end of an outer tubular portion 1218a.

FIG. 26B is a diagram showing another example of an edge shape of the abutment end of the outer tubular portion 1218a.

DETAILED DESCRIPTION OF THE PREFERRED EMBODIMENTS

First Embodiment

Hereinafter, 1-1$^{st}$ to 1-5$^{th}$ embodiments of the invention will be described based on the drawings.

1-1$^{st}$ Embodiment

Figure 1:
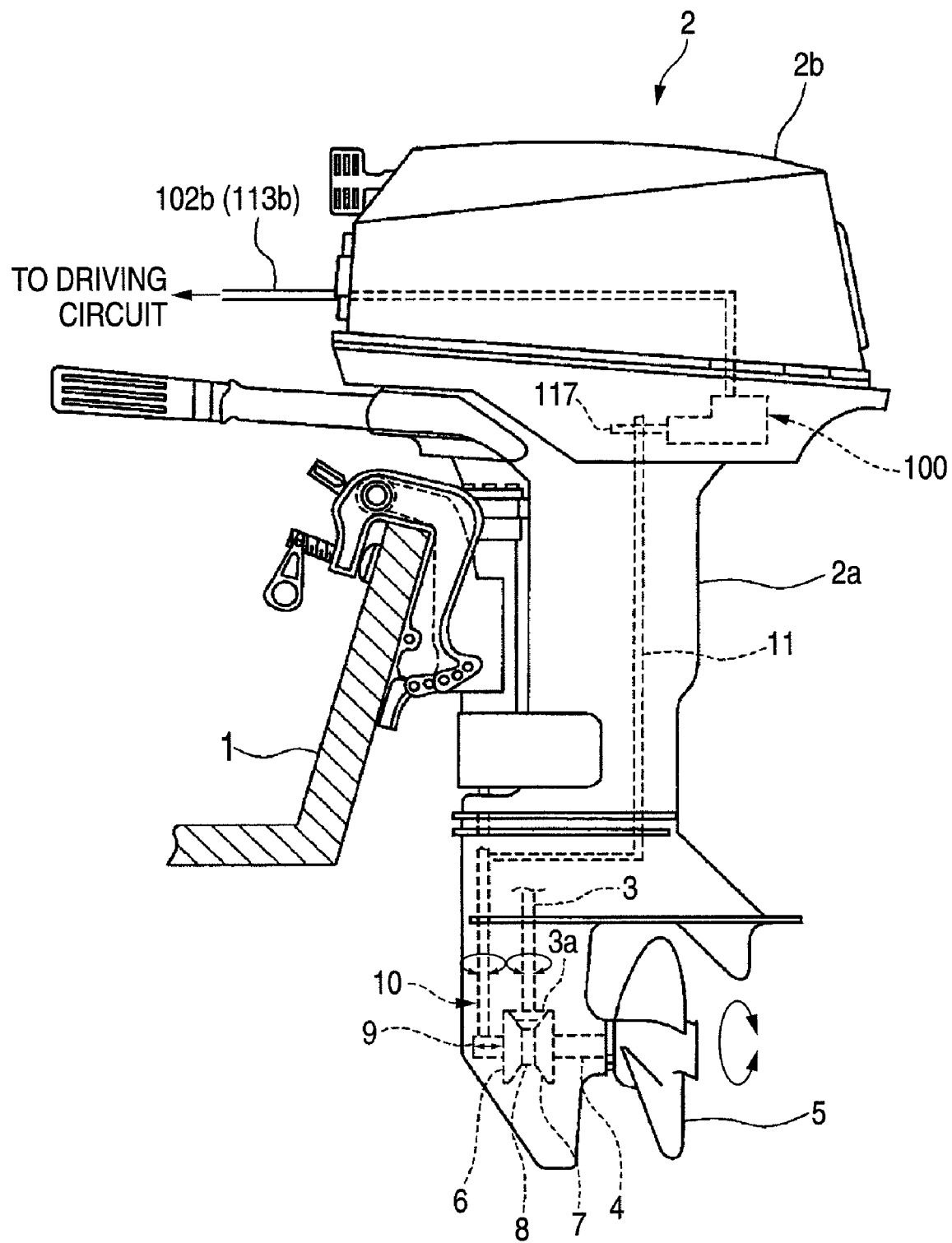
FIG. 1 is a schematic diagram of an outboard engine to which an actuator according to an embodiment of the invention is applied.
Figure 2:
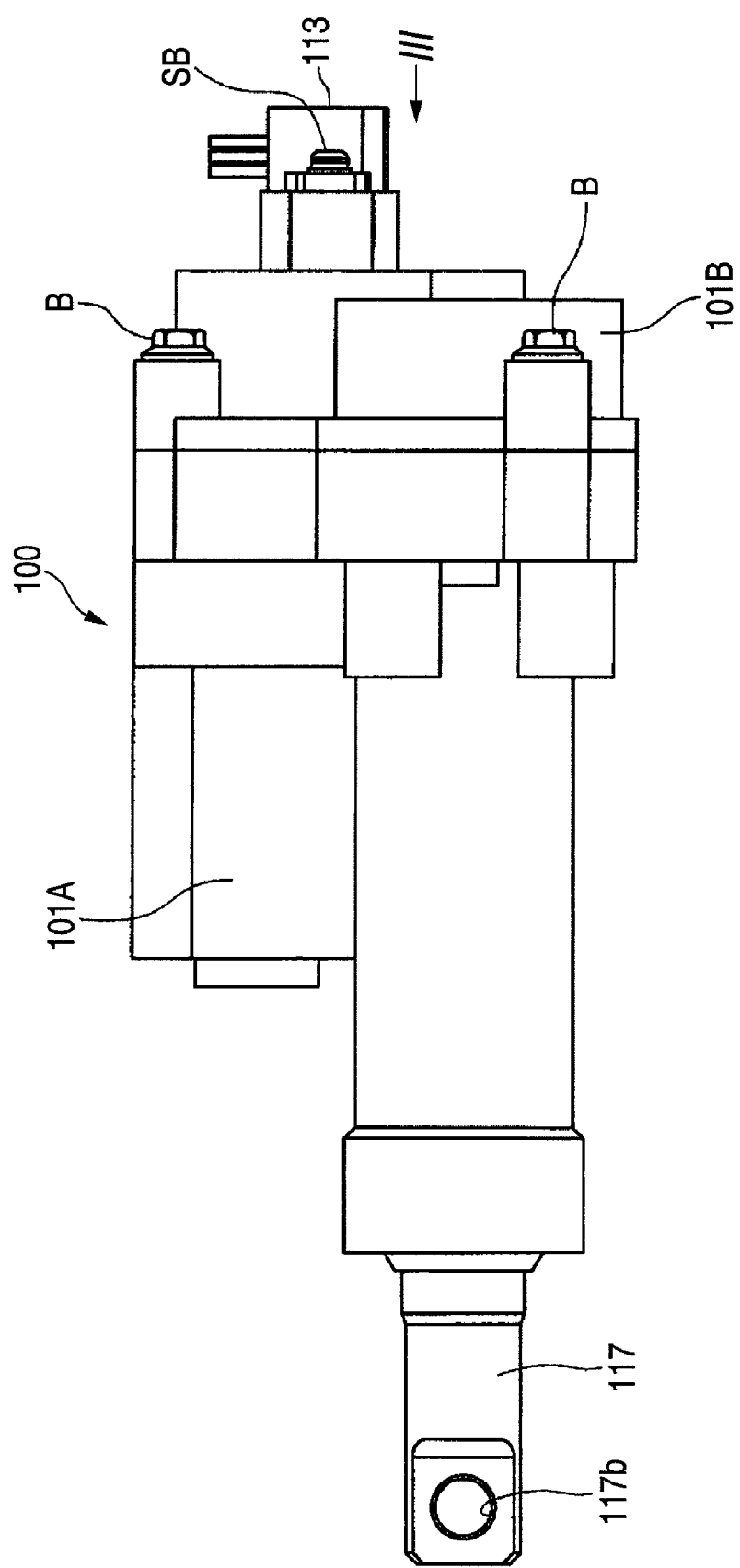
FIG. 2 is a front view of an actuator according to a first embodiment.
Figure 3:
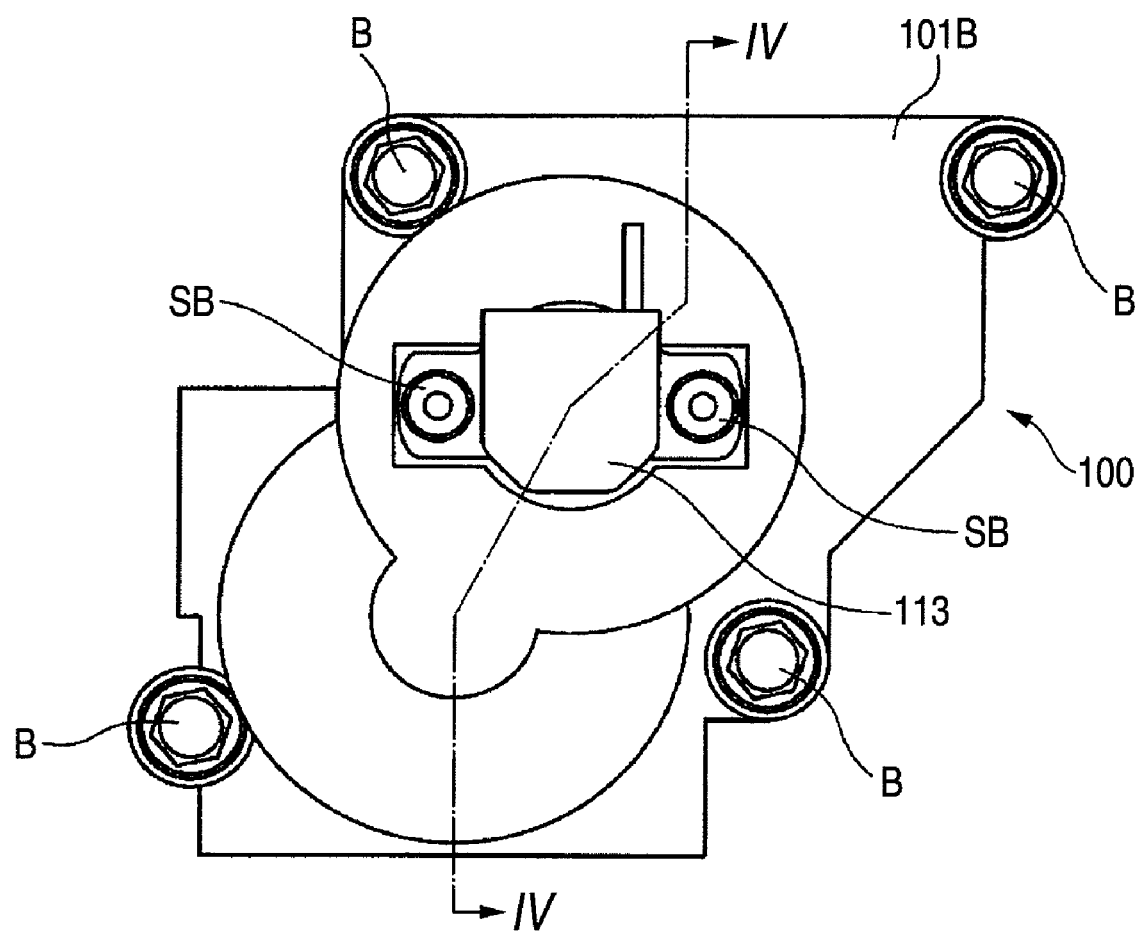
FIG. 3 is a view of the actuator in FIG. 2 as seen in a direction indicated by arrows shown therein.
Figure 4:
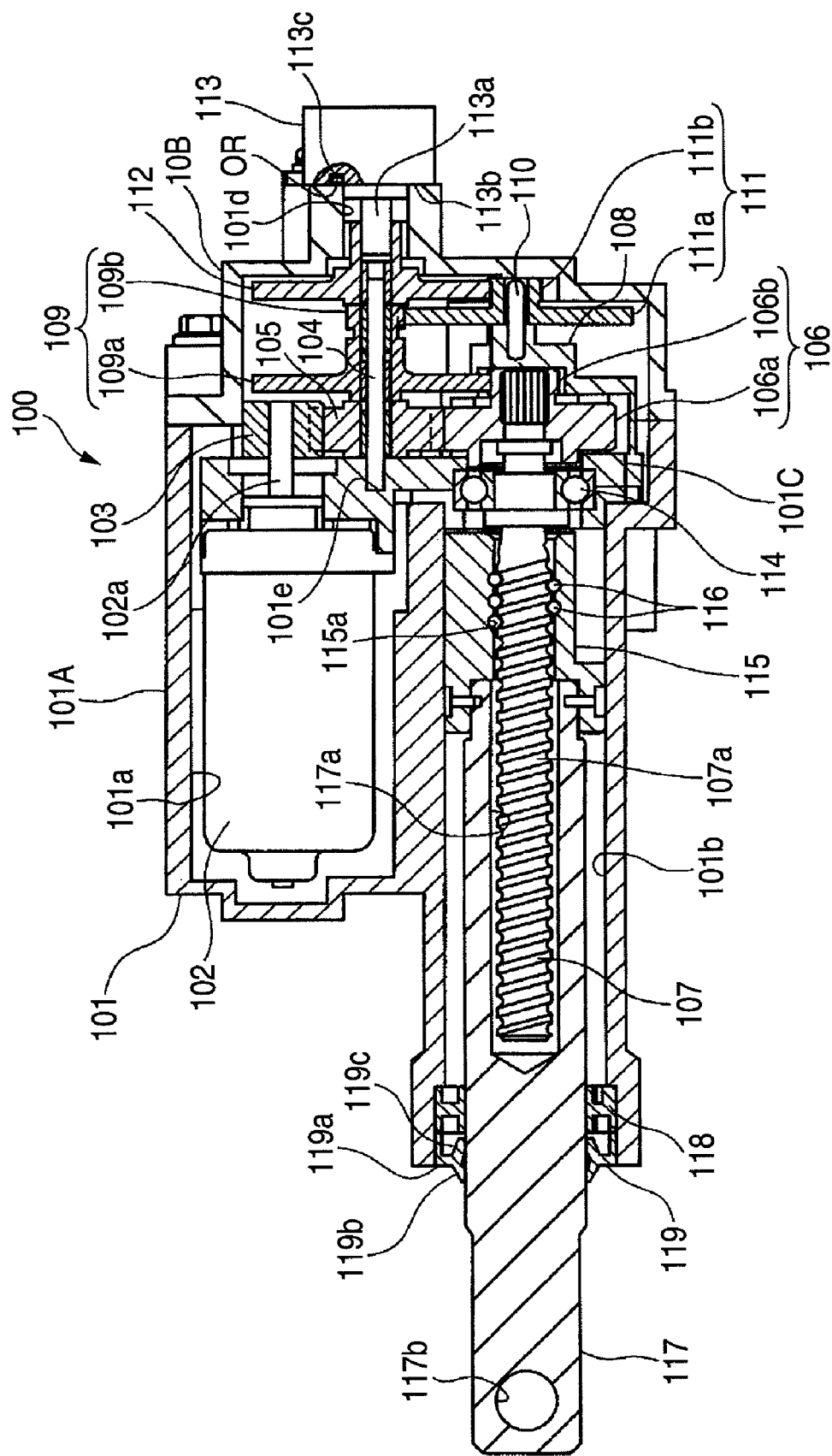
FIG. 4 is a cross sectional view of the configuration in FIG. 3 taken along the line IV-IV and as viewed in a direction indicated by arrows shown therein.

FIG. 1 is a schematic diagram of an onboard engine to which an actuator according to a 1-1$^{st}$ embodiment of the invention is applied. FIG. 2 is a front view of the actuator of the first embodiment of the invention. FIG. 3 is a view of the actuator in FIG. 2 as seen from a direction indicated by an arrow III. FIG. 4 is a view of the configuration in FIG. 3 sectioned along the line IV-IV and as seen in a direction indicated by arrows shown therein.

In FIG. 1, an outboard engine 2 has a casing 2a which is fixed to a hull 1 and a cowling 2b attached to an upper part of the casing 2a. An engine (not shown) is equipped in an interior of the cowling 2b with an output shaft 3 provided in such a manner as to extend along the casing 2a. A bevel gear 3a is attached to a lower end of the output shaft 3.

A propeller shaft 4 is disposed horizontally in a lower part of the casing 2a and is rotatably supported. In the figure, a right end portion of the propeller shaft 4 projects from the casing 2a to the outside thereof and a propeller 5 is attached to an end thereof.

The propeller shaft 4 passes through a forward bevel gear 6 and a reverse gear 7 which mesh with the bevel gear 3a, and a dog clutch 8 is disposed between the bevel gears 6, 7. The dog clutch 8 is made to move in an axial direction relatively to the propeller shaft 4, as well as to rotate together therewith, and the bevel gears 6, 7 are made to rotate relatively. Although not shown, the dog clutch 8 has projections directed in both axial directions, and when the dog clutch 8 moves to the left in the figure, the projections directed in one of the axial directions are brought into engagement with recessed portions on the bevel gear 6, whereby the dog clutch 8 and the bevel gear 6 rotate integrally. On the other hand, when the dog clutch 8 moves to the right in the figure, the projections directed in the other axial direction are brought into engagement with recessed portions on the bevel gear 7, whereby the dog clutch 8 and the bevel gear 7 rotate integrally.

The dog clutch 8 is made to be driven in the axial direction by a cam shaft 9. The cam shaft 9 is coupled to the dog clutch 8 in such a manner as to be displaced in the axial direction in response to the rotation of an operation shaft 10. The operation shaft 10 is coupled to a drive shaft 117 of an actuator 100, which will be described later, disposed in the upper part of the outboard engine 2 via a link member 11 which is a driven member.

In FIG. 4, a cylindrical housing 101 is made up of a housing main body 101A made of aluminum, a cover member 101B, made of aluminum or resin, which is assembled to an end face of the housing main body 101A with bolts B (FIG. 3), and a motor bracket 101C. The housing main body 101A has in an interior thereof a motor compartment 101*a* and a screw shaft compartment 101*b*. A motor 102 is disposed within the motor compartment 101*a*. The motor 102 is fixed to the plate-shaped motor bracket 101C, and the motor bracket 101C is attached to the housing main body 101A in such a manner as to hold an outer ring of a ball bearing 114, which will be described later, between the housing main body 101A and itself and to close the motor compartment 101*a* and the screw shaft compartment 101*b* in the housing main body 101A.

A rotational shaft 102*a* of the electric motor 102 projects from the motor bracket 101C, and a first gear 103 made of metal is mounted on an end portion of the rotational shaft 102*a* by means of press fitting in such a manner as not to rotate relatively. A second gear 105 made of resin is rotatably disposed on a circumference of a long shaft 104 which is press fitted in a tubular hole 101*e* of the motor bracket 101C at one end thereof, and this second gear 105 meshes with the first gear 103 and a large gear portion 106*a* of a third gear 106.

The third gear 106 has the large gear portion 106*a* and a small gear portion 106*b* which are formed coaxially and, furthermore, is attached to an end portion of a screw shaft 107 through serrated connection in such a manner as to be disabled from its relative rotation. A support member 108 is attached to the motor bracket 101C in such a manner as to cover part of the third gear 106. Here, the first gear 103, the second gear 105 and the third gear 106 make up a first power transmission mechanism.

Here, as to materials of the first gear 103, the second gear 105 and the third gear 106, the following combination will be preferable.

First combination: the first gear 103 (metal), the second gear (resin), the third gear (metal)

Second combination: the first gear 103 (resin), the second gear 105 (metal), the third gear (resin)

In consideration of its function, the first power transmission mechanism transmits a relatively large torque. Consequently, a strong contact force acts at meshing portions of the gears. Under an environment in which such actions occur, in the event that gears made of a resin material mesh with each other, there may be a case where a damage or wear such as welding and abrasion wear gets severe due to the property of the resin used. On the other hand, a contact between resin and metal does not cause welding or the like due to properties thereof. Then, in the event that the aforesaid combinations of the gear materials by making use of the properties, it becomes possible to prevent the damage or wear in advance. In addition, in the event that all the gears are made of metal, there is caused no welding problem, however, there may be a fear that noise gets larger due to meshing of the metallic gears, and therefore, by incorporating a resin gear in part of the gear mechanism, the increase in noise can be suppressed. Consequently, when three gears are combined as in the first transmission mechanism, the aforesaid material combinations are optimum.

A fourth gear 109 which is disposed adjacent to the second gear 105 is rotatably supported on the circumference of the long shaft 104. The fourth gear 109 made of resin has a large gear portion 109*a* which meshes with the small gear portion 106*b* of the third gear 106 and a small gear portion 109*b*, the large gear portion 109*a* and the small gear portion 109*b* being formed concentrically.

The small gear portion 109*b* of the fourth gear 109 meshes with a large gear portion 111*a* of a fifth gear 111 which is rotatably supported on a short shaft 110 which is planted in the support member 108 in parallel with the long shaft 104. The fifth gear 111 made of resin has the large gear portion 111*a* and a small gear portion 111*b* which are formed coaxially. The small gear portion 111*b* meshes with a sixth gear 112 which is rotatably supported on the circumference of the long shaft 104 which is disposed in adjacent to the fifth gear 111. In addition, bushes may be disposed between the long shaft 104 and the short shaft 110 and the corresponding gears so as to implement a smooth rotation.

A potentiometer 113 as a sensor is fittingly disposed in a hole 101*d* in the cover member 101B and is fixed with machine screws SB (FIG. 3). A circumferential groove 113*c* is formed on an abutment surface 113*b* of the potentiometer 113*b* in such a manner as to surround the perimeter of the hole 101*d*. An O-ring OR is accommodated in the circumferential groove 113*c*, so as to prevent the infiltration of foreign matters such as water via a gap between the abutment surface 113*b* and an end face of the cover member 101B. In the event that the O-ring OR is used for sealing, the rotation of the potentiometer 113 round a measuring shaft 113*a* for adjustment is facilitated. However, a sealing agent may be used which can be coated.

The measuring shaft 113*a* of the potentiometer 113 is coupled to the sixth gear 112 so as to rotate together therewith. A distal end of the long shaft 104 which extends in a cantilever-like fashion is supported by the potentiometer 113 via the sixth gear 112 and the measuring shaft 113*a* or is supported in the hole 101*d*. The potentiometer 113 is such as to detect the angle of the measuring shaft 113*a* over a predetermined range (for example, 90 degrees) with good accuracy. Here, the first gear 103, the second gear 105, the third gear 106, the fourth gear 109, the fifth gear 111 and the sixth gear 112 make up a second power transmission mechanism. The cover member 101B has a function as a gear cover which tightly closes in such a manner that foreign matters do not infiltrate into the respective gears. In addition, in the event that different resin materials are used for the gears which mesh with each other, wear and tear can preferably be suppressed.

Figure 12:
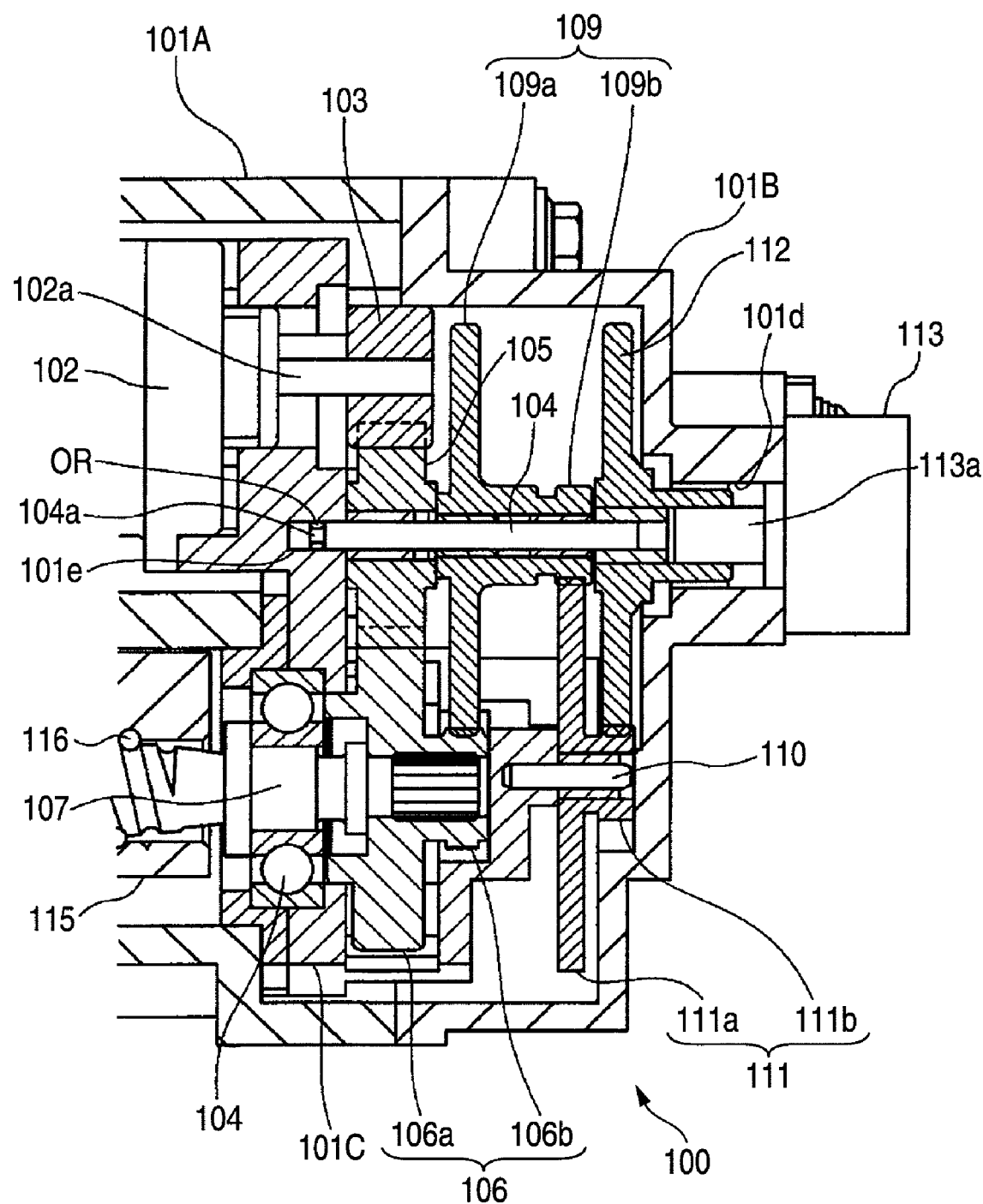
FIG. 12 is a sectional view of a main part of an actuator according to a modified example to the embodiment described above.

In addition, as a modified example to the embodiment that has been described heretofore, the one end of the long shaft 104 can be loosely fitted in the tubular hole 101*e*. In the embodiment that has been described above, although the sixth gear 112 is assembled by being fitted in the cover member 101B, where there occurs a misalignment in center between the motor bracket 101C and the cover member 101B, there may be a fear that an installation failure or hesitation of the parts is called for. In contrast to this, according to the modified example, a free end of the long shaft 104 is allowed to be tilted to some extend due to the loose fit, and even though there is generated a misalignment in center between the motor bracket 101C and the cover member 101B, the misalignment so generated can be absorbed to suppress the occurrence of the aforesaid drawback. In this case, as s shown in FIG. 12 which is a sectional view of the modified example, a circumferential groove 104a is formed in the vicinity of the one end of the long shaft 104, and an O-ring OR is assembled to the perimeter of the circumferential groove 104a, so that friction can be produced between the tubular hole 101e and itself, whereby an axial movement of the long shaft 104 relative to the tubular hole 101e can be suppressed.

In FIG. 4, the screw shaft 107 is supported rotatably on the housing main body 101A by the bearing 114 at a right end portion thereof as viewed in the figure. An external threaded groove 107a is formed on a left end portion of the screw shaft 107.

The screw shaft 107 passes through a cylindrical nut 115. An internal threaded groove 115a is formed on an inner circumferential surface of the nut 115 in such a manner as to confront the external threaded groove 107a, a large number of balls 115 are rollingly disposed in a spiral space (a rolling path) that is defined by both the threaded grooves 107a, 115a. A detent (one example of which will be described later) is provided on the nut 115 to lock its rotation relative to the housing main body 101A, whereby the nut 115 is allowed to move in the axial direction within the screw shaft chamber 101b but is disabled from rotating relatively. In addition, the nut 115, which is an axially movable element, the screw shaft 107, which is a rotational element, and the balls 116, which are rolling elements, make up a ball screw mechanism, and this ball screw mechanism and the following drive shaft 117 make up a drive mechanism.

A left end of the screw shaft 107 enters an interior of a tubular hole 117a formed in the round shaft-like drive shaft 117. In the diagram showing the drive shaft 117, a right end of the drive shaft 117 fits in the nut 115 concentrically and is coupled thereto with a pin so as to move together therewith. The drive shaft 117 is supported on the housing main body 101A by a bush 118 in such a manner as to move in the axial direction, and a seal 119 is disposed leftwards (on an outside) of the bush 118 so as to prevent the infiltration of foreign matters such as sea water from a gap between the housing main body 101A and the drive shaft 117.

The seal 119 has a main body 119a which fits in an inner circumference of the housing main body 101A, a first lip portion 119b which extends outwards of the housing main body 101A from the main body 119a and a second lip portion 119c which extends inwards of the housing main body 101A from the main body portion 119a so as to be brought into abutment with an outer circumferential surface of the drive shaft 117, thus the seal 119 adopting a so-called double lip construction. In particular, there exists the well accepted truth that mainly rubber materials are deteriorated significantly by the attack of ozone on the exterior side of the actuator 100. By adopting the double lip construction in the way described above, even though the first lip portion 119b which is easy to be exposed to ozone is deteriorated to some extent, ozone is made hard to arrive at the second lip portion 119c by the first lip portion 119b, whereby the deterioration of the second lip portion is suppressed, thereby making it possible to maintain the sealing performance over a long period of time.

Figure 13:
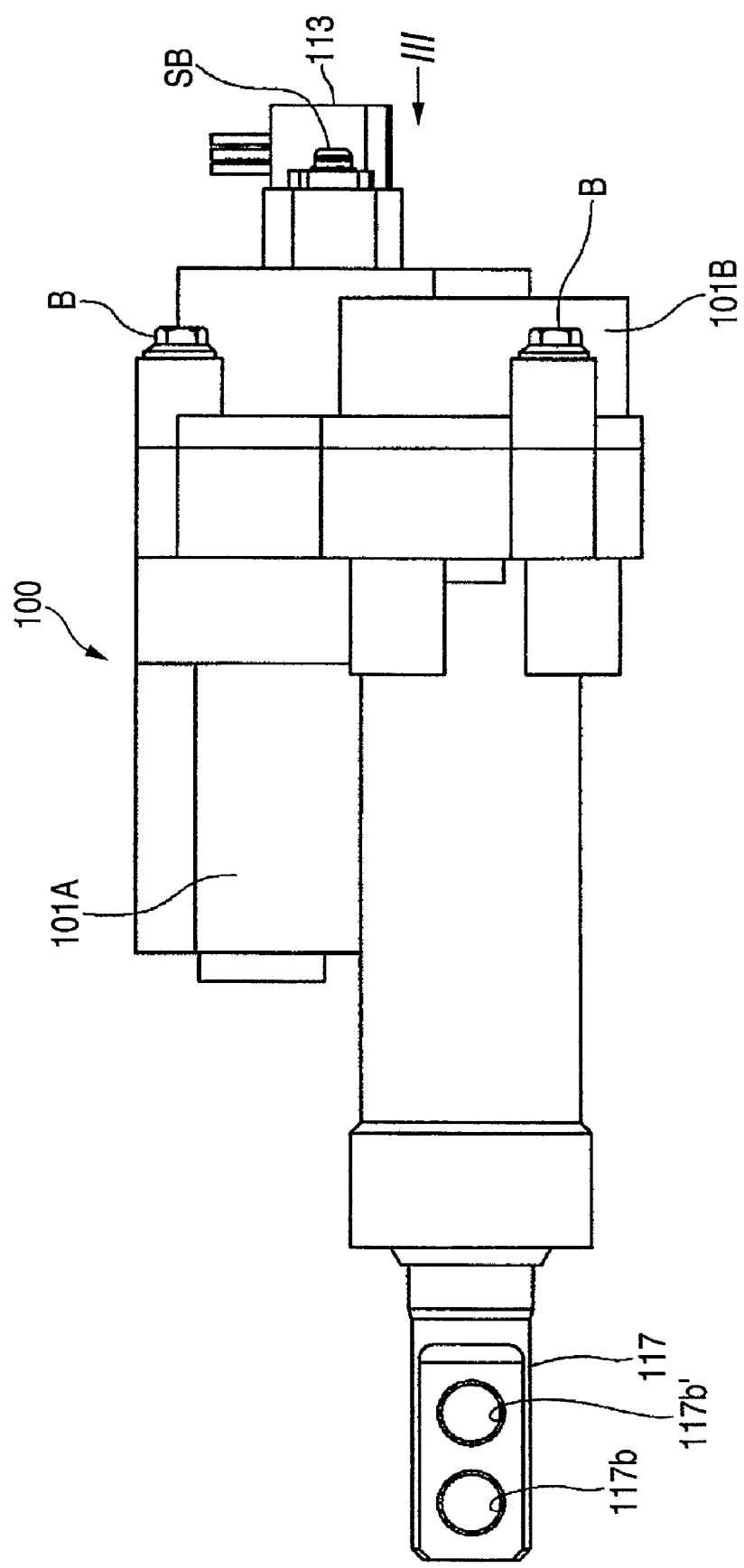
FIG. 13 is an external view of the actuator according to the modified example to the embodiment described above.

A hole 117b is formed in the end portion of the drive shaft 117 which projects from the housing main body 101A so as to be coupled to the link member 11. As is shown in FIG. 13 which shows a modified example, however, an extra hole 177b' may be formed adjacent to the main hole 117b which is coupled to the link member 11. The main hole 117b which is coupled to the link member 11 may be worn or deformed as a result of repeated operations. The deformation of the main hole 117 is recognized as looseness at the coupling portion, and there may be a fear that the control accuracy is reduced significantly by the looseness. In anticipation of the occurrence of such a situation, in the event that the accurate unused extra hole 117b' is provided in preparation for the control being so affected, a highly accurate control can be restored only by coupling the link member 11 to the unused extra hole 117b' in place of the deteriorated main hole 117b.

Figure 14A:
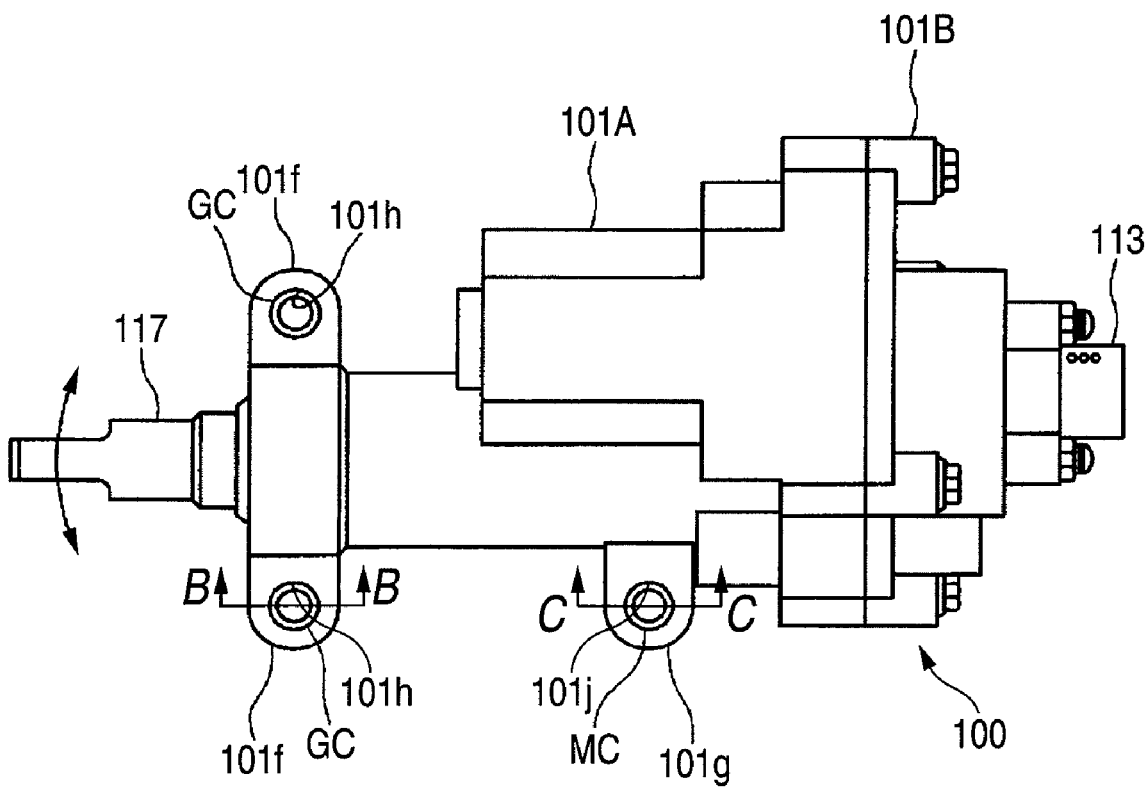
FIG. 14A is an external view of an actuator according to a modified example to the embodiment described above.
Figure 14B:
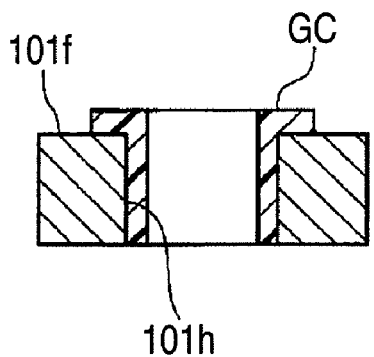
FIG. 14B is a view of the configuration in FIG. 14A sectioned along the line B-B and as seen in a direction indicated by arrows shown therein.
Figure 14C:
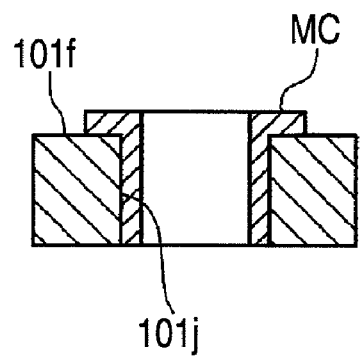
FIG. 14C is a view of the configuration in FIG. 14A sectioned along the line C-C and as seen in a direction indicated by arrows shown therein.

In addition, the housing main body 101A has three mounting seats 101f, 101g which extend vertically in FIG. 14A. The two mounting seats 101f which lie close to the drive shaft 117 which projects from the housing main body 101A have bolt holes 101h, respectively. In addition, the mounting seat 101g which lies apart from the drive shaft 117 has a bolt hole 101j. As is shown in FIG. 14B which is a sectional view of the mounting seat 101f taken along the line B-B in FIG. 14A, a tubular rubber or resin color GC with a flange is fittingly disposed within the bolt hole 101h, and as is shown in FIG. 14C which is a sectional view of the mounting seat 101g taken along the line C-C in FIG. 14A, a tubular metallic color MC with a flange is fittingly disposed within the bolt hole 101j.

When the same force is exerted on those colors, while the metallic color MC is deformed relatively small, the rubber or resin color GC is deformed more largely than the metallic one. Consequently, when the housing main body 101A is mounted on a frame, not shown, of the outboard engine 2 by bolts, not shown, which pass through the bolt holes 101h, 101j, even in the event that the drive shaft 117 is tilted as indicated by arrows in FIG. 14A due to a dimension error in relation to the link member 11, the housing main body 101A oscillates on the circumference of the bolt hole 101j by the rubber or resin color GC being deformed elastically, whereby the prying of the drive shaft 117 on the housing main body 101A (the nut 115) is suppressed, thereby making it possible to ensure a smooth operation. On the other hand, the housing main body 101A is positioned in an ensured fashion vertically and horizontally in FIG. 14A by the bolts, not shown, via the metallic colors MC which are more rigid and hence are deformed less than the color GC.

In FIG. 1, a wiring 102b of the motor 102 and a wiring 113b of the potentiometer 113 are connected to a drive circuit, not shown.

Next, the operation of the embodiment will be described. Here, since the bevel gear 3a normally meshes with either of the forward bevel gear 6 and the reverse bevel gear 7, as long as the internal combustion engine is in operation, the bevel gears 6, 7 to which power is transmitted from the bevel gear 3a rotate in opposite directions to each other. In a neutral state, however, as is shown in FIG. 1, since the dog clutch 8 is in engagement with neither of the bevel gears 6, 7, the power of the output shaft 3 is not transmitted to the propeller shaft 4, and hence, the propeller 5 does not rotate.

Here, let's assume that the operator operates a lever, not shown, in the forward direction. Then, in FIG. 4, a power of a predetermined polarity is supplied to the motor 102, whereby the rotational shaft 102a rotates in a predetermined direction. Since the rotational force of the rotational shaft 102a is transmitted to the screw shaft 107 via the first gear 103, the second gear 105, and the third gear 106, the nut 115 is displaced to the left as seen in FIG. 4 in response to the rotation of the screw shaft 107. When the nut 115 is displaced to the left, since the drive shaft 117 moves in a direction in which it projects, the link member 11 pivots in FIG. 1. Consequently, the operation shaft 10 rotates in a predetermined direction, and the cam shaft 9 moves to the left via a cam mechanism, not shown, whereby the dog clutch 8 is brought into engagement with the forward bevel gear 6. By this action, the power of the output shaft 3 is transmitted to the propeller shaft 4 via the bevel gears 3a, 6 and the dog clutch 8, whereby the propeller 5 is allowed to rotate forwards.

On the other hand, the rotational force of the rotational shaft 102a is transmitted to the measuring shaft 113a of the potentiometer 113 via the first gear 103, the second gear 105, the third gear 106, the fourth gear 109, the fifth gear 111 and the sixth gear 112. A signal corresponding to the rotation of the measuring shaft 113a is inputted into the drive circuit, not shown, from the potentiometer 113 via the wiring 113b. When determining that the screw shaft 107 has rotated a predetermined rotational amount based on the signal, the drive circuit stops the supply of power to the motor 102.

In contrast to this, when the operator operates the lever, not shown, in the reverse direction, in FIG. 4, since power of an opposite polarity is supplied to the motor 102 so as to rotate the rotational shaft 102a in the opposite direction, the drive shaft 117 of the actuator 100 moves in a direction in which it is withdrawn through an opposite operation to the operation described above. Consequently, in FIG. 1, the operation shaft 10 rotates in the opposite direction via the link member 11, and the cam shaft 9 moves to the right via the cam mechanism, not shown, whereby the dog clutch 8 is brought into engagement with the reverse bevel gear 7. By this action, the power of the output shaft 3 is transmitted to the propeller shaft 4 via the bevel gears 3a, 7 and the dog clutch 8, whereby the propeller 5 is allowed to rotate in the opposite direction.

According to this embodiment, since centers of the second gear 105, the fourth gear 109 and the sixth gear 112 coincide with each other and these gears are disposed in such a manner as to rotate freely round the circumference of the same long shaft 104, a compact configuration can be realized while using a gear train of five gears to obtain a reduction gear ratio of a high gear ratio. The fact the three gears have the same rotational center shaft within the actuator 100 in which the plurality of gears are incorporated in the way described above has many merits that the number of center shafts is reduced, that the number of support holes for the housing and the like which supports the center shaft is reduced, and the like.

In particular, the motor 102 is fixed to the motor bracket 101C and is fixed to the housing 101 in such a manner that the bearing 114 is held intermediately between the motor bracket 101C and the motor 102 itself. Not only actuators but also industrial components are desired to be manufactured compact, and compactness is demanded particularly as in a case where the actuator 100 of this embodiment is stored within the narrow casing 2a of the outboard engine. As a form of a compact actuator, as is shown in FIG. 4, the screw shaft 107 and the axis of the motor 102 are aligned in parallel. In this case, although it is a most commonly accepted construction to assemble the motor 102 from a right-hand side of the figure which is so defined based on the drive system gears acting as a boundary between the left- and right-hand sides, in the event that this construction is adopted, the length comes to project or is increased by the axis of the motor, whereby the overall length of the actuator is increased. For the purpose of avoiding this, it is preferable to adopt a method in which the motor 102, which acts as the drive source, is fixed to the motor bracket 101C and is fixed to the housing main body 101A in such a manner as to hold the bearing 114 intermediately between the motor bracket 101C and the motor 102 itself, so as to realize a construction in which the axially long portion of the motor 102 is made to extend towards a deeper side of the motor compartment 101a of the housing main body 101A. When taking only the direction of the motor as an issue, a conventional example of JP-A-2003-207013 can solve the issue. However, in this conventional example, the motor is not accommodated within the housing.

Furthermore, according to this embodiment, since the rotational displacement of the screw shaft 107 is detected by the potentiometer 113 in place of detecting a displacement position by a limit switch or the like as seen in the related art, an arbitrary position control is enabled. In detecting directly the rotation of the screw shaft 107, since the screw shaft 107 rotates many turns, a rotational displacement that is reduced in speed via the gear train of the second power transmission mechanism is detected by the potentiometer 113. On the other hand, a rotational motion outputted from the motor 102 is reduced in speed via the gear train of the first power transmission mechanism for transmission to the screw shaft 107. By providing a common rotational center shaft in part of the gear trains of these two systems, a compact layout is enabled, and this configuration contributes largely in terms of cost reduction.

Although a sliding screw mechanism may be used in place of the ball screw mechanism which is adopted in the actuator of the embodiment, adopting the ball screw mechanism ensures high efficiency and increases the degree of freedom in selection of gear ratios, and eventually increases the degree of freedom in layout and design of gears. Furthermore, adopting the ball screw mechanism in the actuator of the embodiment enables the utilization of the reversible operation which is one of the highly efficient properties that the ball screw mechanism possesses.

In general, since the reversible operation cannot be implemented in the sliding screw mechanism in which no rolling elements are interposed, this means that no reversible operation can be implemented from the side of the output shaft. With the ball screw mechanism, however, the reversible operation from the side of the output shaft is enabled. This increases the scope of usability as the actuator significantly. For example, the ball screw mechanism can be used in the switching portion of the dog clutch 8 which implements switching between the forward and reverse rotations of an outboard engine as shown in FIG. 1. This is because even in the event that the clutch is disengaged due to some failure occurring during switching by the dog clutch 8, the drive shaft of the actuator 100 can be moved manually from the outside, thereby making it possible to avoid an desirable event that the boats has to drift in the sea.

Furthermore, the necessity of adding a special specification on the sealing properties of the actuator is obviated by accommodating the motor 102 within the housing 101, and hence, an inexpensive motor can be used. Furthermore, in the event that the housing 101 is manufactured using a conductive material (iron, aluminum, conductive resin or the like), electromagnetic waves are cut off which would otherwise be transmitted to the motor 102 and the potentiometer 113, the reliability of the actuator thus being enhanced. In particular, since there are lots of high-energy electromagnetic waves on the sea, the electric components are preferably covered by such a conductive material. By this configuration, the reliability of the actuator of the embodiment is increased, the propagation of application of the actuator to boats thus being promoted.

1-2$^{nd}$ Embodiment

Figure 5:
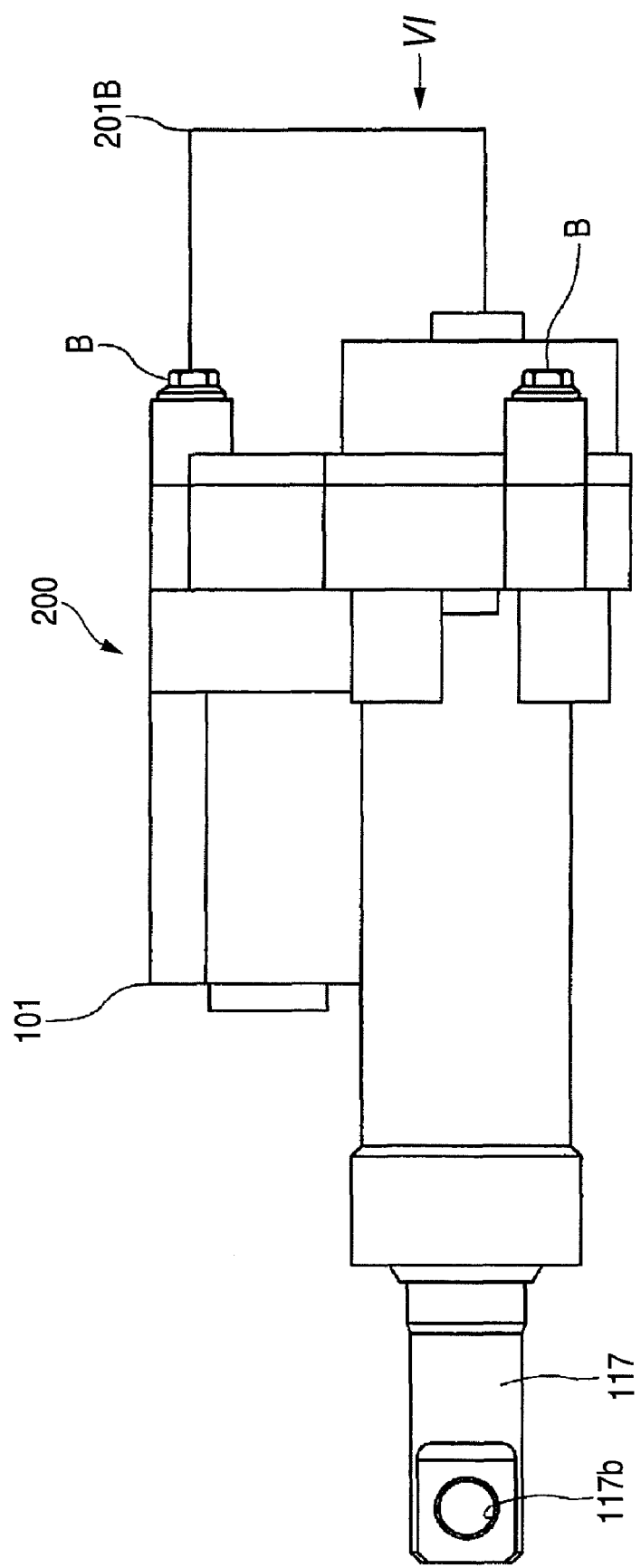
FIG. 5 is a front view of an actuator 200 of a 1-$2^{nd}$ embodiment.
Figure 6:
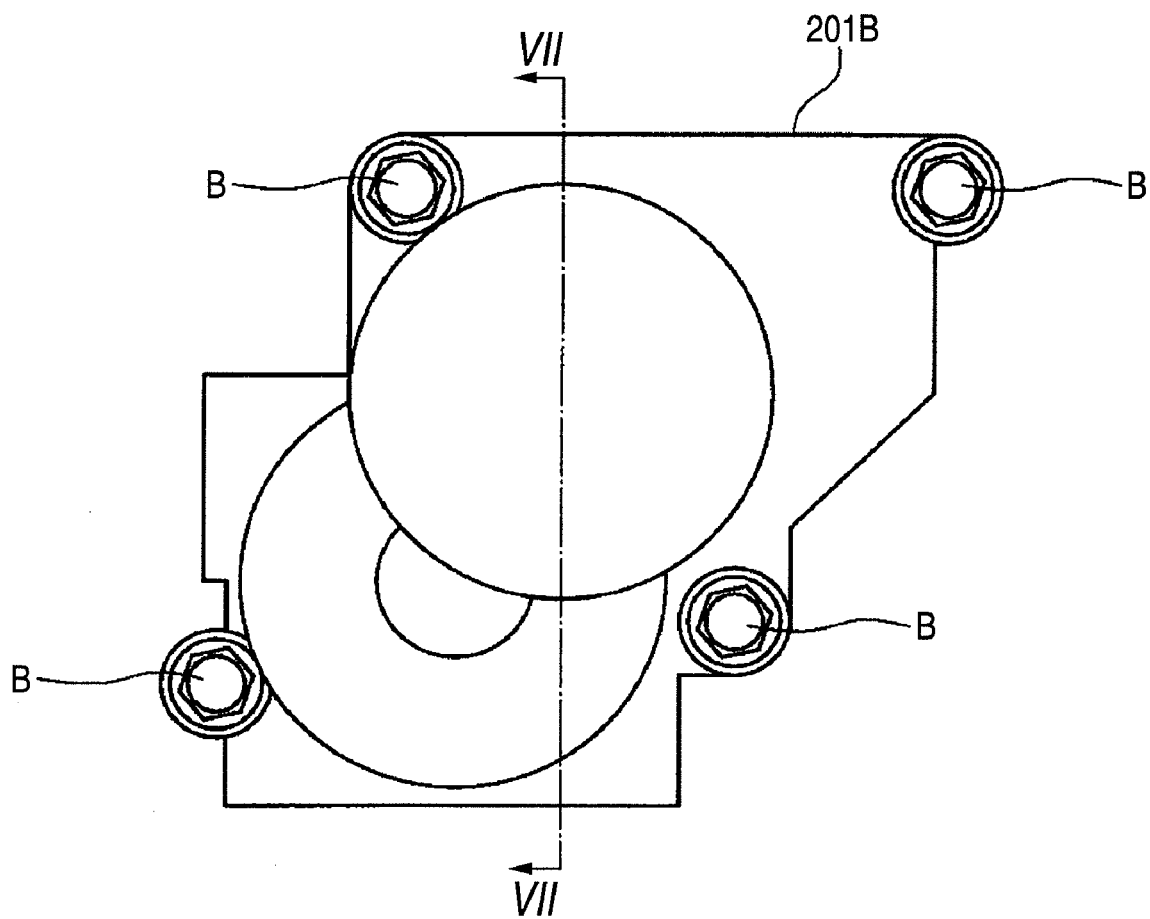
FIG. 6 is a view of the actuator in FIG. 5 as seen in a direction indicated by arrows VII.
Figure 7:
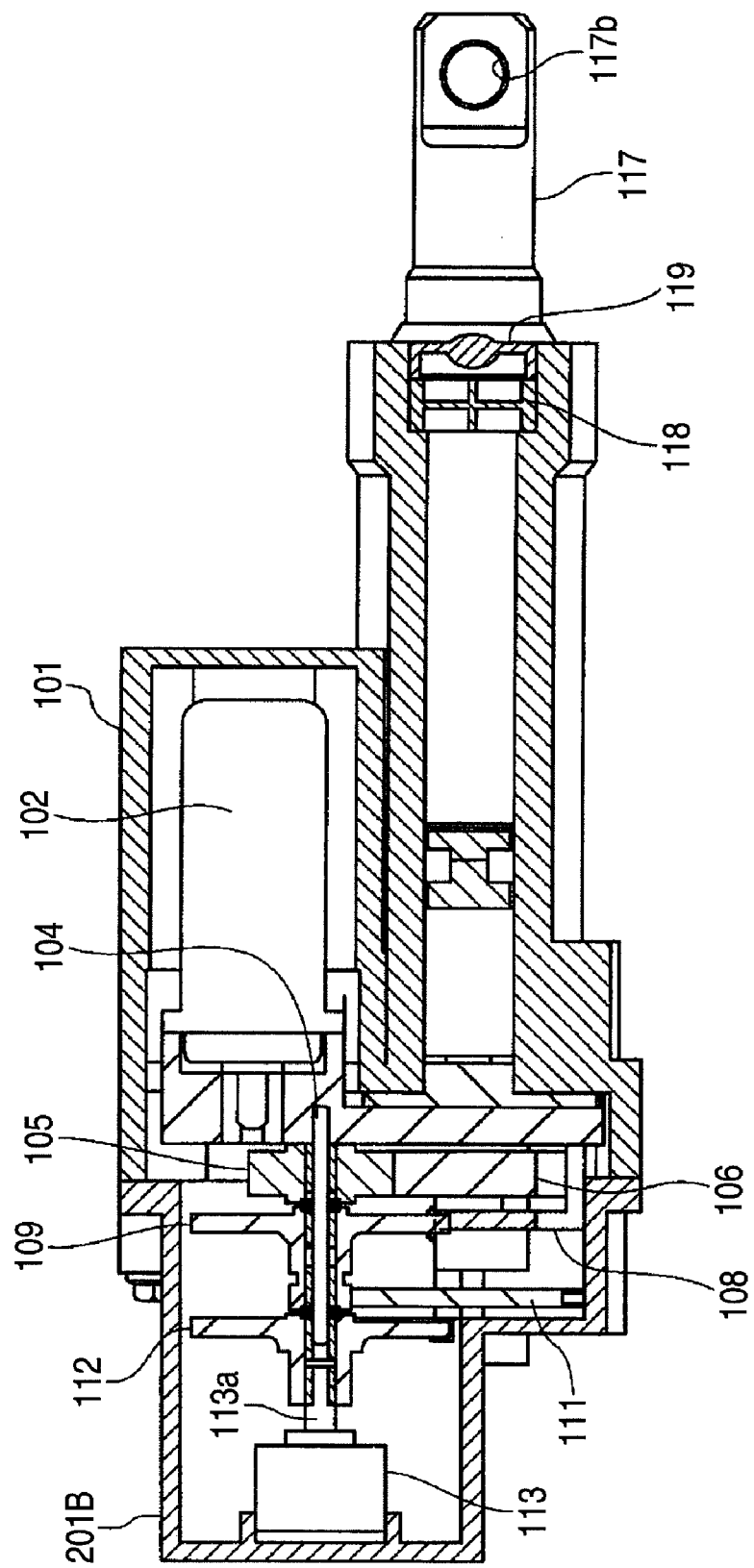
FIG. 7 is a view of the configuration in FIG. 6 sectioned along the line VII-VII and as seen in a direction indicated by arrows shown therein.

FIG. 5 is a front view of an actuator 200 of a 1-2$^{nd}$ embodiment. FIG. 6 is a view of the actuator in FIG. 5 as seen in a direction indicated by an arrow VI shown therein. FIG. 7 is a view of the configuration in FIG. 6 taken along the line VII-VII and as seen in a direction indicated by arrows shown therein.

This embodiment differs from the embodiment that has been described above in that a potentiometer 113 is fixedly disposed within a cover member 201B made of aluminum. For example, in a boat equipped with a radar system, there may be a fear that the potentiometer 113 is exposed to strong electromagnetic waves, however, by accommodating the potentiometer 113 within a conductive housing 101 as in the case of this embodiment, the effect of those electromagnetic waves can be avoided. Note that the other configurations are similar to those of the embodiment that has been described above, like reference numerals will be given to like constituent components, and the description thereof will be omitted here.

1-3$^{rd}$ Embodiment

Figure 8:
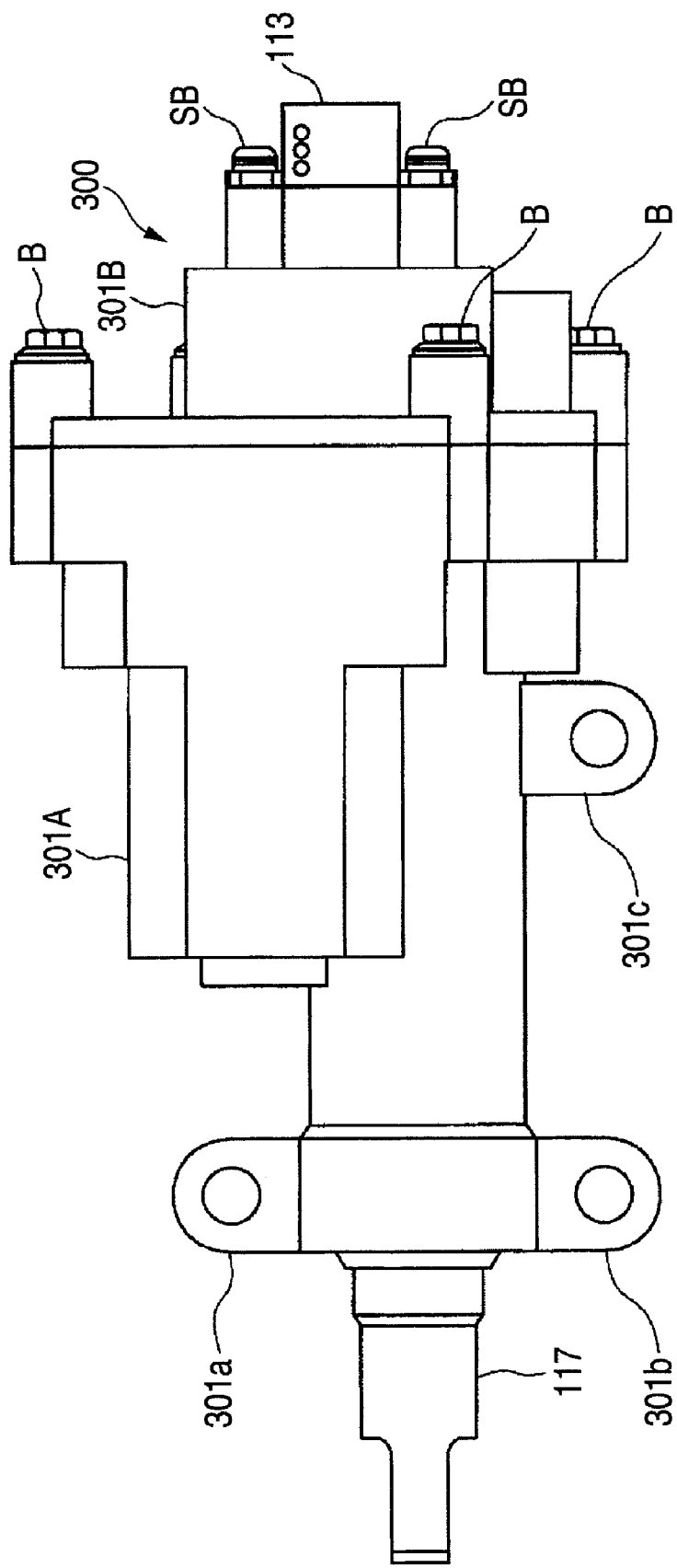
FIG. 8 is a front view of an actuator 300 according to a 1-$3^{rd}$ embodiment.

FIG. 8 is a front view of an actuator 300 according to a 1-3$^{rd}$ embodiment. In this embodiment, mounting leg portions 301a, 301b, 301c each having a bolt hole are formed on a housing main body 301A. By passing bolts, not shown, through the bolt holes of the leg portions 301a, 301b, 301c and tightening the bolts so passed through, the actuator 300 can be fixed to a mounting surface of a casing 2a (FIG. 1). On the other hand, no mounting leg portion is provided on a cover member 301B.

In the event that by providing the leg portions 301a, 301b, 301c for mounting the actuator 300 on the casing 2a only on the side of the housing main body 301A, all the reaction force exerted from the mounting surface is made to be received by the housing main body 301A which is highly rigid so that the cover member 301B is made free from exertion of the reaction force, since no force is originally exerted in a direction in which mating surfaces of the housing main body 301A and the cover member 301B are forced to be separated from each other, the imposition of any effect on closeness of the mating surfaces is suppressed. In addition, load generated by vibrations is concentrated on the side of the housing main body 301A, and load applied to the mating surfaces becomes only the weight of the cover member 301B, whereby no negative effect is imposed on a sealing construction at the mating surfaces as well. In addition, in the event that the cover member 301B is made of a light substance such as resin, the effect of provision of the leg portions only on the housing main body 301A can be expected to be enhanced further.

1-4$^{th}$ Embodiment

Figure 9:
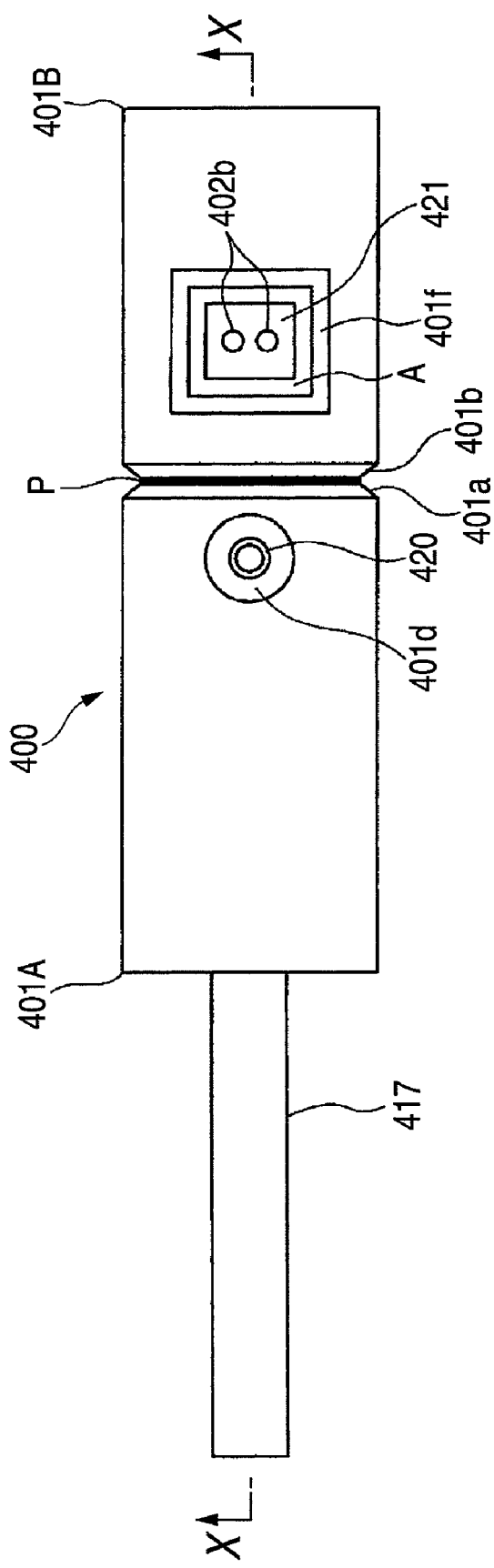
FIG. 9 is a top view of an actuator 400 according to a 1-$4^{th}$ embodiment.
Figure 10:
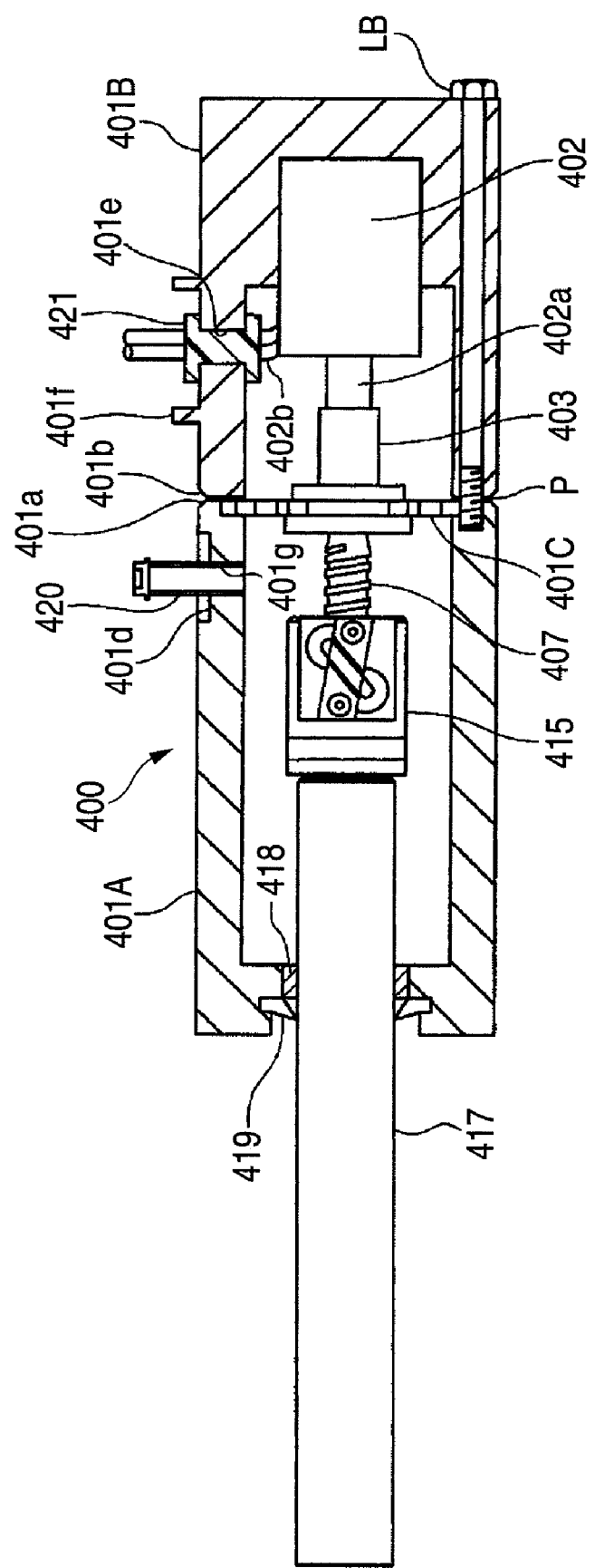
FIG. 10 is a view of the configuration in FIG. 9 sectioned along the line X-X and as seen in a direction indicated by arrows shown therein.

FIG. 9 is a top view of an actuator 400 according to a 1-4$^{th}$ embodiment. FIG. 10 is a view of the configuration in FIG. 9 taken along the line X-X and as viewed in a direction indicated by arrows shown therein. In this embodiment, as is shown in FIG. 10, a motor 402 is mounted on the side of a cover member 401B. A rotational shaft 402a of the motor 402 is coupled to a screw shaft 407 via a coupling 403 which is supported by a support plate 401C which is held between a housing main body 401A and the cover-member 401B. The screw shaft 407 passes through an interior of a nut 415 which can move only in an axial direction relative to the housing main body 401A and extends as far as an interior of a drive shaft 417. The drive shaft 417 is supported on the housing main body 401A by a bush 408 in such a manner as to move in the axial direction and is sealed by a seal 419a.

A tapered surface 401a is formed on an outer circumference of a right end portion of the housing main body 401A as viewed in FIG. 9. On the other hand, a tapered surface 401b is formed on an outer circumference of a left end portion of the cover member 401B as viewed in FIG. 9 in such a manner as to confront the tapered surface 401a. A plate-shaped packing P is interposed between mating surfaces of the housing main body 401A and the cover member 401B, so that when both the members are fixed together using a long bolt LB, a circumferential groove (a recessed portion) defined by the tapered surfaces 401a, 401b are formed round the circumference of the mating surfaces. In the event that a sealing agent, not shown, is applied to this groove, since the sealing agent is made difficult to expand and to be separated therefrom, even though a gap is produced between the mating surfaces, a high sealing performance can be maintained. In particular, since the actuator which is disposed in a lower part of a casing 2a (FIG. 1) in many cases is subjected to sea water or lubricating oil of an internal combustion engine, sealing the mating surfaces in the way described above is effective.

In addition, with the interior defined by the housing 401A and the cover member 401B being in a hermetically closed state, when the motor 402 is driven to actuate the actuator 400, the internal pressure changes, leading to a fear that the operation of the drive shaft is interrupted. To deal with this, although an opening 401g is formed in the housing main body 401A so that a connector 420 can be embedded therein for connection to an upper atmospheric space via a breather pipe (refer to FIG. 1), not shown, there is caused a problem with respect to airtightness between the connector 420 and the housing main body 401A. Then, a recessed portion 401d is formed on the periphery of the opening 401g on an external surface of the housing main body 401A for application of a sealing agent, not shown, to thereby enable the enhancement of airtightness.

Furthermore, a wiring 402bg to the motor 402 is led out through an opening 401e formed in the cover member 401B to the outside. Consequently, there is also caused a problem with respect to airtightness between the wiring 402b and the cover member 401B. Then, the wiring 402b is airtightly held by a rubber grommet 421 and is thereafter pushed into the opening 401e. Furthermore, a wall 401f is formed on the periphery of the opening 401e in the external surface of the cover member 401B so that a sealing agent, not shown, is applied to an area A (a recessed portion) lying inside the wall 401f to thereby enhance airtightness.

Figure 11:
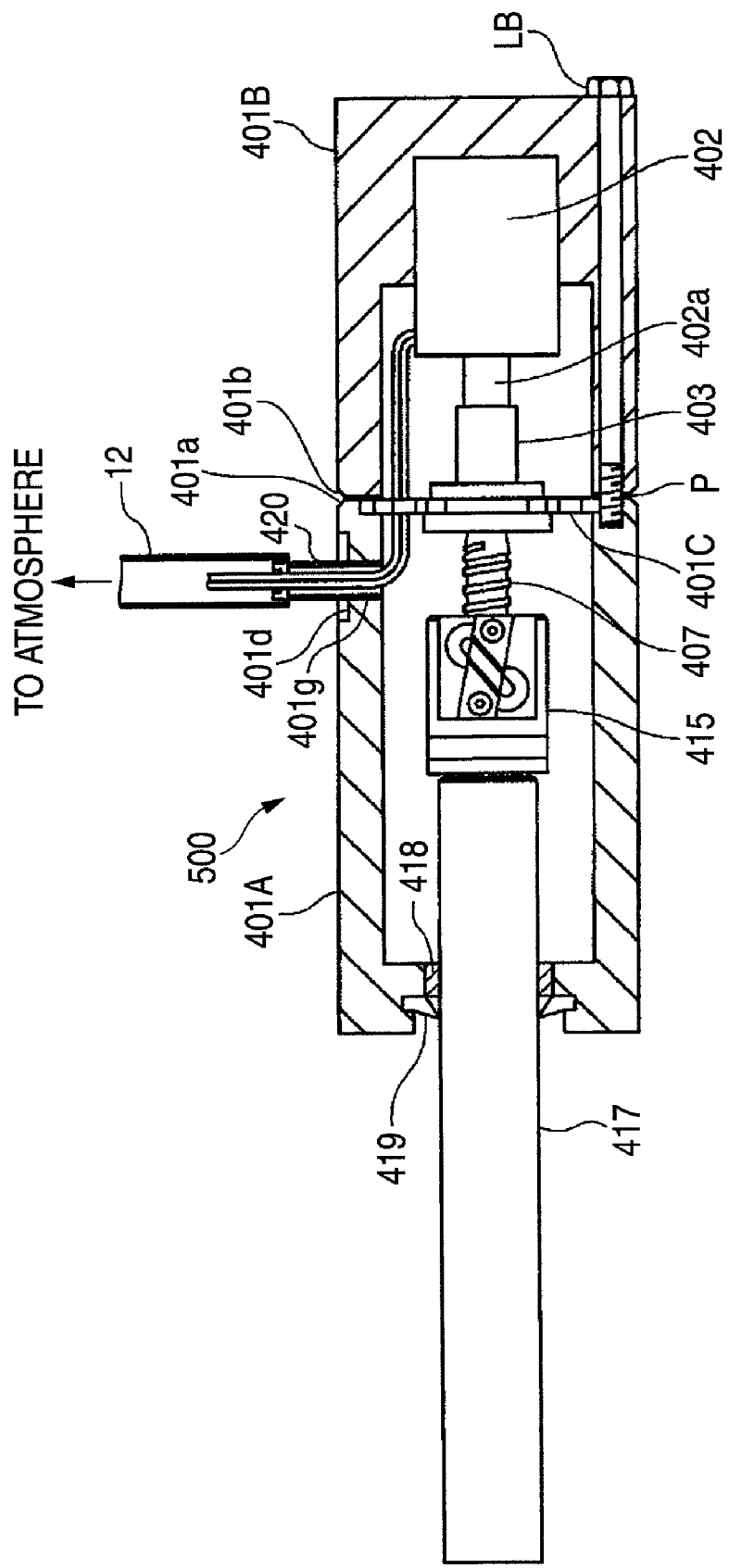
FIG. 11 is a top view of an actuator 500 according to a 1-5$^{th}$ embodiment.

FIG. 11 is a top view of an actuator 500 according to a 1-5$^{th}$ embodiment. In this embodiment, a wiring of a motor 402 is led out upwards via a connector 402 and a breather pipe 12 so as to be connected to a drive circuit, not shown. Consequently, there is no need to provide an opening or grommet in a cover member 401B so that a wiring is led out therethrough, thereby making it possible not only to reduce the production costs but also to suppress the occurrence of leakage by reduction of sealing surfaces. Since the other configurations of this embodiment are similar to those of the embodiment shown in FIGS. 9, 10, the description thereof will be omitted here.

1-5$^{th}$ Embodiment

Figure 15:
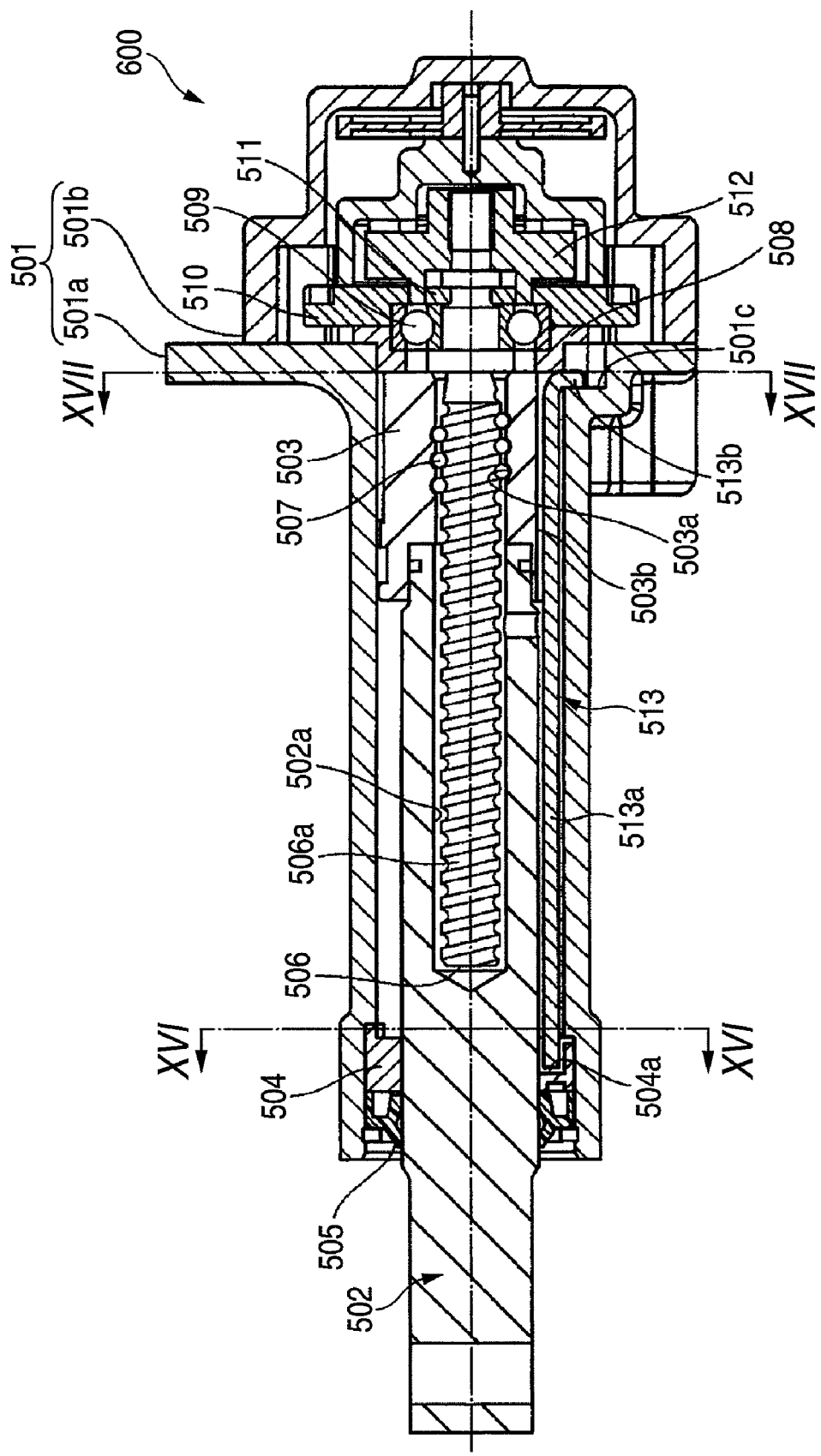
FIG. 15 is a view of the configuration of an actuator 600 according to the 1-5$^{th}$ embodiment sectioned in the position of an axis of a drive shaft and as seen in a direction indicated by arrows shown therein.
Figure 16:
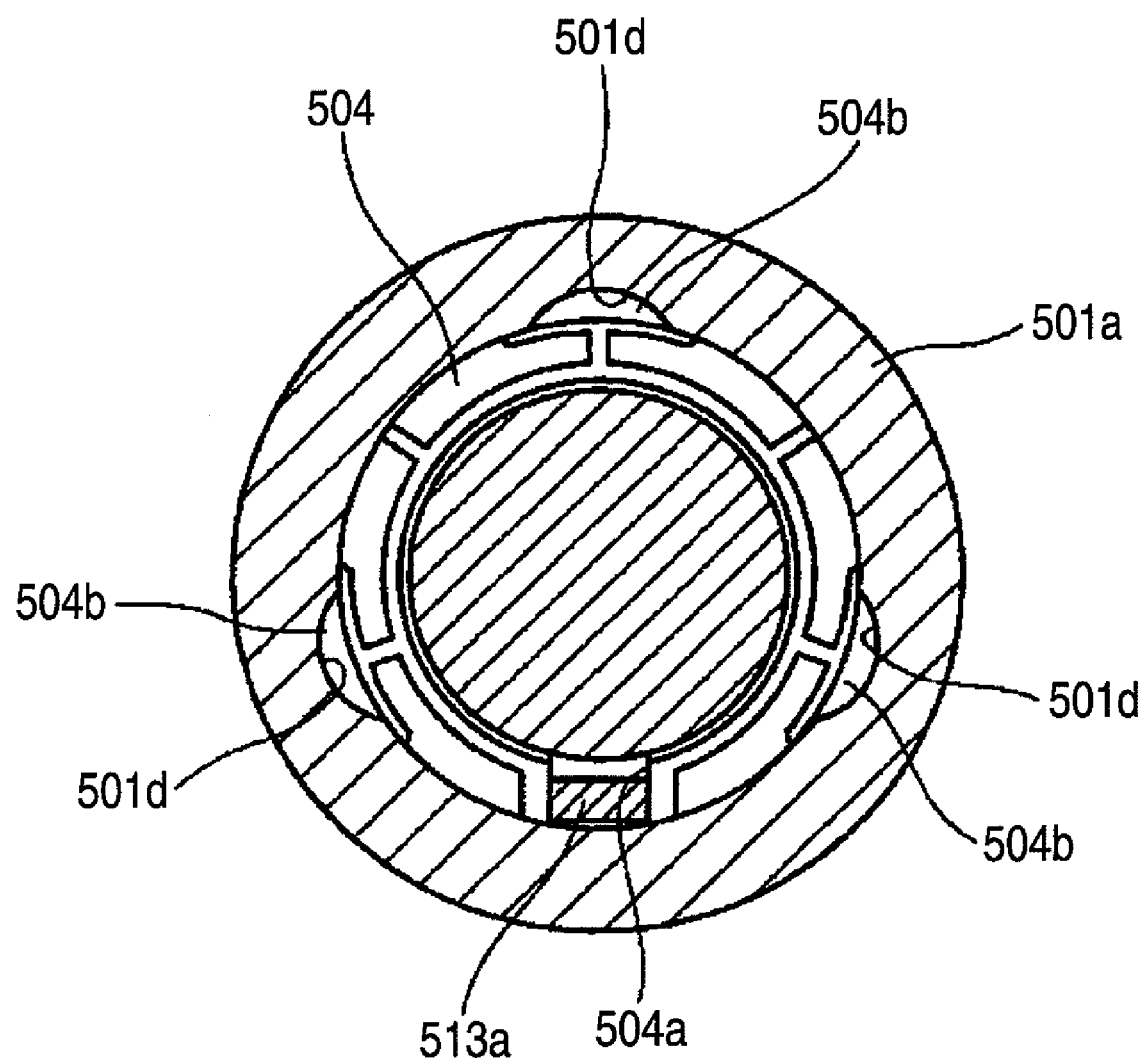
FIG. 16 is a view of the configuration in FIG. 15 sectioned along the line XVI-XVI and as seen in a direction indicated by arrows shown therein.
Figure 17:
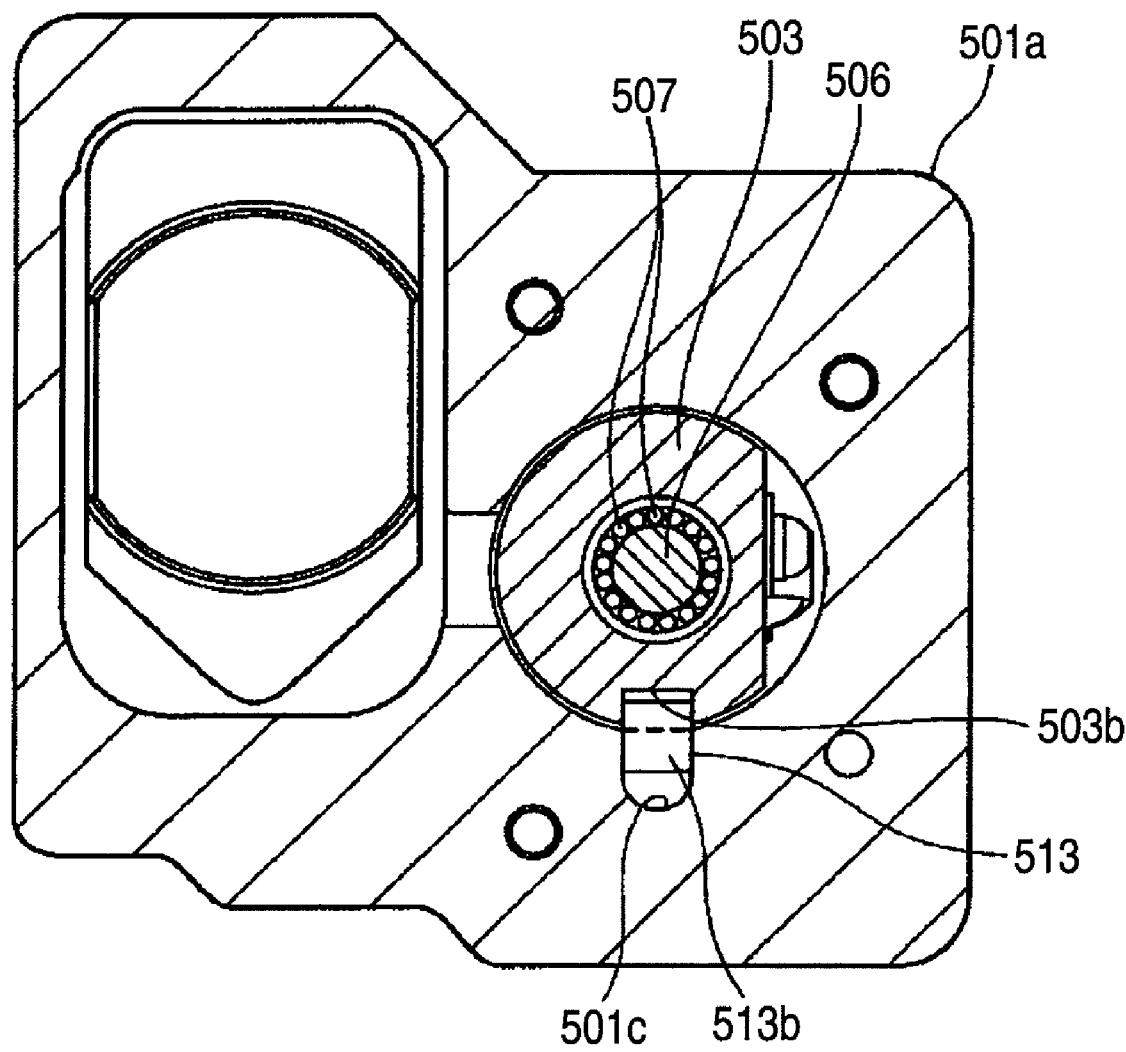
FIG. 17 is a view of the configuration in FIG. 16 sectioned along the line XVII-XVII and as seen in a direction indicated by arrows shown therein.

FIG. 15 is a view of the configuration of an actuator 600 according to the 1-5$^{th}$ embodiment taken in the position of an axis of a drive shaft and as viewed in a direction indicated by arrows. FIG. 16 is a view of the configuration in FIG. 15 sectioned along the line XVI-XVI and as seen in a direction indicated by arrows attached to the line. FIG. 17 is a view of the configuration in FIG. 15 sectioned along the line XVII-XVII and as seen in a direction indicated by arrows attached to the line.

In FIG. 15, a housing 501 is made up of a substantially hollow cylindrical main body 501a and a cup-shaped lid member 501b which is fixed in such a manner as to close one end of the main body 501a. A cylindrical drive shaft 502, which is a driven member, and a nut 503, which is coupled to the drive shaft 502, are disposed in an interior of the main body 501a which has a simple cylindrical inner circumference. The drive shaft 502 projects from the main body 501a at a left end thereof as viewed in the figure, and a tubular hole 502a is formed in a right end thereof as viewed in the figure. An outer circumference of the drive shaft 502 is slidably supported on the main body 501a by a bush 504. A seal member 505 which has a lip portion having a double lip construction is disposed adjacent to the bush 504, so as to establish a seal between the drive shaft 502 and the main body 501a to thereby suppress the infiltration of dust and the like from the outside.

A screw shaft 506 passes through an interior of the nut 503 and enters the tubular hole 502a in the drive shaft 502 in such a manner as to go deep into and out thereof. An externally threaded groove 506a is formed on an outer circumferential surface of the screw shaft 506. On the other hand, a groove 503b is formed on a lower surface of an outer circumference of the nut 503, which is disposed to surround the screw shaft 506, in such a manner as to extend along an axial direction, and an internally threaded groove 503a is formed on an inner circumferential surface of the nut 503. A plurality of balls 507 are disposed rollingly along a rolling path defined between both the threaded grooves 506a, 503a which confront each other. The nut 503 having a tubular ball recirculation member, the screw shaft 506, the ball 507 and a guide member 513, which will be described later, make up a ball screw mechanism.

A ball bearing 509 is disposed at an end portion of the main body 501a via a bearing spacer 508, so as to support rotatably the screw shaft 506. An outer ring of the ball bearing 509 is fixed to the bearing spacer 508 by a fixing member 510. On the other hand, an inner ring of the ball bearing 506 is fixed to the drive shaft 502 by a snap ring 511. Consequently, the drive shaft 502 is made to rotate relative to the main body 501a only. A gear 512 is coupled to the right end of the drive shaft 502 as viewed in the figure through serrations so as to rotate together with the drive shaft 502.

A rotational force whose speed is reduced via a plurality of gears is transmitted to the gear 512 by a motor (not shown) which is mounted on an inside of the lid member 501b.

In FIG. 15, the guide member 513, which is formed of a sheet metal material through pressing, has a rectilinear guide portion 513a which is in engagement with the groove 503b of the nut 503 and an engagement portion 513b which is bent at right angles to the guide portion 513a at a right end thereof as viewed in the figure. Furthermore, a groove-like recessed portion 501c is formed on a right end face of the main body 501a as viewed in FIG. 15 (refer to FIG. 17), and the engagement portion 513b engages with the recessed portion 501c which has the same width as that of the engagement portion 513b. A notch 504a is formed in a circumferential part of the substantially annular bush 504 (refer to FIG. 16), and a left end of the guide portion 513a as viewed in FIG. 15 engages with the notch 504a. In addition, as is shown in FIG. 17, projections 504b are formed on an outer circumference of the bush 504 in three locations and engage with corresponding depressions 501d which are formed on an inner circumferential surface of the main body 501a. Consequently, the bush 504 is prevented from rotating relative to the main body 501a.

A surface treatment may be applied to the surface of the guide portion 513a to reduce friction. As such surface treatments, a film forming treatment, a surface hardening treatment and the like can be considered. As the film forming treatment, for example, a formation of a film of phosphoric acid manganese salt or phosphoric acid zinc, a coating by molybdenum dioxide, and a formation of a calcined film by baking and plating of tin, zinc, silver, chrome (hard chrome) and other metals can be considered. In addition, as the surface hardening treatment, laser beam hardening, high-frequency hardening and shot peening can be considered.

When the operator operates a switch, not shown, since power is transmitted from the motor, not shown, and the gear 512 is driven to rotate, the screw shaft 506 rotates together with the gear 512. Here, since the nut 503 is guided smoothly only in the axial direction by the guide member 513 which exhibits a detent function, a rotational motion of the screw shaft 506 is transformed in an axial motion of the nut 503 with good efficiency, whereby the drive shaft 502 coupled to the nut 503 can be moved in the axial direction.

In assembling, the guide member 513 is inserted from the right end of the main body 501a to which the bush 504 has been assembled, and a distal end of the guide member 513a is inserted in the notch 504a, the bent engagement portion 513b being brought into engagement with the recessed portion 501c of the main body 501a. According to this configuration, the guide member 513 can easily be mounted on the main body 501a without using any special tool. Thereafter, the nut 503 and the drive shaft 502 are inserted into the main body 501a in such a manner that the guide portion 513a engages with the groove 503b, and the screw shaft 506 and the like may only have to be assembled.

In particular, in the case of the guide portion 513b being long, in the event that the guide member 513 is supported only at one end, torsion is generated at the other end of the guide member 513 which is not supported, leading to a fear that the detent function becomes insufficient. To deal with this, according to the invention, the distal end of the guide portion 513a is brought into engagement with the notch 504a of the bush 504, whereby since both the ends of the guide member 513 can be fixed to the main body 501a, even in the event that the guide portion 513a is long, the torsion thereof can be suppressed so as to realize an effective detent function.

According to this embodiment, by providing the guide member 513, the inner circumference of the main body 501a of the housing 501 can be made into the simple circle, and there is no need to provide any projection on the nut 503, thereby making it possible to realize the effective detent function at low costs.

Second Embodiment

Hereinafter, a second embodiment of the invention will be described using FIGS. 18 to 27.

Reference numerals resulting from adding 1000 to the reference numerals used in the first embodiment will be given to constituent members of the second embodiment which correspond to those of the first embodiment. In addition, when members of the second embodiment are similar to those of the first embodiment as with the outboard engine 2 of the first embodiment and an outboard engine 1002 of the second embodiment, the detailed description thereof will be omitted.

2-1st Embodiment

Figure 18:
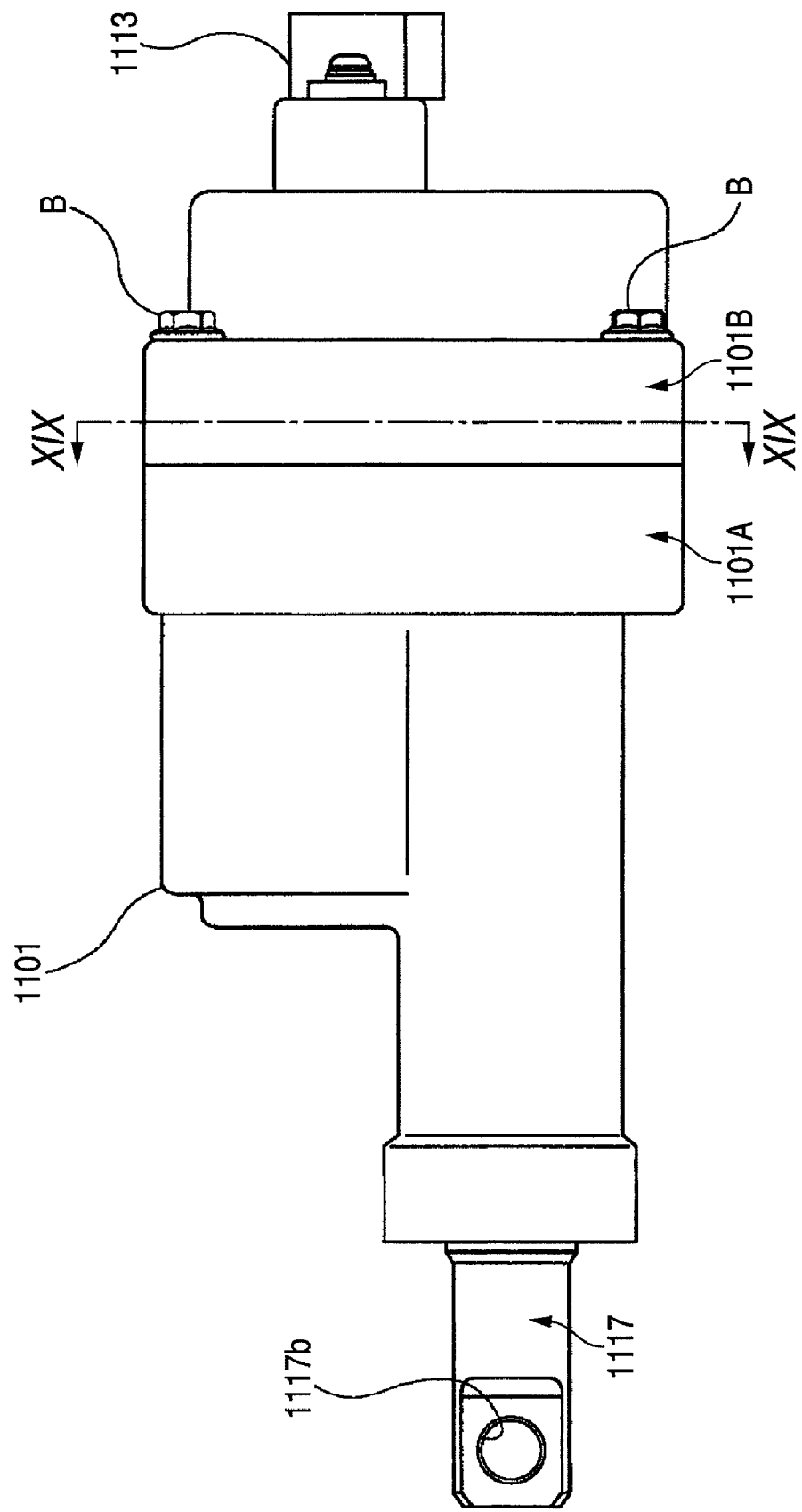
FIG. 18 is a front view of an actuator according to a 2-1$^{st}$ embodiment.
Figure 19:
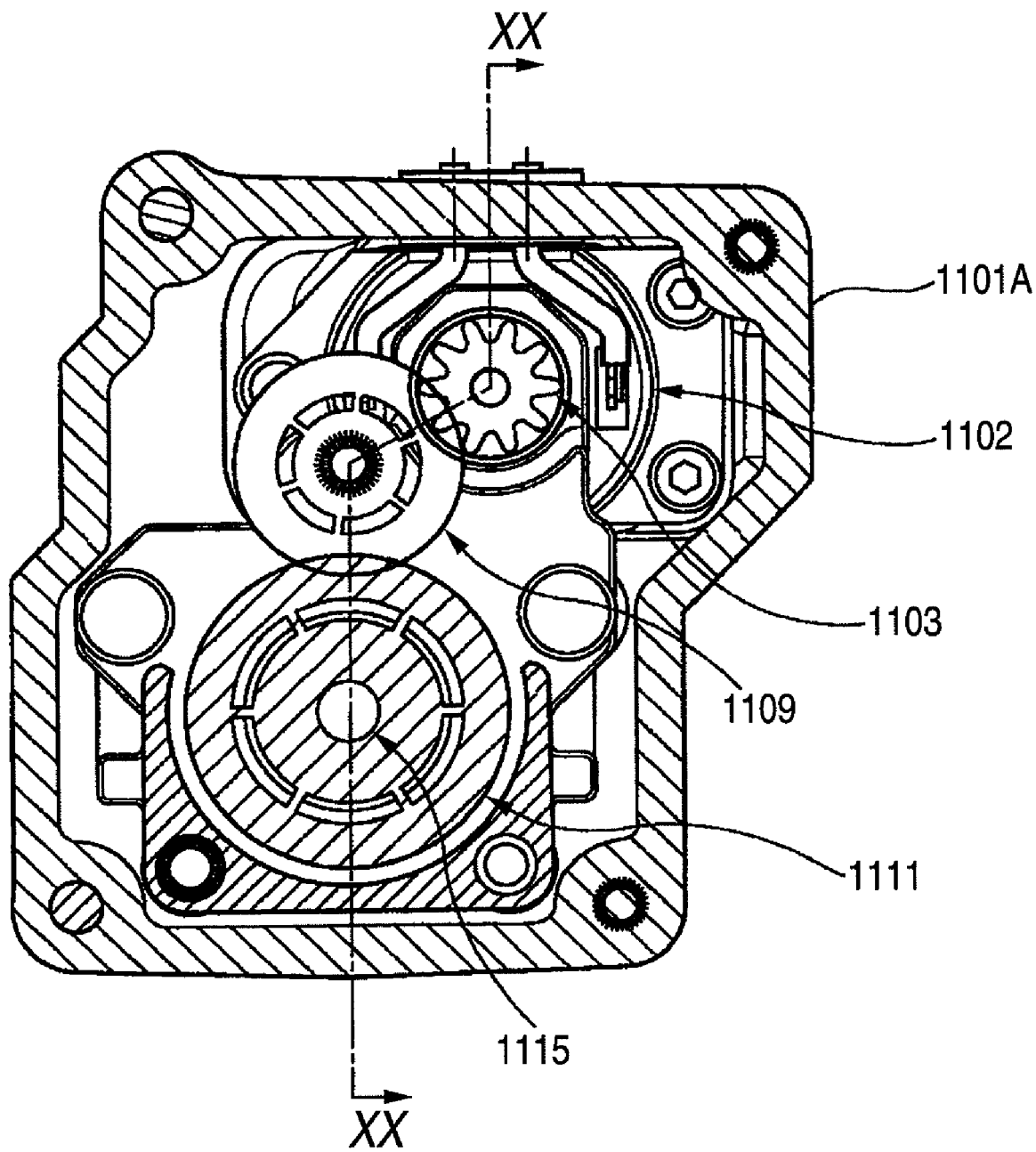
FIG. 19 is a view of the actuator in FIG. 18 as seen in a direction indicated by arrows XIX shown therein.

Hereinafter, a 2-1st embodiment of the invention will be described based on FIGS. 18 to 20.

In the 2-1st embodiment, a second gear 1105 made of resin is rotatably disposed on a circumference of a long shaft 1104 which is planted in a motor bracket 1101C, and this gear meshes with a first gear 1103 and a large gear portion 1106a of a third gear 1106.

A potentiometer 1113 of the 2-1st embodiment is fittingly disposed in a hole 1101d of a cover member 1101B and is fixed with machine screws SB (FIG. 19), and its measuring shaft 1113a is coupled to a sixth gear 1112 in such a way as to rotate together therewith. A distal end of the long shaft 1104 which extends in a cantilever-like fashion is supported by the potentiometer 1113 via the sixth gear 1112 and the measuring shaft 1113a or is supported by the hole 1101d. The potentiometer 1113 is such as to detect the angle of the measuring shaft 1113a over a predetermined range (for example, 90 degrees) with good accuracy. Here, the first gear 1102, the second gear 1105 made of resin, the third gear 1106 and a fourth gear 1109, a fifth gear 1111 and the sixth gear 1112 make up a second power transmission mechanism. The cover member 1101B has a function as a gear cover which implements an airtight closure so as to prevent the infiltration of foreign matters into the respective gears. In addition, when resin materials of the meshing gears are made different, wear and tear can preferably be suppressed.

A left end of a screw shaft 1107 enters an interior of a tubular hole 1117a formed in a round rod-like drive shaft 1117. A right end of the drive shaft 1117 as viewed in the figure fits in a nut 1115 concentrically and is coupled thereto with a pin or a cotter so as to move together therewith. The drive shaft 1117 is supported in a screw shaft compartment 1101b of a housing main body 1101A by a support member 1118 in such a manner as to move in an axial direction.

Figure 20:
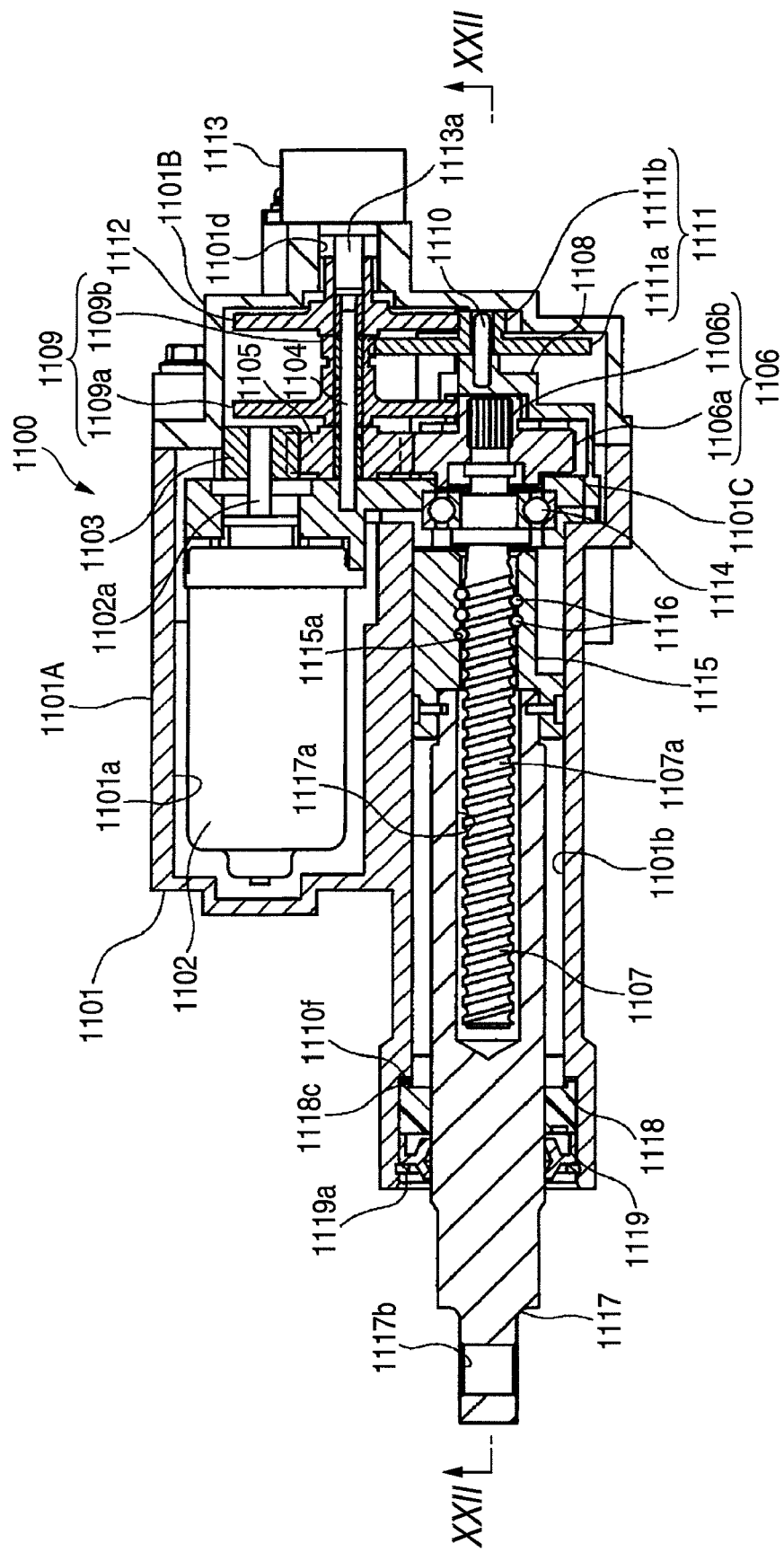
FIG. 20 is a view of the configuration in FIG. 19 sectioned along the line XX-XX and as seen in a direction indicated by arrows shown therein.
Figure 21A:
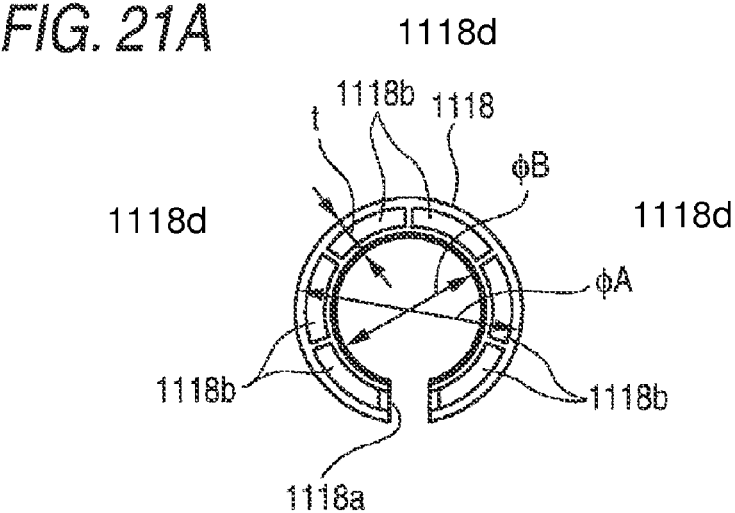
FIG. 21A is a front view of a support member 1118.
Figure 21B:
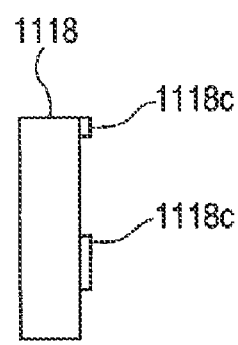
FIG. 21B is a side view of the support member 1118.
Figure 21C:
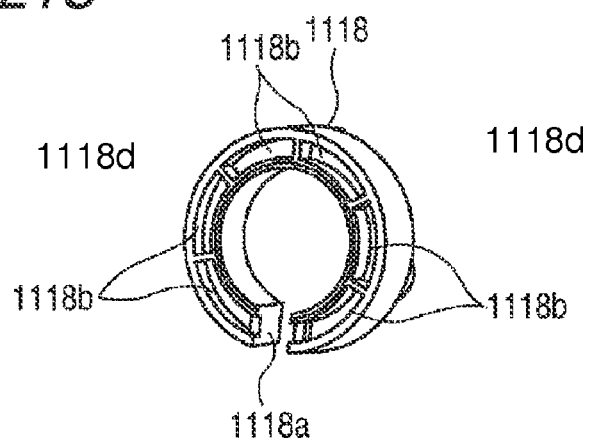
FIG. 21C is a perspective view of the support member 1118.

FIG. 21A is a front view of the support member 1118, FIG. 21B is a side view of the support member 1118, and FIG. 21C is a perspective view of the support member 1118. In FIG. 21, the support member 1118 is formed from resin through injection molding into an annular shape as a whole which is partially cut out in a circumferential part 1118a, thus the support member 1118 being actually formed into a C-shape. In addition, a plurality of recessed portions 1118b are disposed on both axial end faces of the support member 1118 in a circumferential direction at equal intervals as reducing the thickness thereof in such a manner as to be separated from each other via thin walls (ribs) 1118d, thereby making it possible to suppress the occurrence of sink marks (shrinkage) on the surface of the material when it is cooled after it has been injection molded. Furthermore, a portion lying between the axially aligned recessed portions 1118b is formed into a central thin wall (a rib), whereby the effect of sink mark is suppressed from appearing on both the ends of the support member by allowing sink marks (shrinkage) that are generated in the support member when it is cooled after having been injection molded to concentrate on a center in the axial direction, so that the thickness of the support member 1118 at the ends thereof can be made to match or fall within a permissible range. Even though the center of the support member 1118 is expanded diametrically, in the event that both the ends thereof are formed with good accuracy, the support member 1118 can hold the drive shaft 1117 with good accuracy when it is assembled on to a housing 1101. In addition, projections 1118c are provided on one of the axial end faces in such a manner as to fit in corresponding depressions 1110f (refer to FIG. 20) on the screw shaft compartment 1101b of the housing main body 1101A to thereby implement a detent function.

An outside diameter of the support member 1118 when it is in its free state is φA, and an inside diameter thereof in its free state is φB. Consequently, a radial thickness t of the support member 1118 is t□(φA−φB)/2. However, only the thickness t can be made to match or fall within the permissible range with good accuracy without depending upon the diameter.

In FIG. 20, a seal 1119 is disposed leftwards (outwards) of the support member 1118 and is fixed in place by a snap ring 1119a which engages with the housing main body 1101A, whereby the infiltration of foreign matters such as sea water or dust from a gap between the housing main body 1101A and the drive shaft 1117 is prevented. In addition, a hole 1117b is formed in an end portion of the drive shaft 1117 which projects from the housing main body 1101A for coupling to a link member 1011.

Since the operation of the 2-1st embodiment is similar to the operation of the aforesaid first embodiment, the description thereof will be omitted here.

According to the this embodiment, the drive shaft 1117 is slidably supported by the annular support member 1118 which fits in part of an inner circumference of the screw shaft compartment 1101b of the housing main body 1101A which is expanded diametrically further than the other part, and the support member 1118 is interrupted in the part (1118a) in the circumferential direction. Therefore, even though both the outside diameter φA and the inside diameter φB of the support member 1118 are not made to be particular values which are determined by the elastic property that the material used possesses, the support member 1118 can be made to follow along an inside diameter of the screw shaft compartment 1101b which has a relatively large rigidity. Consequently, in the event that the screw shaft compartment 1101b is formed with good accuracy, the position of the center of the drive shaft 1117 which is to be received in the center of the inside diameter of the screw shaft compartment 1101b is determined only by the thickness t which is a difference between the outside diameter φA and the inside diameter φB of the support member 1118 when it is in its free state. Consequently, in forming the support member 1118, it is good enough to control only the thickness t which is the difference between the outside diameter φA and the inside diameter φB, the control being far easier than the restraining conditions on outside diameter dimension φA, inside diameter dimension φB and concentricity of both the dimensions, and this eventually enables the manufacturing of an inexpensive support member 1118.

In particular, when the support member 1118 is made of a resin member which is injection molded, a further advantage can be expected. More specifically speaking, in resin injection molding, although a drawback is easy to be produced that the dimensions of a molded article are not stable due to a sink mark that is produced when the molded article is set, since the thickness of the thick portion of the support member 1118 only has to be controlled, the support member 1118 has the advantage that the diameter of the support member 1118 after it has been injection molded does not have to be controlled with good accuracy. Consequently, it becomes possible to mass produce support members 1118, and furthermore, by exhibiting the advantage of flexibility that resin possesses inherently, the support member 1118 implements the alignment in center of the drive shaft 1117 with the inside diameter of the screw shaft compartment 1101b with good accuracy.

Furthermore, in the event that the support member 1118 is formed from a material having low water absorbing properties, since a possible dimensional expansion due to water absorption does not have to be taken into consideration, an initial gap can be reduced by a margin that would otherwise have to be given for expansion due to water absorption, and such a reduction can eventually be made to contribute to the enhancement of sealing performance. This is especially effective with respect to actuators for use in boats. Note that as an example of a material having low water absorbing properties, polyacetal resin or the like can be raised.

2-2$^{nd}$ Embodiment

Next, a 2-2$^{nd}$ embodiment will be described using FIGS. 22, 23. Like reference numerals will be given to like constituent members to those described in the 2-1$^{st}$ embodiment, and the detailed description thereof will be omitted.

Figure 23:
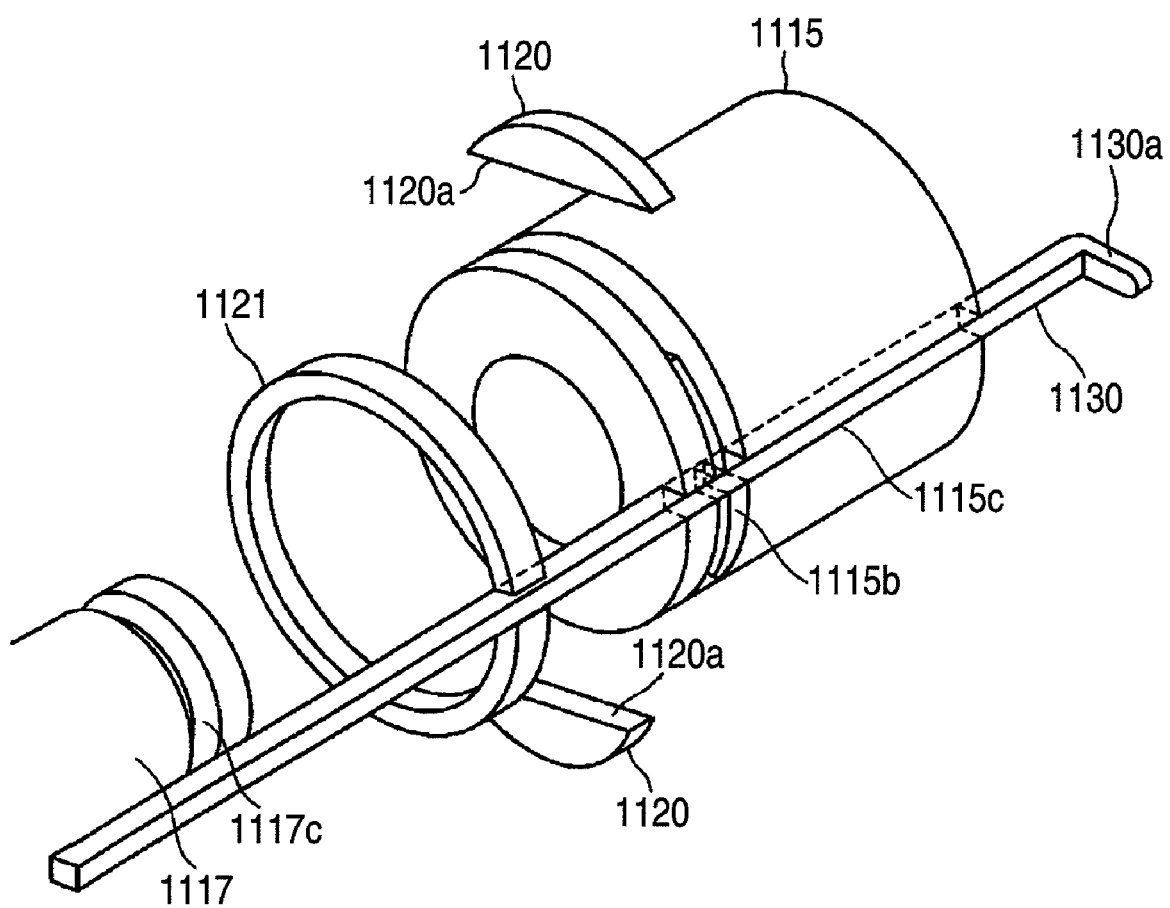
FIG. 23 is an exploded view of a nut 1115 and a drive shaft 1117.

In FIG. 23, a circumferential groove 1115b which extends in a circumferential direction and a longitudinal groove 1115c which extends in a longitudinal direction are formed on an outer circumference of a nut 1115. A bottom of the circumferential groove 1115b is formed into a shape in which two parallel sides which hold an axis therebetween are cut out, whereby through grooves (not shown) which establish a communication between the circumferential groove 1115b and an inner circumferential surface of the nut 1115 are formed. On the other hand, a circumferential groove 1117c is formed on a drive shaft 1117 in the vicinity of an end portion thereof as a hooking groove. Note that the inner circumferential surface of the nut 1115 and an outer circumferential surface of the drive shaft 1117 have dimensions which enable fitting through centering location.

In assembling, the end portion of the drive shaft 1117 is inserted into the nut 1115, and in such a state that the through grooves, not shown, are positioned radially outwards of the circumferential groove 1117c, semicircular plate-like cotters 1120, 1120 are inserted into the circumferential groove 1115b from above and blow. Then, flat surface portions 1120a, 1120a of the cotters 1120, 1120 pass through the through grooves to project from the inner circumferential surface of the nut 1115 so as to be brought into engagement with the circumferential groove 1117c of the drive shaft 1117, whereby the nut 1115 and the drive shaft 1117 are coupled together in the axial direction with their circumferential phases made to match so as to move integrally.

Thereafter, a C-shaped holding member 1121, which results by cutting out part of a ring, is fitted in the circumferential groove 1115b of the nut 1115 while being elastically deformed in such a manner as to open the cut-out so made therein, whereby the cotters 1120, 1120 are held to be fixed in place by an inner circumference of the holding member 1121 in such a state that the cotters 1120, 1120 are disposed in the corresponding through grooves, thus the cotters 1120, 1120 being prevented from being dislocated from the circumferential groove 1115b. In the event that the holding member 1121 is formed from a resin which has superior sliding properties and is made to have an outside diameter which is slightly larger than an outside diameter of the nut 1115 in such a state that the holding member 1121 is fitted in the circumferential groove 1115b of the nut 1115, since the holding member 1121 is allowed to slide relative to an inner circumference of a housing main body 1101A when the nut 1115 moves, the contact of metals can be avoided so as to reduce abrasion wear and dragging torque.

Figure 22:
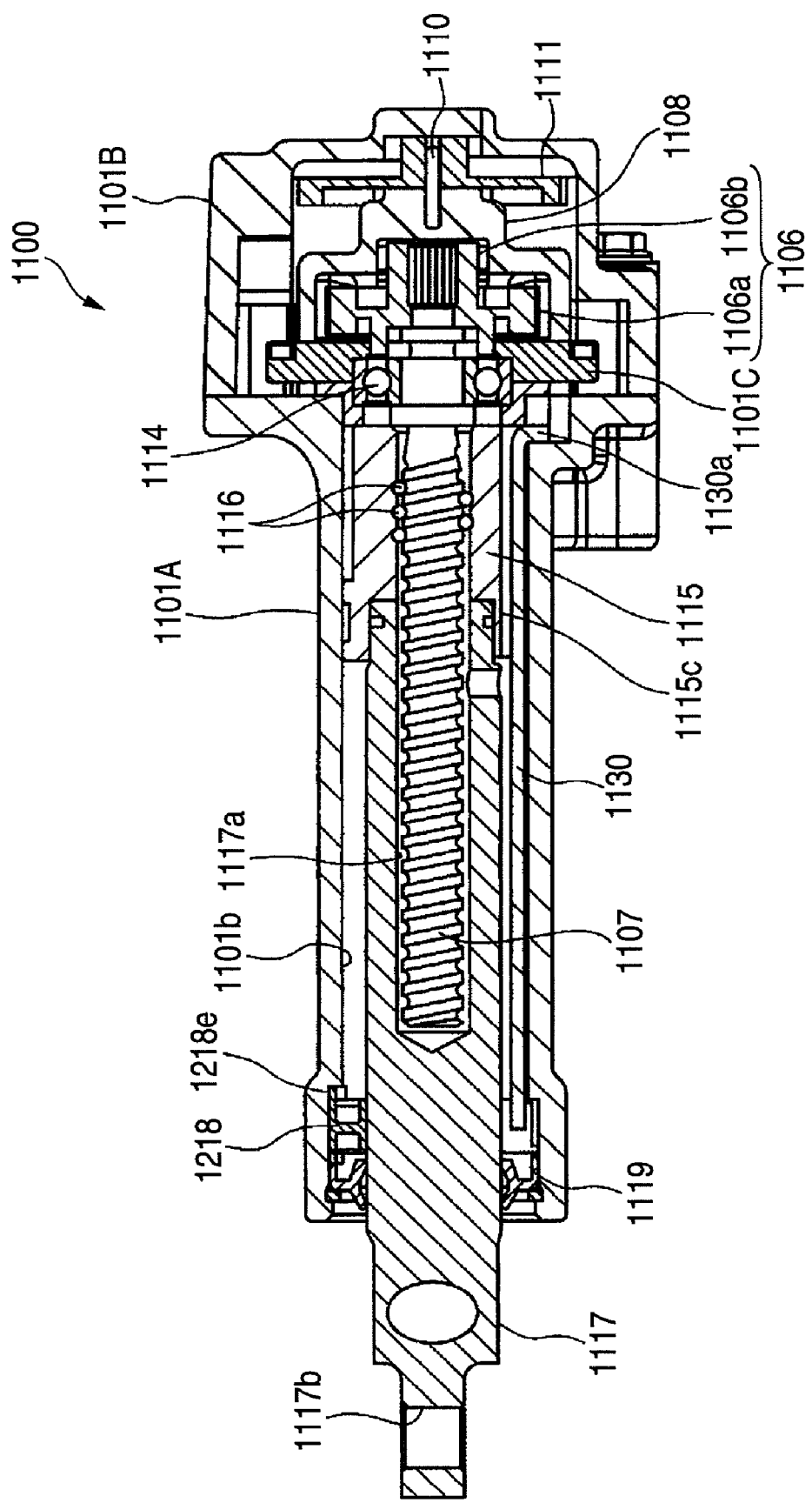
FIG. 22 is a view of a configuration according to a 2-2$^{nd}$ embodiment sectioned along the line XXII-XXII in FIG. 20 and as seen in a direction indicated by arrows shown therein.

On the other hand, as is shown in FIG. 23, an angular pillar-like detent member 1130 which is bent at one end to have a hook portion 1130a is, as is shown in FIG. 22, inserted along an inner circumference of a screw shaft compartment 1101b of a housing 1101 and the hook portion 1130a is brought into engagement with a recessed portion (not shown) on the housing 1101, whereby the detent member 1130 is fixed to the housing 1101 at the one end thereof. In such a state, a distal end of the detent member 1130 projects outwards from the screw shaft compartment 1101b.

Furthermore, in assembling the nut 1115 which is coupled to the drive shaft 1117, the longitudinal groove 1115c and the cut-out of the holding member 1121 are aligned with each other, and the nut 1115 is then inserted into the screw shaft compartment 1101b while being guided by the detent member 1130 (refer to FIG. 23), whereby the nut 1115 is enabled to slide in the axial direction relative to the housing 1101 but is disabled from rotating relative thereto.

2-3$^{rd}$ Embodiment

Figure 24:
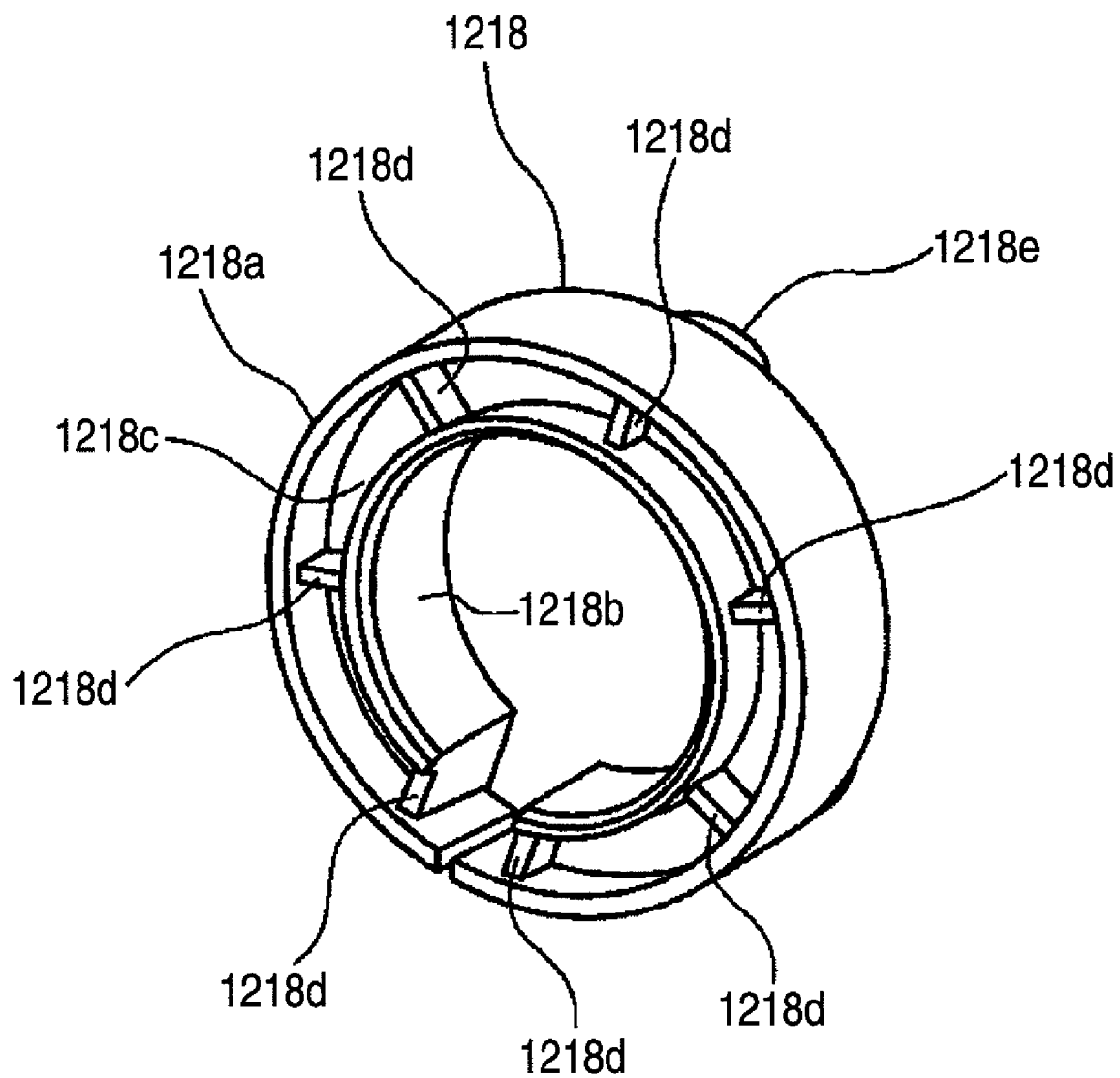
FIG. 24 is a perspective view of a support member 1218 according to a 2-3$^{rd}$ embodiment.
Figure 25E:
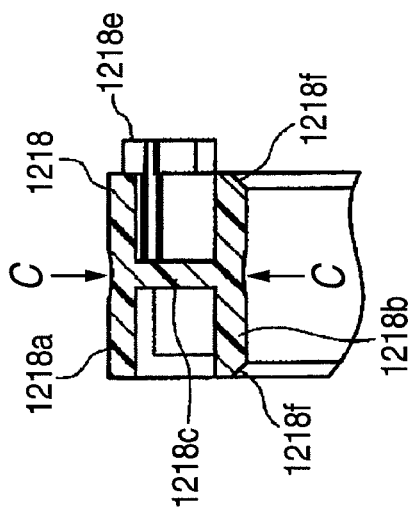
FIG. 25E is an enlarged view of a portion in FIG. 25D indicated by an arrow XXV_E shown therein.
Figure 25D:
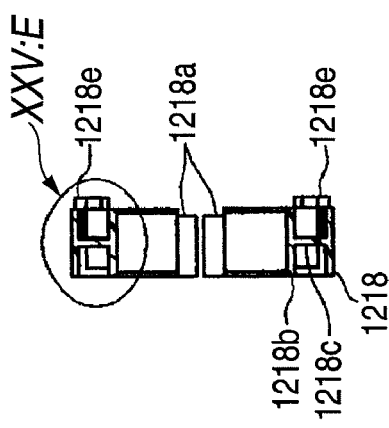
FIG. 25D is a view of the support member 1218 in FIG. 25B sectioned along the line XXV_D-XXV_D and as seen in a direction indicated by arrows shown therein.
Figure 25B:
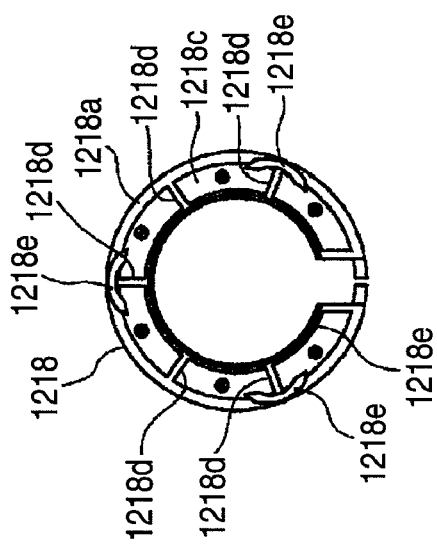
FIG. 25B is a side view of the support member 1218.
Figure 25C:
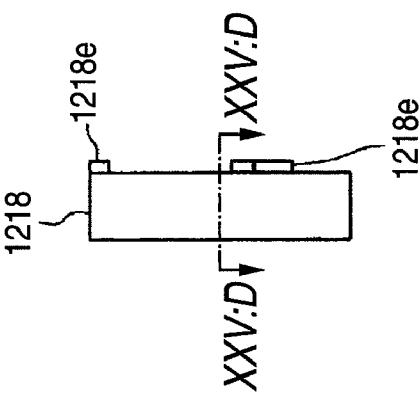
FIG. 25C is a back view of the support member 1218.
Figure 25A:
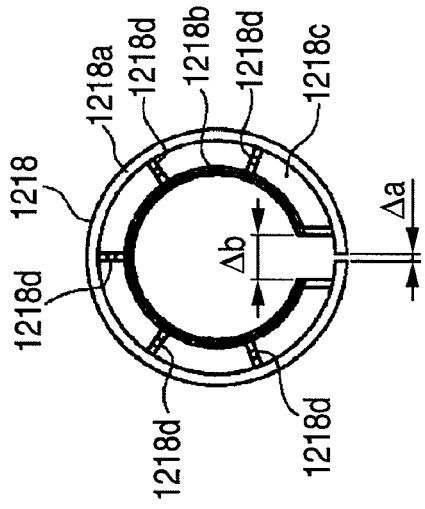
FIG. 25A is a front view of the support member 1218.

Next, using FIGS. 24 to 25E, a support member 1218 according to a 2-3$^{rd}$ embodiment will be described. FIG. 24 is a perspective view of a support member 1218 according to the 2-3$^{rd}$ embodiment. FIG. 25A is a front view of the support member 1218. FIG. 25B is a side view of the support member 1218. FIG. 25C is a back view of the support member 1218. FIG. 25D is a view of the support member 1218 in FIG. 25B sectioned along the line XXV_D-XXV_D and as viewed in a direction indicated by arrows shown therein. FIG. 25E is an enlarged view of the support member 1218 in FIG. 25D as viewed in a direction indicated by an arrow IXXV_E.

The support member 1218 is made up by integrally including:

an outer tubular portion 1218a;

an inner tubular portion 1218b which is surrounded by the outer tubular portion 1218a;

a disc-shaped central wall portion 1218c which couples an inner circumference of the outer tubular portion 1218a and an outer circumference of the inner tubular portion 1218b together in a central or intermediate position therebetween;

vertical wall portions 1218d which extend in an axial direction while being spaced apart from each other at equal intervals in a circumferential direction so as to couple together the inner circumference of the outer tubular portion 1218a and the outer circumference of the inner tubular portion 1218b; and three arc-shaped projections 1218e which extend in the axial direction from one side of the outer tubular portion 1218a of the support member 1218 while being spaced apart from each other at equal intervals in the circumferential direction.

While the outer tubular portion 1218a, the inner tubular portion 1218b and the central wall portion 1218c are interrupted in a circumferential part thereof, an interruption amount Δa of the outer tubular portion 1218a is made smaller than an interruption amount ΔB of the inner tubular portion 1218b and the central wall portion 1218c, as is shown in FIG. 25A. In addition, as is shown in FIG. 25D, abutment ends of the outer tubular portion 1218a are recessed slightly from an end face on a side where the projections 1218e are provided.

According to the configuration, when the support member 1218 is constricted diametrically in an attempt to be assembled in a housing 1101, since both the ends of the outer tubular portion 1218a are brought into abutment with each other earlier than the inner tubular portion 1218b and the central wall portion 1218c, a further constriction of the support member 1218 is suppressed, whereby the insertion of a drive shaft 1117 is facilitated. After the assemblage, a distal end of a detent member 1130 which extends as far as a center of the support member 1218 is positioned radially further inwards than the abutment ends of the outer tubular portion 1218*a* and between the abutment ends of the inner tubular portion 1218*b* and the central wall portion 1218*c* (refer to FIG. 22).

According to the 2-3$^{rd}$ embodiment, since the vertical wall portions 1218*d* are provided which extend in the axial direction while being space apart from each other at equal intervals in the circumferential direction so as to couple together the outer tubular portion 1218*a* and the inner tubular portion 1218*b*, the occurrence of sink marks (shrinkage) can be suppressed which would otherwise be generated in the support member 1218 when it is cooled after having been injection molded. Furthermore, since the central wall portion 1218*c* is provided which couples together the outer tubular portion 1218*a* and the inner tubular portion 1218*b* at the central or intermediate position therebetween, as is shown in FIG. 25E, shrink marks (shrinkage) C that occur in the support member 1218 when it is cooled after having been injection molded can be made to concentrate on the axially central position of the support member 1218, whereby the effect of sink marks so generated is prevented from appearing on both the ends of the support member 1218, thereby making it possible for the thickness at the end portions of the support member 1218 to match or fall within the permissible range. Even though the support member 1218 is expanded diametrically in the center thereof, in the event that both the ends thereof are formed with good accuracy, the drive shaft 1117 can be held with good accuracy when the support member 1218 is assembled to the housing 1101.

Furthermore, as is shown in FIG. 25E, since the inner tubular portion 1218*b* has chambered portions at inner circumferential end portions thereof, the insertion of the drive shaft 1117 is facilitated, and a smooth operation thereof can be implemented. The arc-shaped projections 1218*e* engage with corresponding shallow recessed portions on a housing main body 1101A when the support member 1218 is assembled on to the housing main body 1101A, whereby a detent function is implemented to prevent a rotation of the support member 1218 relative to the housing main body 1101A.

In addition, edges of the abutment ends of the outer tubular portion 1218*a* may each be parallel to the axis as is shown in FIG. 26A or be inclined at the same angle relative to the axis as is shown in FIG. 26B.

Figure 27A:
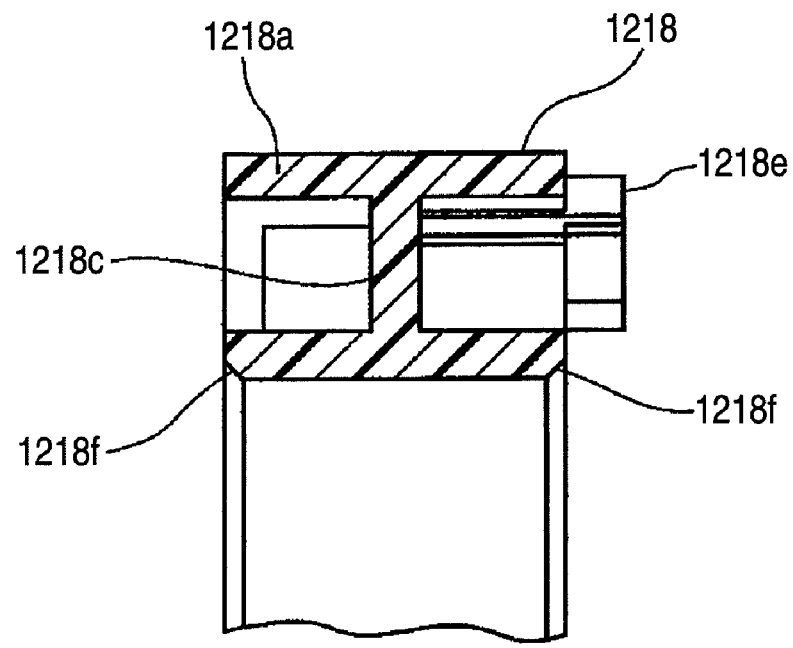
FIG. 27A is a diagram showing an example of the shape of a chamfered portion of an inner circumference of an end portion of an inner tubular portion 1218b.
Figure 27B:
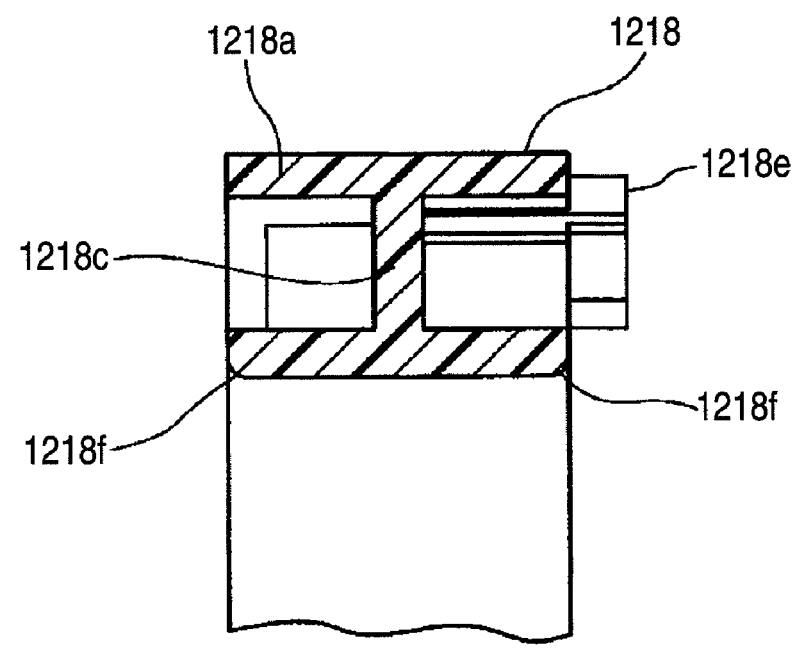
FIG. 27B is a diagram showing another example of the shape of a chamfered portion of the inner circumference of the end portion of the inner tubular portion 1218b.

Furthermore, the chamfered portions 1218*f* on the inner circumference of the end portions may be formed into a circular conical surface as is shown in FIG. 27A or be formed into an outwardly concaved curved surface.

Third Embodiment

Hereinafter, 3-1$^{st}$ to 3-4$^{th}$ embodiments of the invention will be described based on the drawings.
In addition, reference numerals resulting from adding 2000 to the reference numerals used in the first embodiment will be given to constituent members of a third embodiment which correspond to those of the first embodiment. In addition, when members of the third embodiment are similar to those of the first embodiment as with the outboard engine 2 of the first embodiment and an outboard engine 2002 of the third embodiment, the detailed description thereof will be omitted.

3-1$^{st}$ Embodiment

Figure 28:
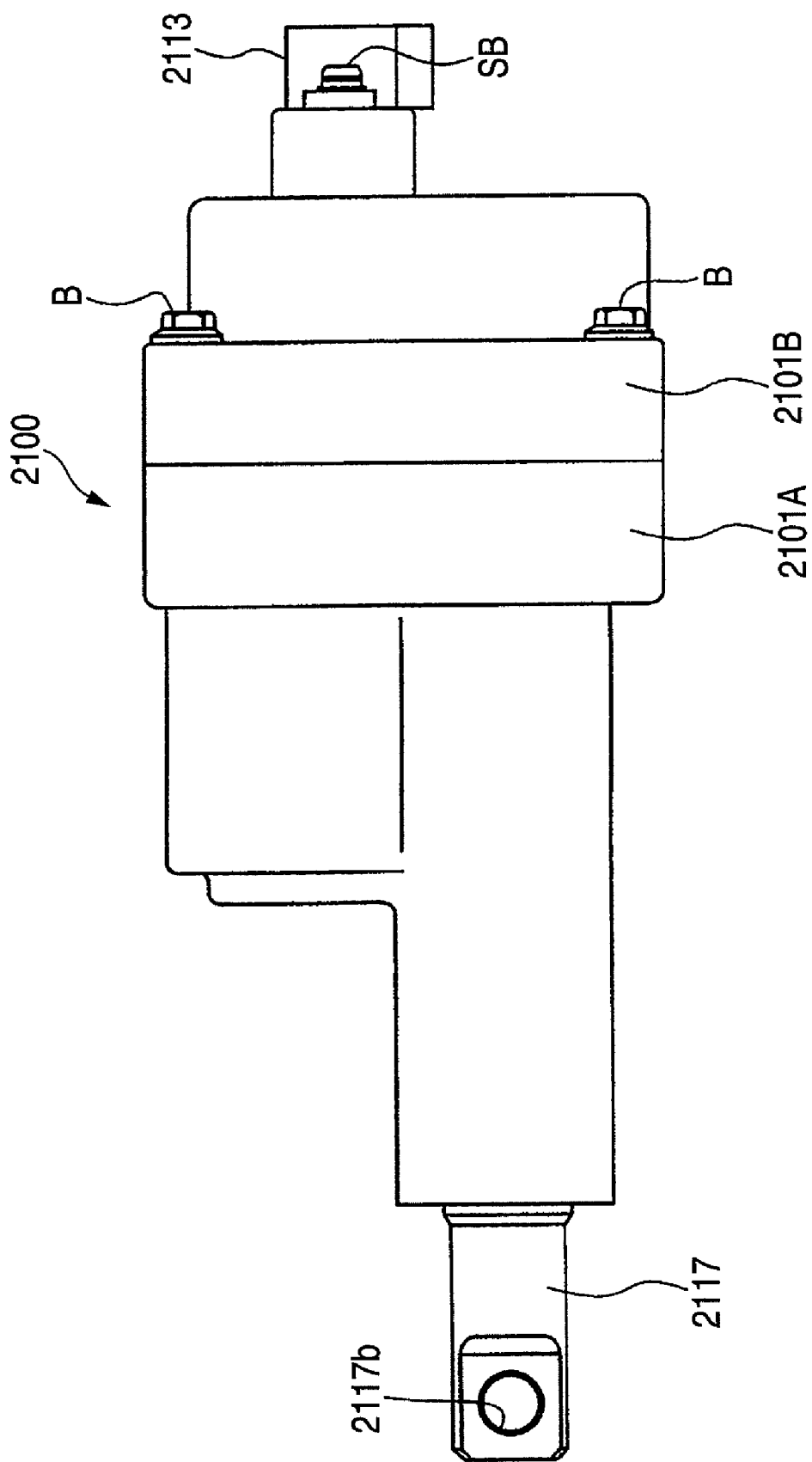
FIG. 28 is a front view of an actuator of a 3-1$^{st}$ embodiment.
Figure 29:
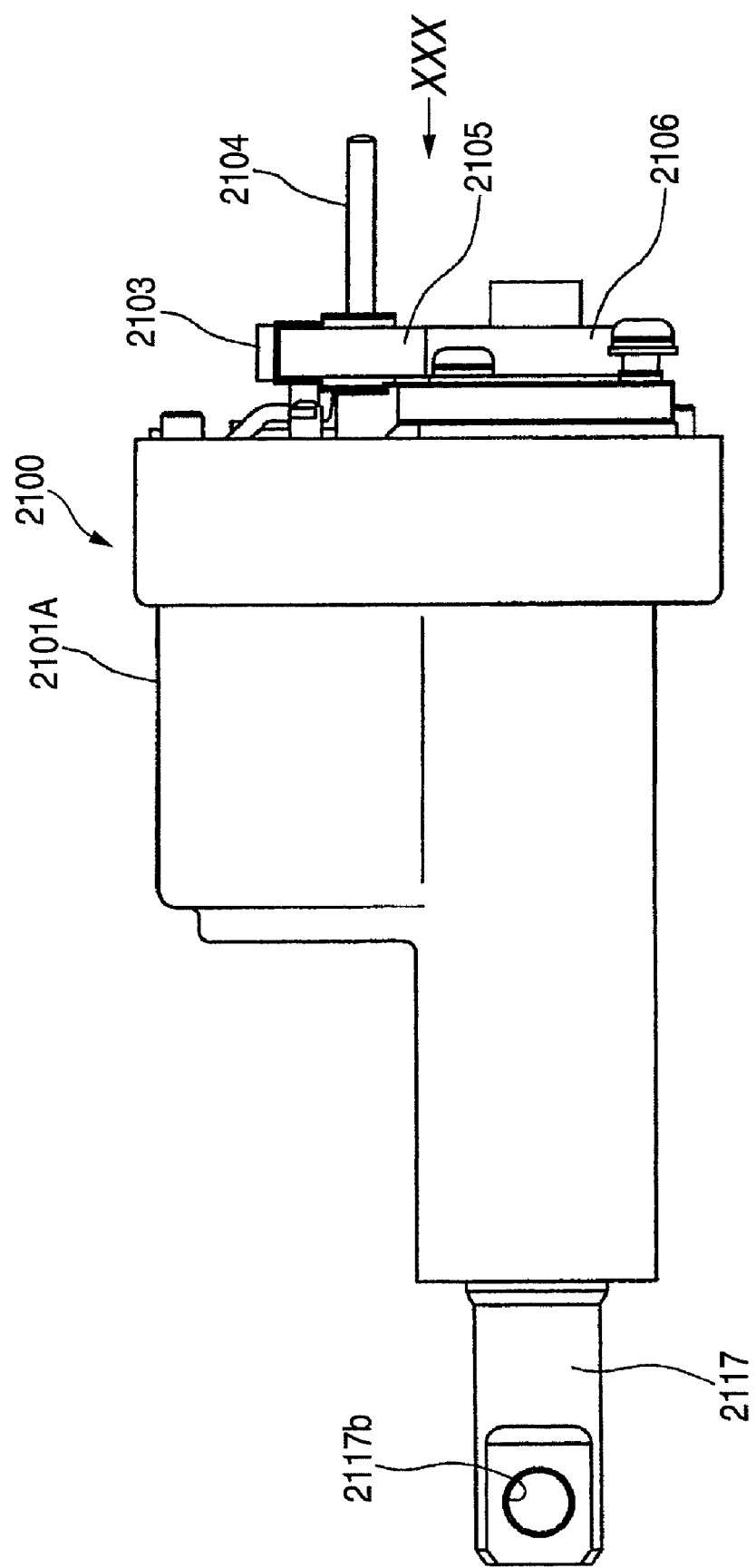
FIG. 29 is a front of the actuator in FIG. 28 with a cover member removed.
Figure 30:
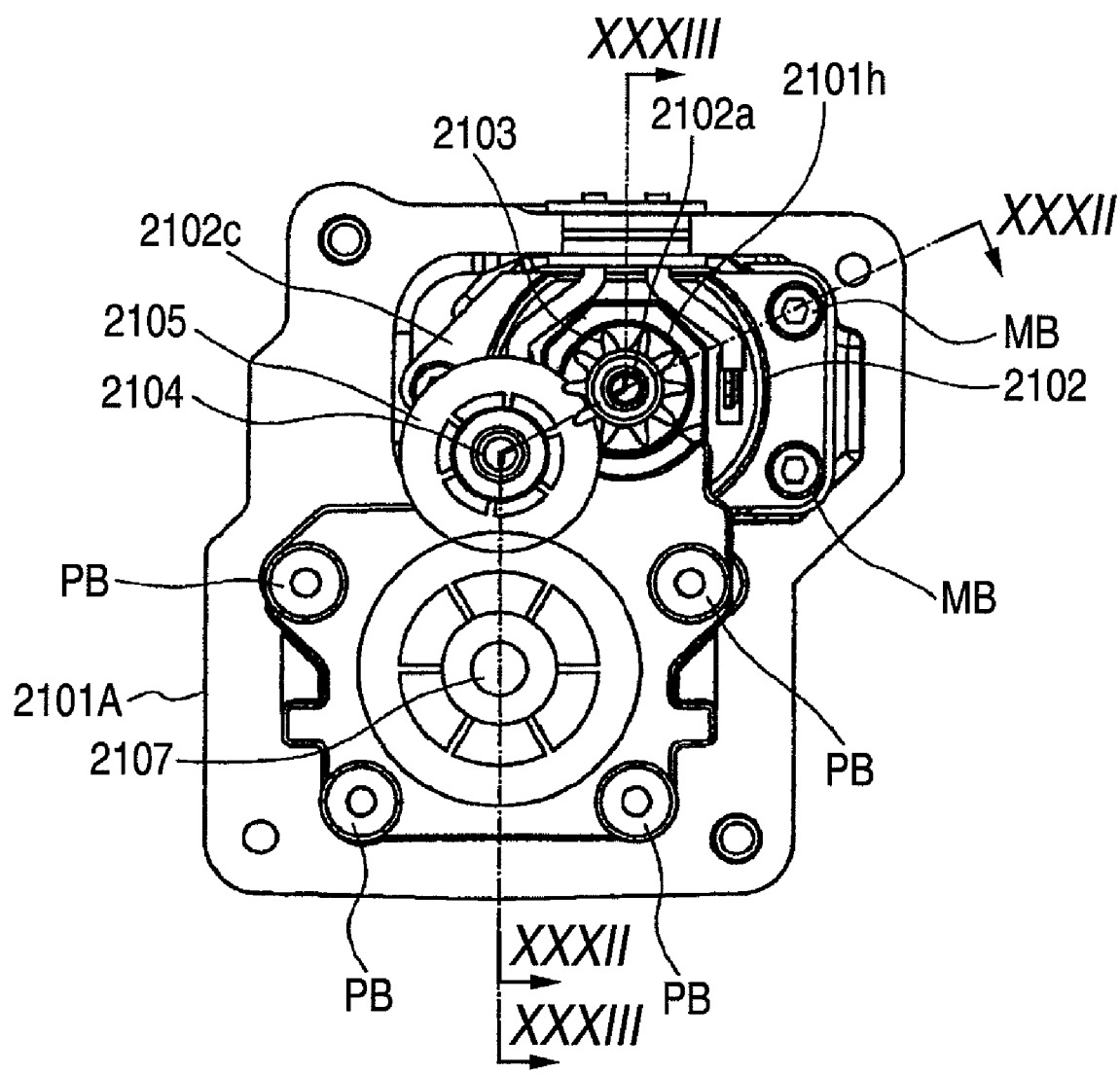
FIG. 30 is a view of the actuator in FIG. 29 as seen in a direction indicated by arrows XXX shown therein.
Figure 31:
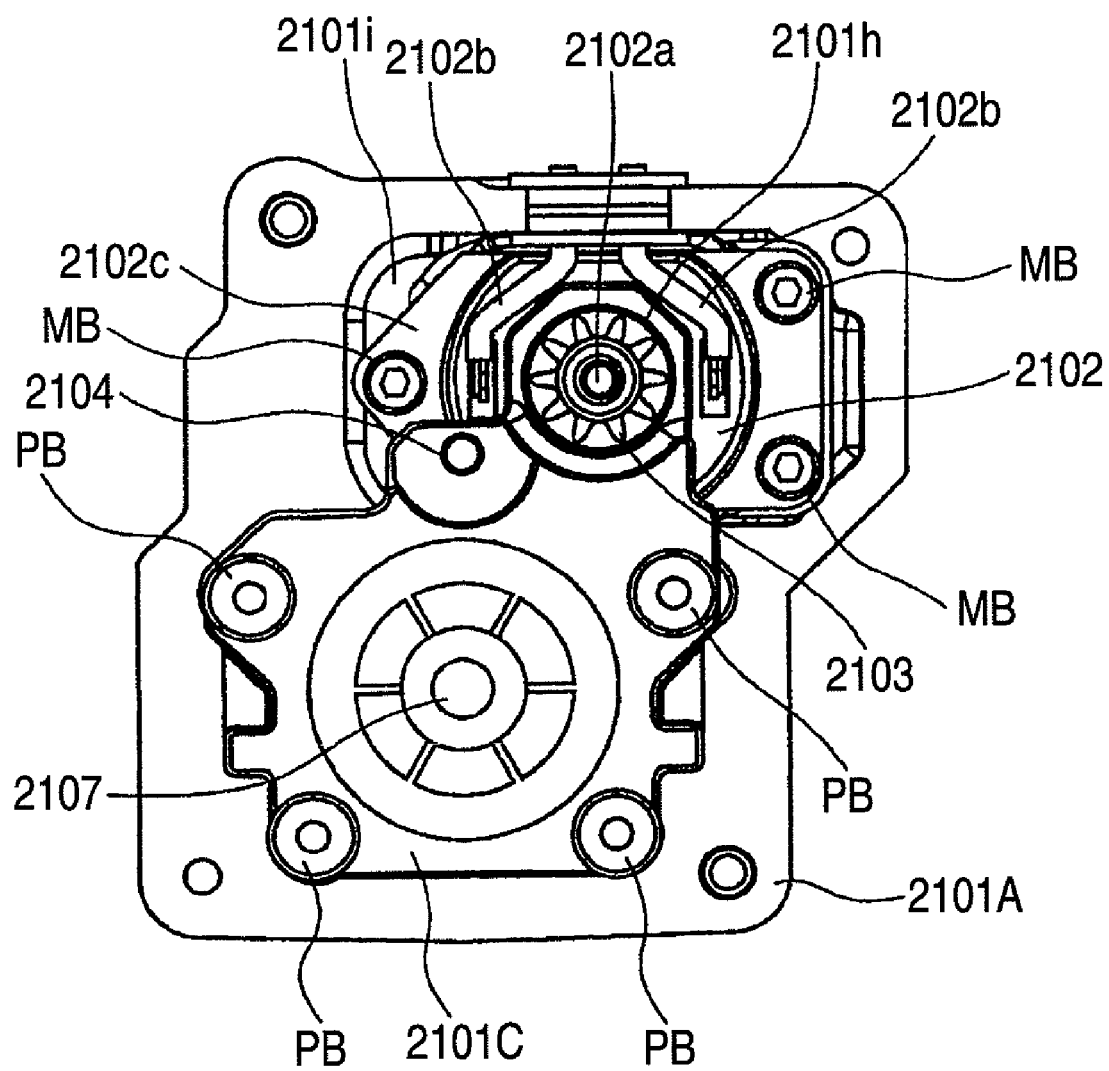
FIG. 31 is a diagram showing a state in which a second gear is removed from the configuration in FIG. 30.
Figure 32:
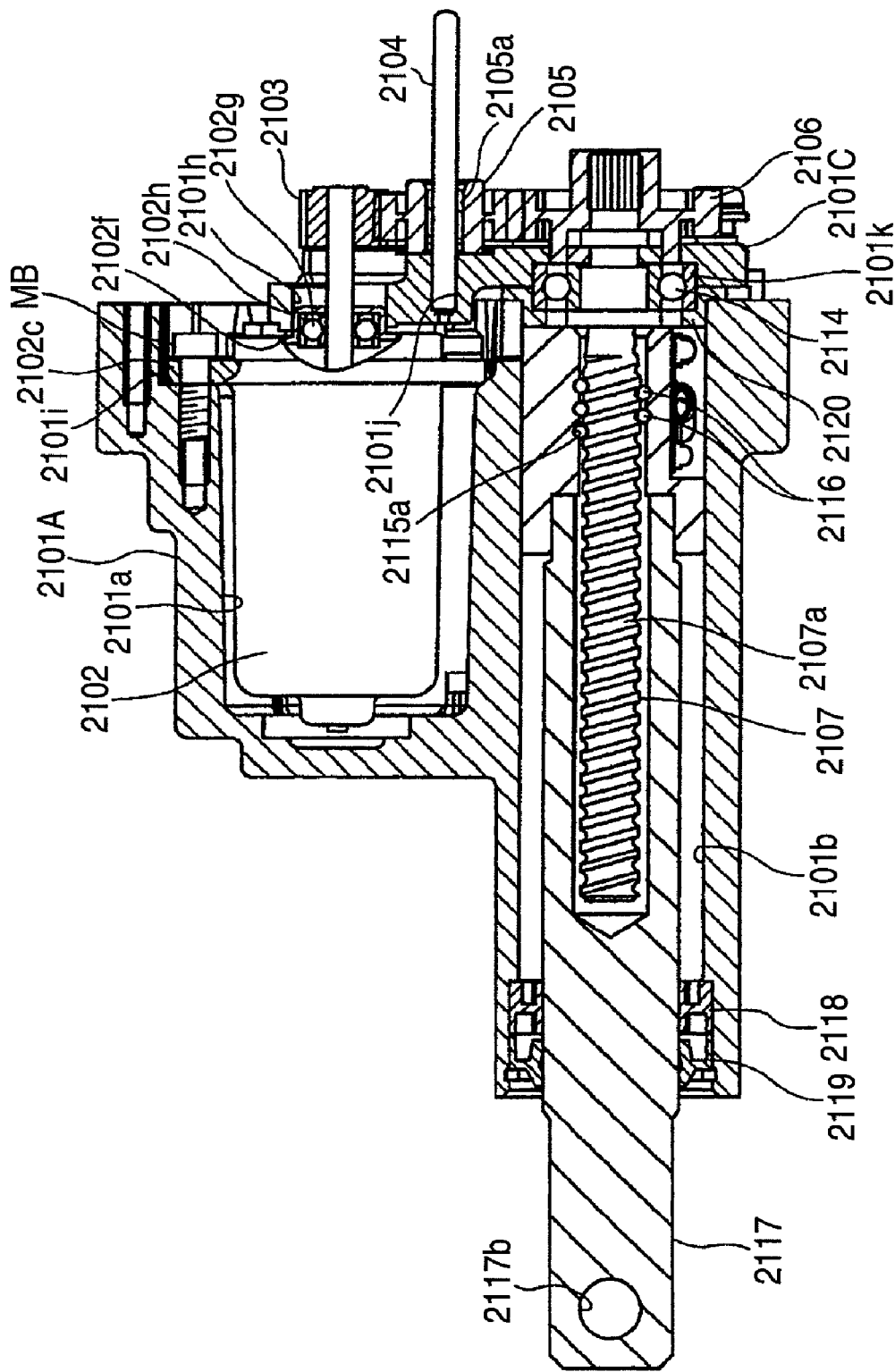
FIG. 32 is a view of the configuration in FIG. 30 sectioned along the line XXXII-XXXII and as seen in a direction indicated by arrows shown therein.
Figure 33:
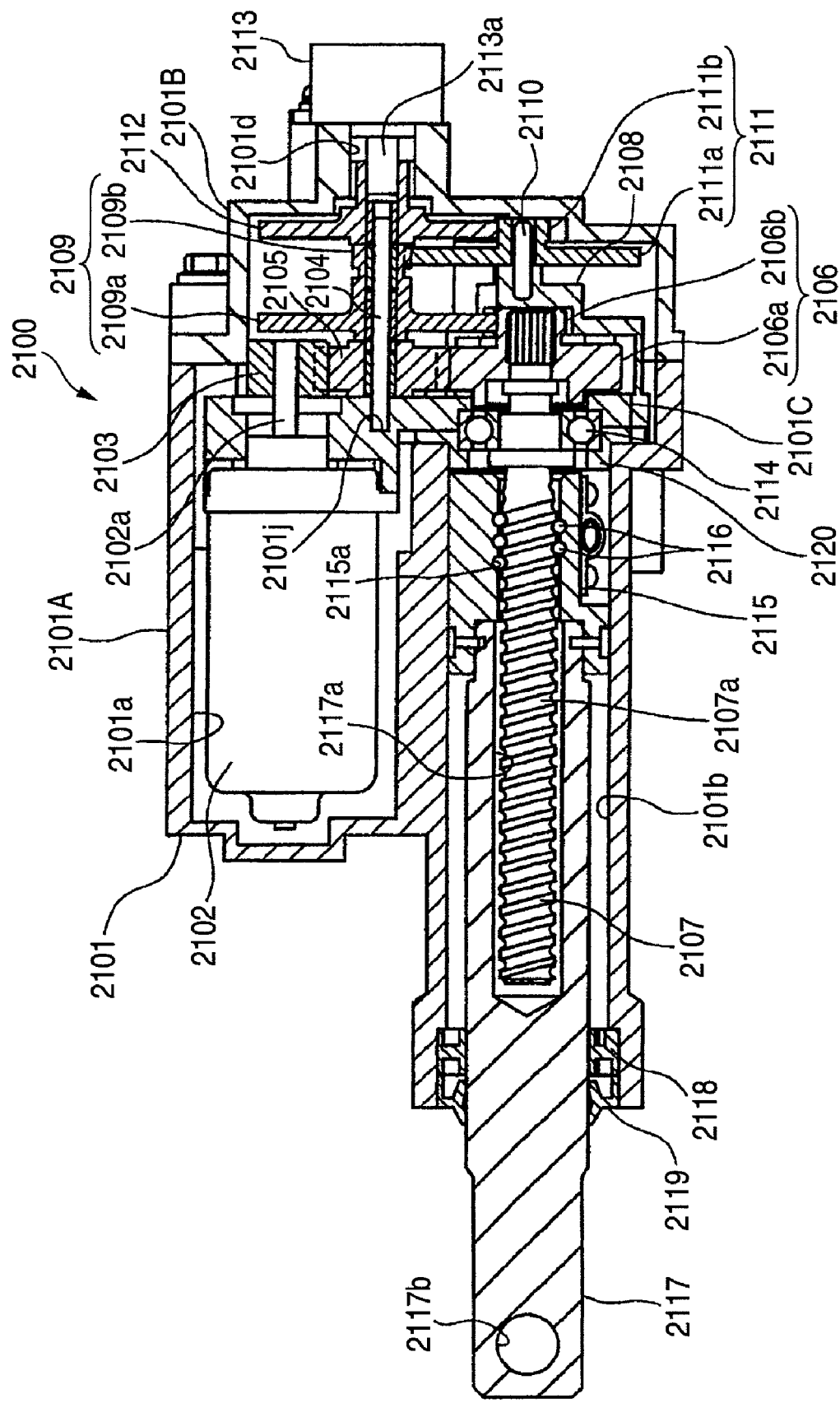
FIG. 33 is a view of the actuator with a cover member attached thereto sectioned along the line XXXIII-XXXIII in FIG. 30.

FIG. 28 is a front view of an actuator according to a 3-1$^{th}$ embodiment. FIG. 29 is a front view of the actuator in FIG. 28 with a cover member removed therefrom. FIG. 30 is a view of the actuator in FIG. 29 as viewed in a direction indicated by an arrow X shown therein. FIG. 31 is a view of the configuration in FIG. 30 with a second gear removed therefrom. FIG. 32 is a view of the configuration in FIG. 30 sectioned along the line XXXII-XXXII and as viewed in a direction indicated by arrows attached to the line. FIG. 33 is a view of the actuator with the cover member attached thereto sectioned along the line XXXIII-XXXIII and as viewed in a direction indicated by arrows attached to the line.

In FIG. 32, an electric motor 2102 is covered with a cylindrical frame 2102*f*, and a motor bearing 2102*g* provided within the frame 2102*f* supports a rotational shaft 2102*a* rotatably. A first gear 2103 made of metal is attached to an end portion of the rotational shaft 2102*a* which projects from an end of the frame 2102*f* by means of press fitting in such a manner as to be disabled from rotating relatively. In the frame 2102*f*, a circumference of the motor bearing 2102*g* which lies in the vicinity of the first gear 2103 projects cylindrically, and a centering location 2102*h* is formed there.

A motor bracket 2101C has a shape shown in FIG. 31 as viewed in a motor axis direction and has a centering location hole (or a notch may suffice) 2101*h* having an inside diameter which is large enough to permit the passage of the first gear 2103, a hole 2101*j* which permits the passage of a long shaft 2104 and a hole 2101*k* (FIG. 32) in which a ball bearing 2114 fits which supports a screw shaft 2107.

A method for mounting the motor 2102 will be described briefly. As is shown in FIG. 32, the motor 2102 is inserted into an interior of a motor compartment 2101*a* from a rear end of a rotational shaft (an opposite end to the end where the first gear 2103 is attached). As this occurs, the motor 2102 is inserted as deep as a position where a motor flange 2102*c* which is provided on a first gear 2103 side of the frame 2102*f* is seated on a motor seating surface 2101*i* (FIG. 31) which is formed round an opening of the motor compartment 2101*a* of a housing main body 2101A.

In this state, the motor bracket 2101C is mounted from the side of the first gear 2103. The location centering hole 2101*h* passes over the first gear 2103 and thereafter fits on the centering location 2102*h* of the frame 2102*f*. The centering location hole 2101*h* is formed with good accuracy relative to a rotational axis of a second gear 2105, which will be described later, and the centering location 2102*h* is formed with good accuracy relative to a rotational axis of the rotational shaft 2102*a*, whereby by fitting the centering location hole 2101*h* on the centering location 2102*h*, an inter-shaft distance between the first gear 2103 and the second gear 2105 can be fixed with good accuracy.

Furthermore, as is shown in FIG. 31, the motor bracket 2101C is fixed to the housing main body 2101A using plate bolts PB. Following this, the motor 2102 is fixed to the housing main body 2101A with motor bolts MB. As is shown in FIG. 32, the motor bracket 2101C is positioned in the direction of an axis of the screw shaft 2107 and in a direction right angles to the axis with good accuracy relative to the housing main body 2101A via a bearing spacer 2120 having an appropriate thickness and, furthermore, by fitting a hole 2101*k* on the ball bearing 2114 which supports the screw shaft 2107.

The motor bearing 2102*g* is generally disposed in such a manner as to be inscribed in the frame 2102*f*. The centering location 2102*h* which lies radially outwards of the motor bearing 2102*g* constitutes a guide for positioning of the motor bearing 2102*g* with good accuracy in many cases, and consequently, there are marketed many motors in which the centering location 2102*h* is machined with good accuracy. In this embodiment, by fitting in the centering location 2102*h* which is machined with good accuracy in the centering location hole 2101*h*, the gears are made to mesh with each other in an appropriate fashion.

In particular, it is inevitable with the motor 2102 which rotates at high speeds that heat is generated in the motor bearing 2102*g*. According to this embodiment, since the motor bracket 2101C which has good heat conductivity is made to contact the motor bearing 2102*g* which constitutes a heat generation source via a single thin plate in such a manner as to be nearest thereto, heat generated from the motor bearing 2102*g* can be dissipated to the outside via the frame 2102*f* and the motor bracket 2101C. In the event that a highly heat conductive material such as aluminum is used as the material of the motor bracket 2101C, the cooling effect can further be enhanced.

Here, it is difficult to provide the hole 2101*j* which supports the long shaft 2104 which supports, in turn, the second gear 2105 in the housing main body 2101A. This is because the first gear 2103 is reduced in diameter in order to gain a good reduction gear ratio, and to make this happen, a motor main body or a motor flange projects radially in the position where the hole 2101*j* is to be provided. According to this embodiment, since the motor bracket 2101C is assembled on to the housing main body 2101A in such a manner as to close the motor compartment 2101*a* and the hole 2101*j* is formed in the motor bracket 2101C so assembled so that the long shaft 2104 is planted therein, the second gear 2105 which meshes with the first gear 2103 whose diameter is reduced can be supported rotatably by the long shaft 2104 so planted. In addition, the position of the hole 2101*j* is not limited to the position shown in FIG. 31, and hence, the hole 2101*j* can be formed in an arbitrary position.

In FIG. 33, the second gear 2105 made of resin is disposed rotatably on a circumference of the long shaft 2104 planted in the motor bracket 2101C via a bush 2105*a*, and this second gear 2105 meshes with the first gear 2103 and a large gear portion 2106*a* of a third gear 2106.

A left end of the screw shaft 2107 enters an interior of a tubular hole 2117*a* which is formed in a round rod-like drive shaft 1117. A right end of the drive shaft 2117 as viewed in the figure fits in a nut 2115 concentrically and is coupled thereto with a pin or a cotter so as to move together therewith. The drive shaft 2117 is supported on the housing main body 2101A by a bush 2118 in such a manner as to move in an axial direction, and a seal 2119 is disposed leftwards (outwards) of the bush 2118, so as to prevent the infiltration of foreign matters such as sea water or dust from a gap between the housing main body 2101A and the drive shaft 2117. In addition, a hole 2117*b* is formed in an end portion of the drive shaft 2117 which projects from the housing main body 2101A for coupling to a link member 2011.

In this configuration, when the operator operates a lever, not shown, in a reverse direction, in FIG. 33, power of an opposite polarity is supplied to the motor 2102, whereby the rotational shaft 2102*a* rotates in a reverse direction. Therefore, in an opposite operation to that described above, the drive shaft 2117 of the actuator 2100 moves in a direction in which it is withdrawn. Consequently, an operation shaft 2010 rotates in a reverse direction via the link member 2011, and a cam shaft 2009 moves rightwards via a cam mechanism, not shown, so as to bring a dog clutch 2008 into engagement with a reverse bevel gear 2007, whereby the power of an output shaft 2003 is transmitted to a propeller shaft 2004 via a bevel gear 2003*a*, the bevel gear 2007 and the dog clutch 2008 so as to rotate a propeller 2005 in the reverse direction.

Figure 34:
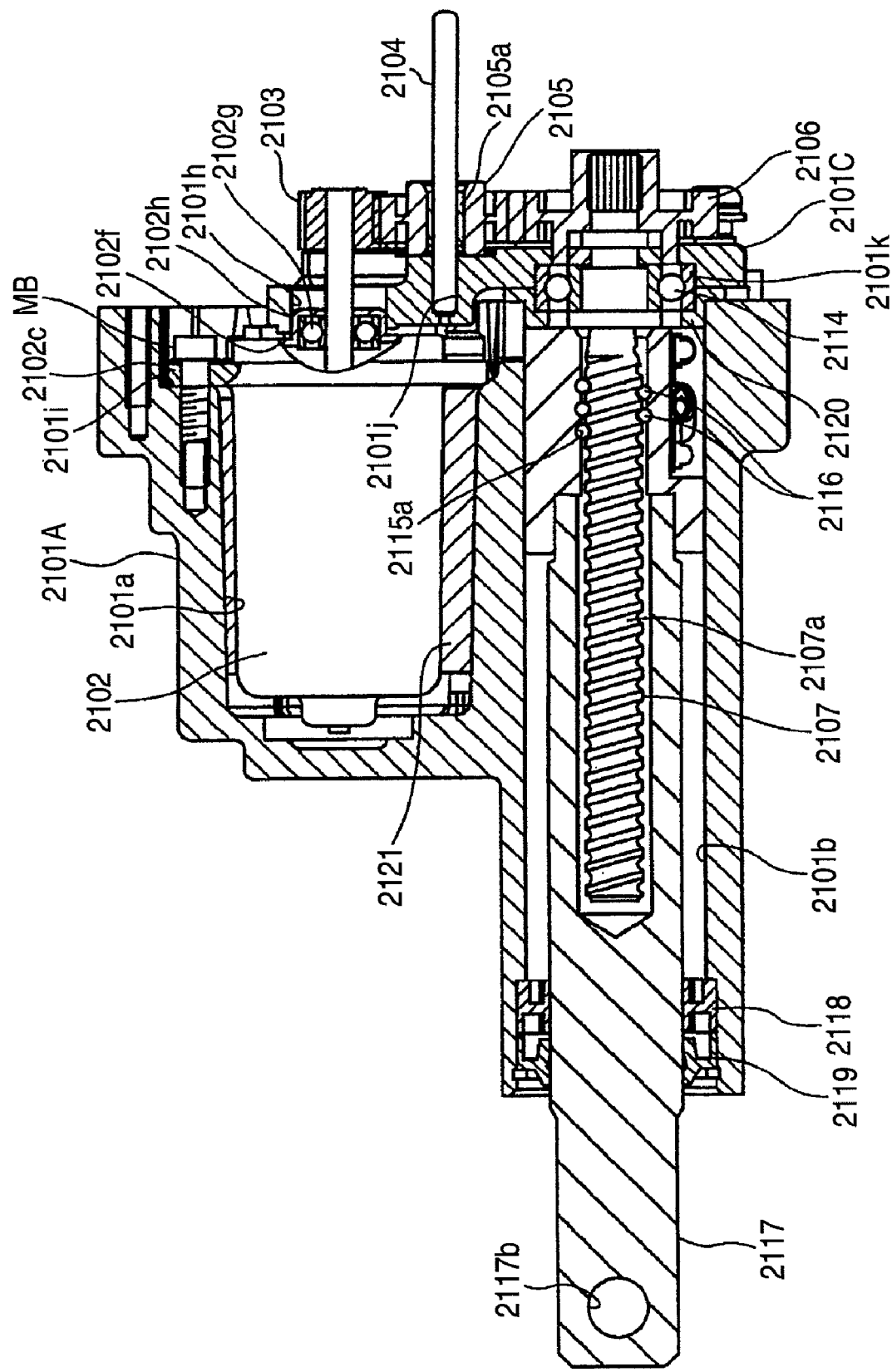
FIG. 34 is a sectional view, similar to FIG. 32, which shows a modified example to the 3-1$^{st}$ embodiment.

FIG. 34 is a similar sectional view to FIG. 32, which shows a modified example to the 3-1$^{st}$ embodiment. This modified example differs from the embodiment shown in FIGS. 28 to 33 only in that a heat conductive member 2121 is provided between the motor compartment 2101*a* and the motor 2102. A highly heat conductive material such as aluminum or silicone resin is preferably used as the heat conductive member 2121.

According to this modified example, since the heat conductive member 2121 is disposed in such a manner as to be brought into abutment with an outer circumference of the motor 2102 and an inner wall of the motor compartment 2101*a*, heat generated from the motor 2102 can quickly be transmitted to the housing main body 2101A, so as to be dissipated to the air via an outer circumferential surface of the housing main body 2101A, whereby the increase in temperature within a housing 2101 can be suppressed.

3-2$^{nd}$ Embodiment

Figure 35:
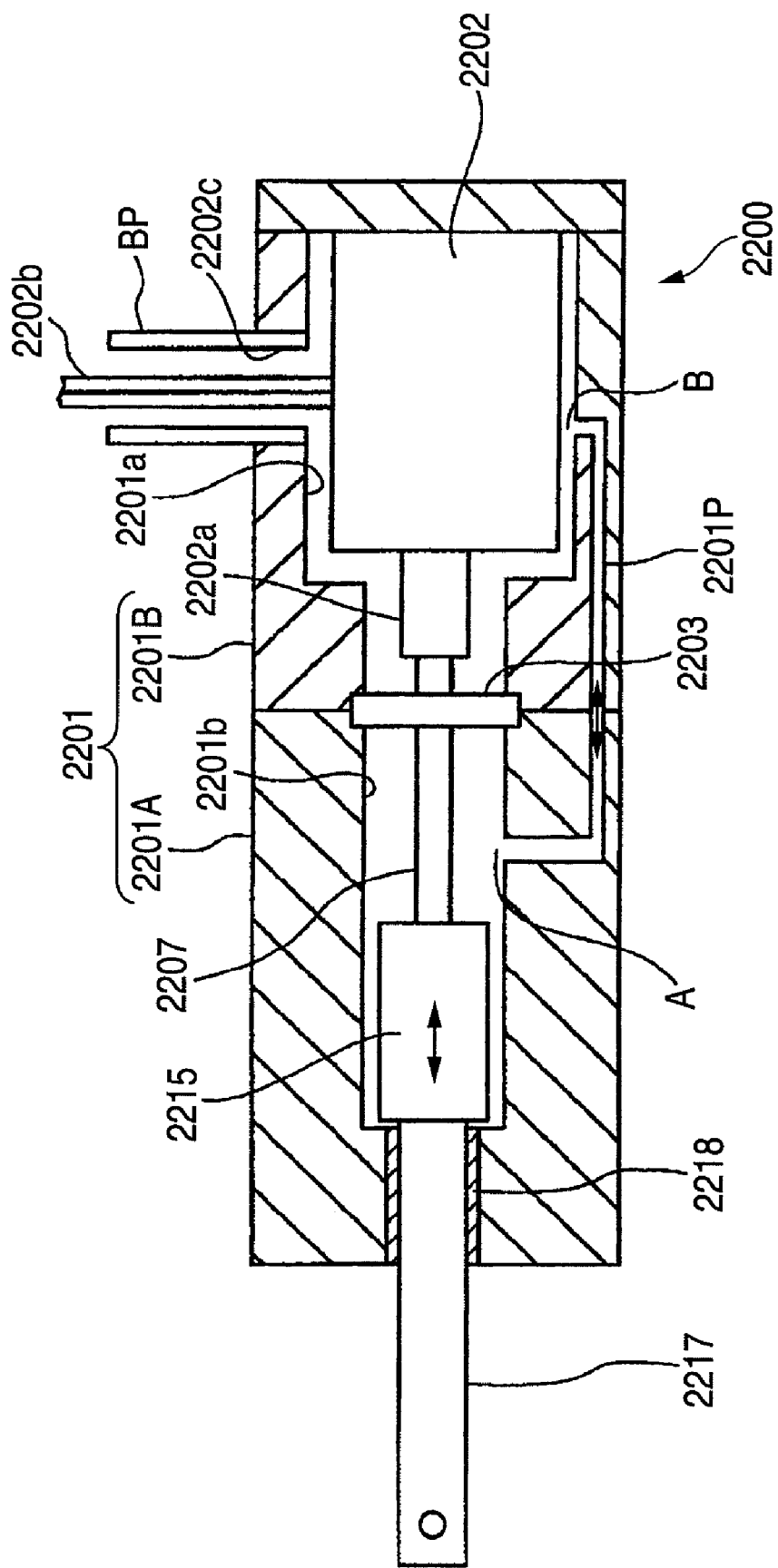
FIG. 35 is a sectional view of an actuator 2200 according to a 3-2$^{nd}$ embodiment.

FIG. 35 is a sectional view of an actuator 2200 according to a 3-2$^{nd}$ embodiment. In this embodiment, as is shown in FIG. 35, a motor compartment 2201*a* and a screw shaft compartment 2210*b* within a housing 2202 are disposed in series. A rotational shaft 2202*a* of a motor 2202 which is mounted on a cover member 2201B is coupled to a screw shaft 2207 via a coupling 2203 which is held in between a housing main body 2202A and the cover member 2201B. The screw shaft 2207 extends to reside in an interior of a drive shaft 2217 by passing through an interior of a nut 2215 which can move only in an axial direction relative to the housing main body 2201A. The drive shaft 2217 is supported by a bush 2218 in such a manner as to move relative the housing main body 2201A.

An opening 2201*c* to which a breather pipe BP is connected is formed in the cover member 2201B. A wiring 2202*b* of the motor 2202 is connected to a drive circuit, not shown, via the breather pipe BP.

A passage 2201P is formed to establish a communication between the vicinity (a first position) A of the nut 2215 which is an axially movable element within a screw shaft compartment 2201*b* on the side of the housing main body 2201A and the vicinity (a second position) B of the motor 2202 within the motor compartment 2201*a* on the side of the cover member 2201B.

When the rotational shaft 2202*a* of the motor 2202 rotates forwards by a drive signal from the drive circuit, not shown, the screw shaft 2207 rotates forwards, whereby the nut 2215 moves in the axial direction (leftwards as viewed in FIG. 35) by a distance in accordance with the forward rotation of the screw shaft 2207, so as to push out the drive shaft 2217. As this occurs, when the nut 2215 moves leftwards within the screw shaft compartment 2210*b*, heated air is taken in from the vicinity (the second position) B of the motor 2202 via the passage 2201P and is discharged to the vicinity (the first position) A of the nut 2115.

On the other hand, when the rotational shaft 2202*a* of the motor 2202 rotates backwards or reversely by a drive signal of an opposite characteristic, the screw shaft 2207 rotates backwards or reversely, whereby the nut 2215 moves in the axial direction (rightwards as viewed in FIG. 35) by a distance in accordance with the backward rotation of the screw shaft 2207, so as to pull in the drive shaft 2217. As this occurs, when the nut 2215 moves rightwards within the screw shaft compartment 2210*b*, air cooled in the vicinity (the first position) A of the nut 2215 is forced into the passage 2202P and is thereafter discharged to the vicinity (the second position) B of the motor 2202. Thus, air lying on the periphery of the motor 2202 is moved through reciprocating motions of the nut 2215 so as to implement the cooling operation.

Figure 36:
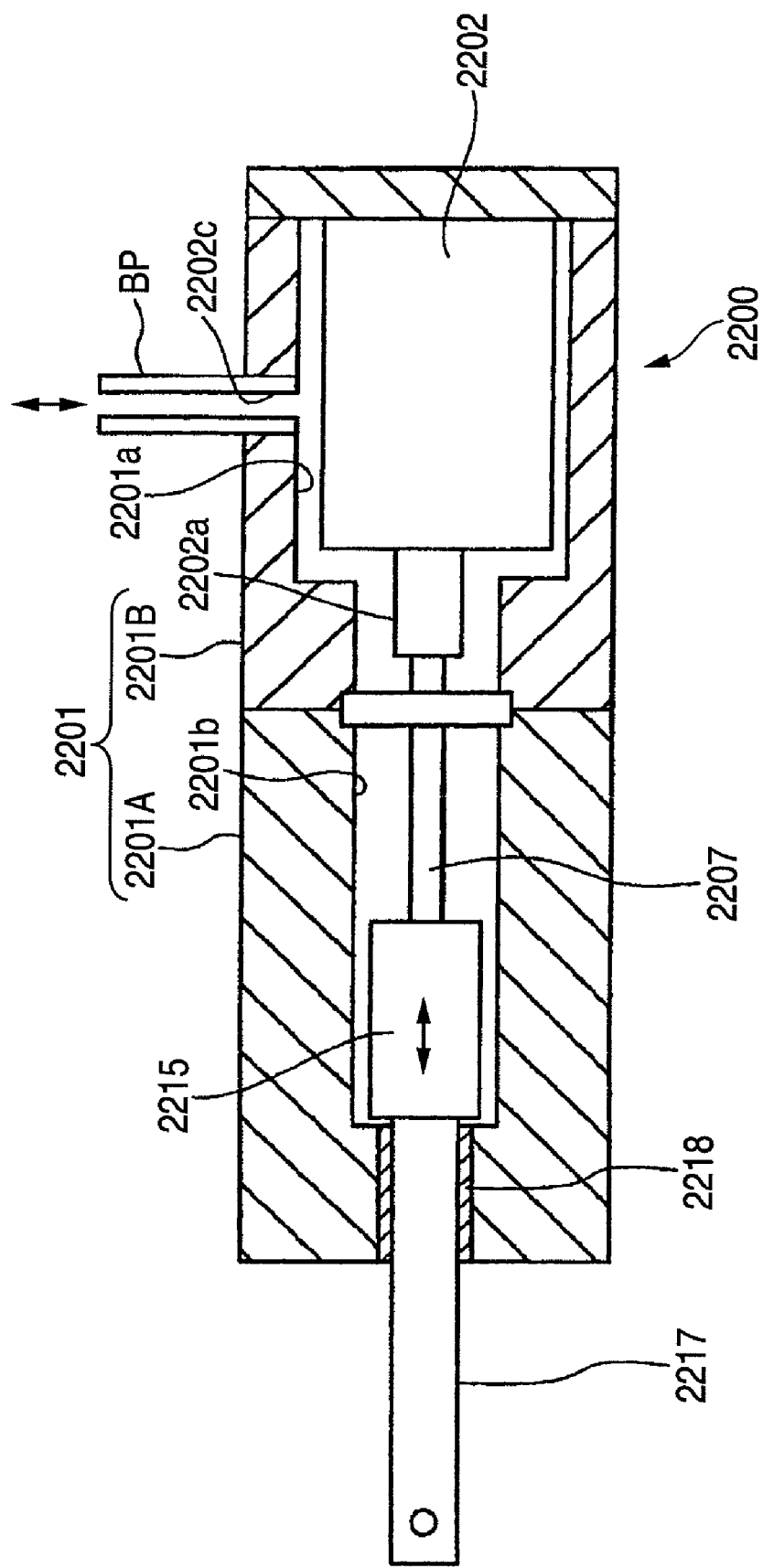
FIG. 36 is a sectional view, similar to FIG. 35, which shows a modified example to the 3-2$^{nd}$ embodiment.

FIG. 36 is a sectional view of an actuator according to a modified example to the 3-2$^{nd}$ embodiment. In this modified example, the passage which establishes the communication between the screw shaft compartment and the motor compartment is not provided. A vent hole is provided in a coupling 2203 held in between a housing main body 2201A and a cover member 2201B in such a manner as to pass therethrough in an axial direction. Note that the illustration of a wiring of a motor is omitted. This modified example is similar to the embodiment shown in FIG. 35 in the other configurations, and therefore, the description thereof will be omitted.

When a rotational shaft 2202a of a motor 2202 rotates forwards by a drive signal from a drive circuit, not shown, a screw shaft 2207 rotates forwards, whereby a nut 2215 moves in an axial direction (leftwards as viewed in FIG. 35) by a distance in accordance with the forward rotation of the screw shaft 2207, so as to push out a drive shaft 2217. As this occurs, when the nut 2215 moves leftwards within the screw shaft compartment 2210b, cool outside air flows into an inside of the cover member 2201B via an opening 2201c so as to cool the periphery of the motor 2202.

On the other hand, when the rotational shaft 2202a of the motor 2202 rotates backwards or reversely by a drive signal of an opposite characteristic, the screw shaft 2207 rotates backwards or reversely, whereby the nut 2215 moves in the axial direction (rightwards as viewed in FIG. 35) by a distance in accordance with the backward rotation of the screw shaft 2207, so as to pull in the drive shaft 2217. As this occurs, when the nut 2215 moves rightwards within the screw shaft compartment 2210b, air heated on the periphery of the motor 2202 flows out via the opening 2201c. Thus, air lying on the periphery of the motor 2202 is moved through reciprocating motions of the nut 2215 so as to implement the cooling operation.

3-3$^{rd}$ Embodiment

Figure 37:
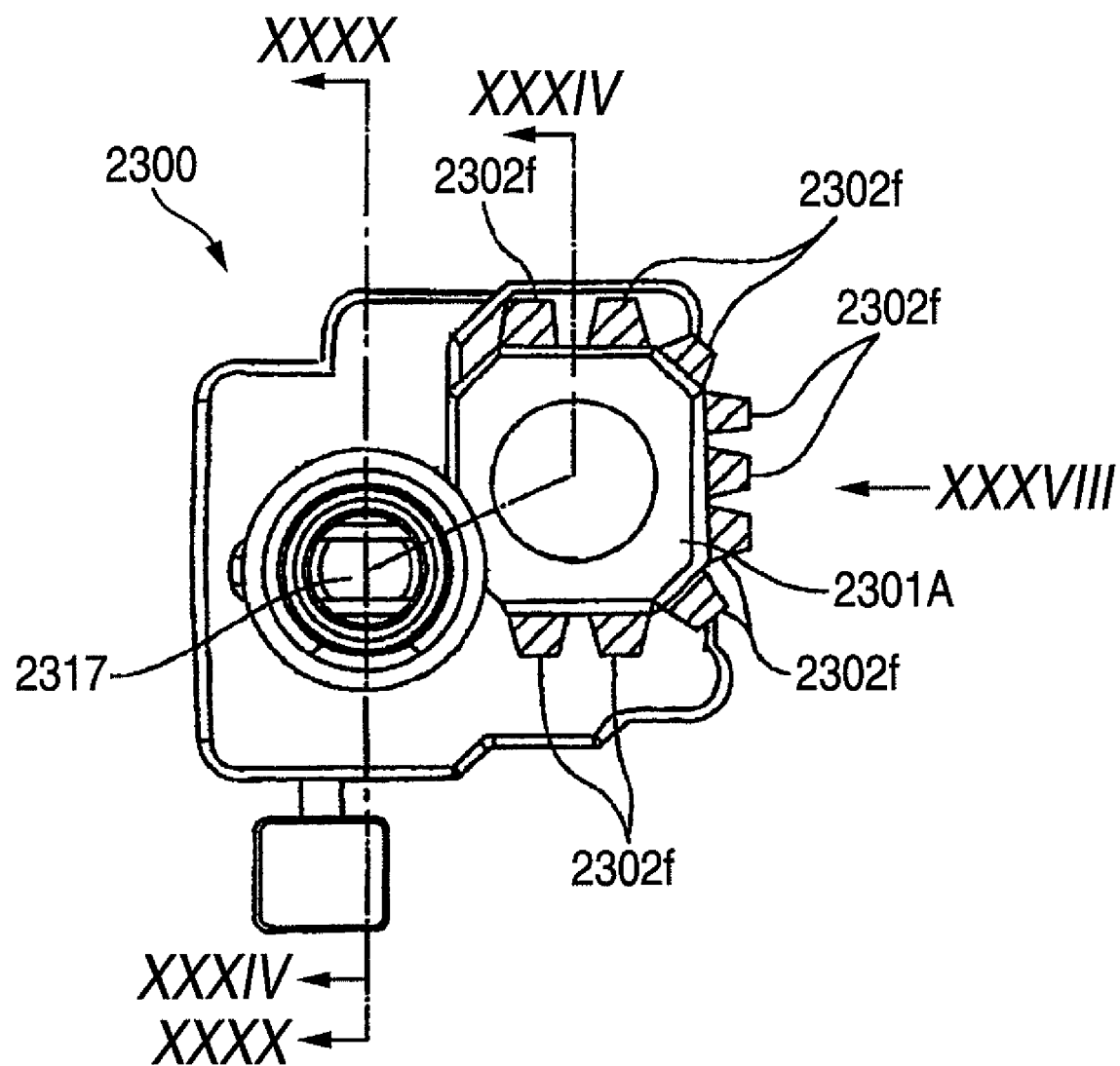
FIG. 37 is a front view of an actuator according to a 3-3$^{rd}$ embodiment.
Figure 38:
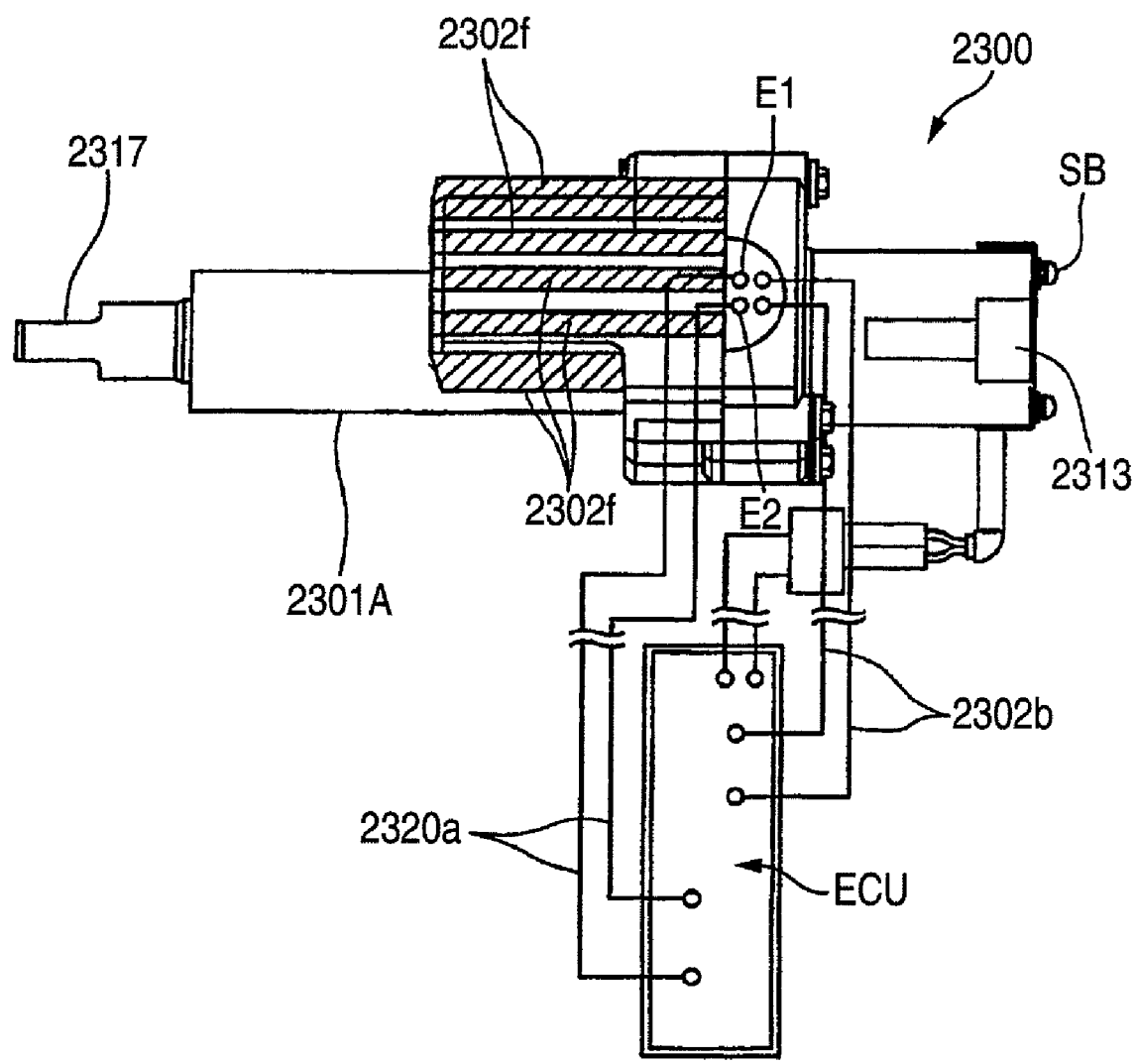
FIG. 38 is a view of the actuator in FIG. 37 as seen in a direction indicated by arrows XXXVIII.
Figure 39:
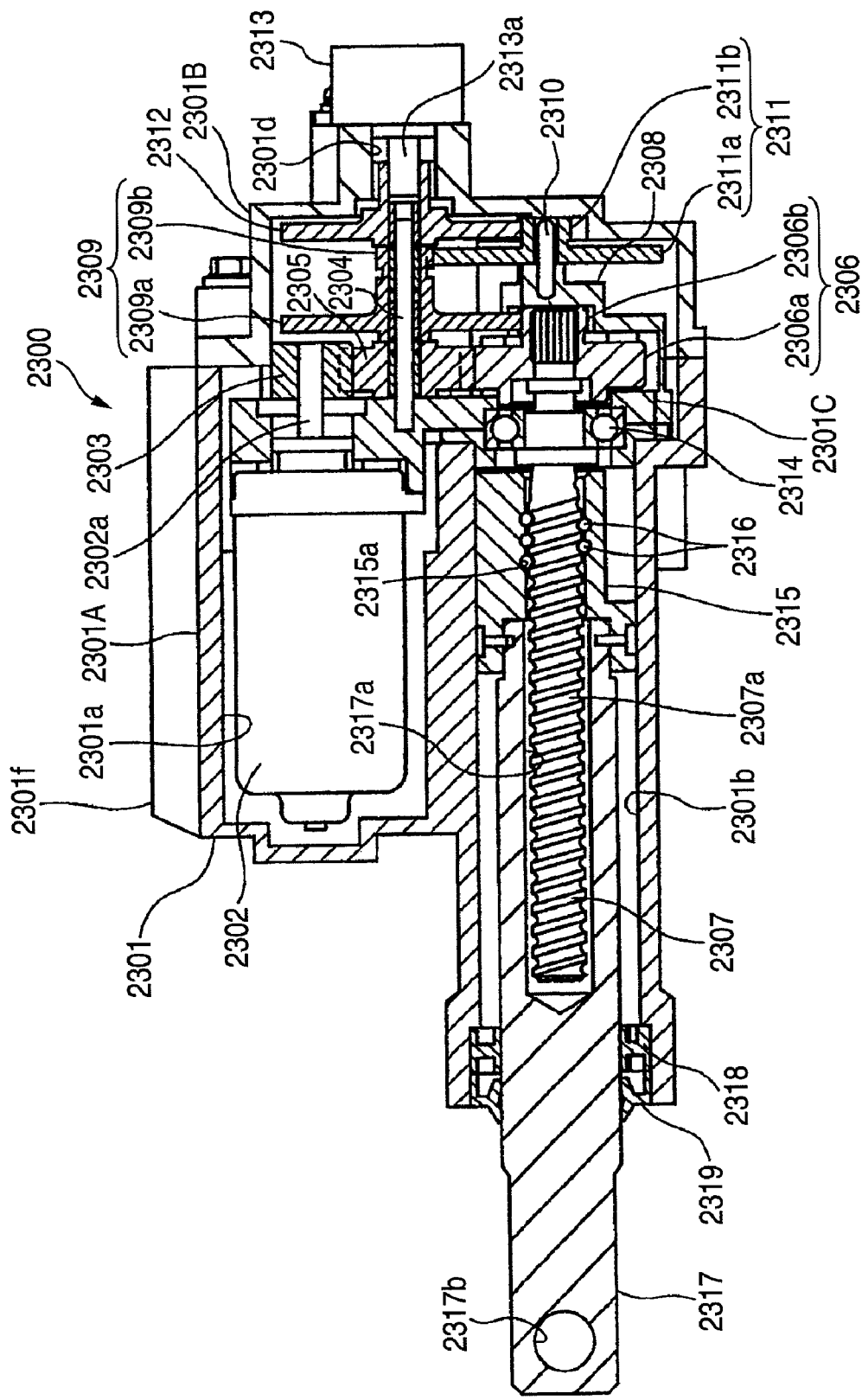
FIG. 39 is a view of the configuration in FIG. 37 sectioned along the line XXXIX-XXXIX and as seen in a direction indicated by arrows shown therein.
Figure 40:
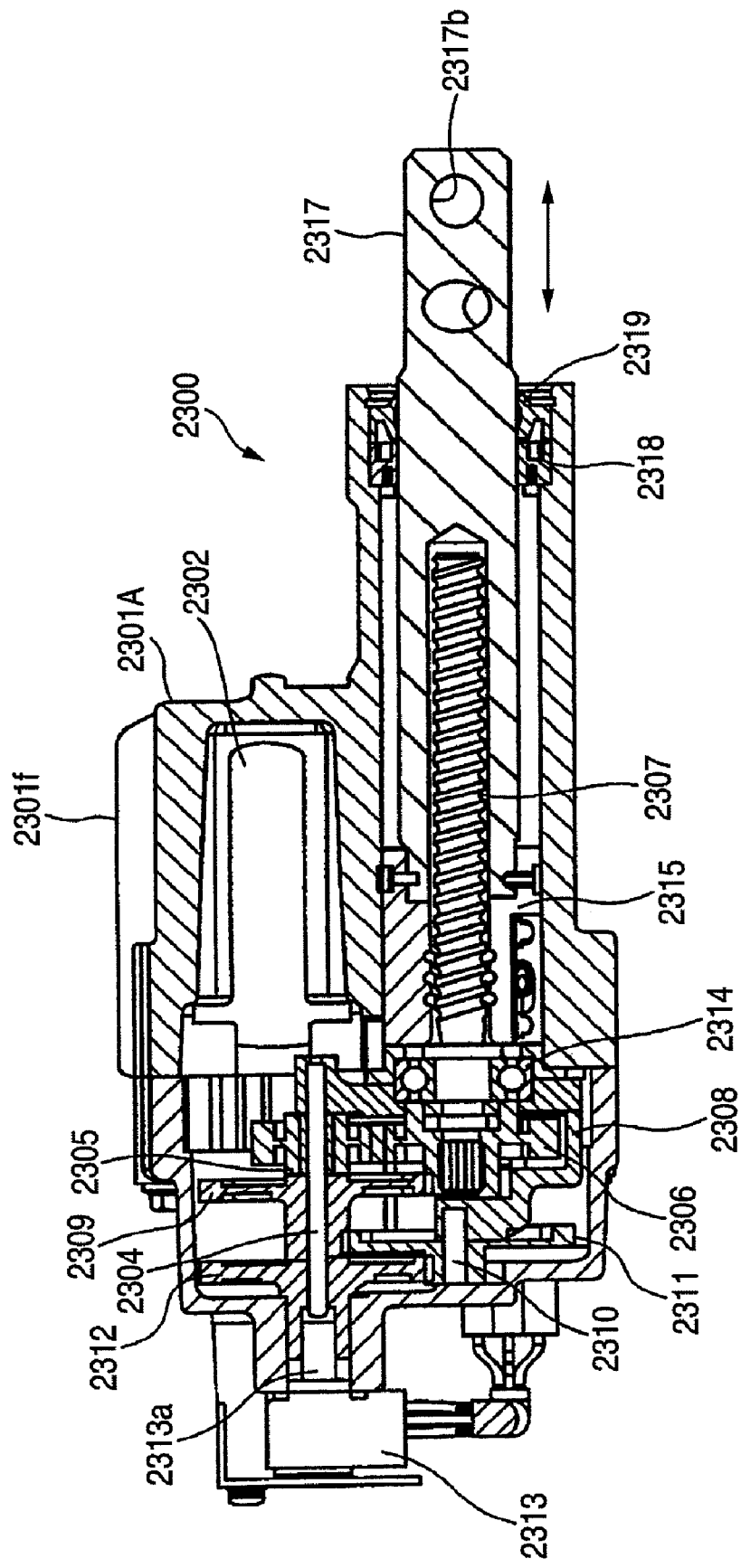
FIG. 40 is a view of the configuration in FIG. 37 sectioned along the line XXXX-XXXX and as seen in a direction indicated by arrows shown therein.
Figure 41:
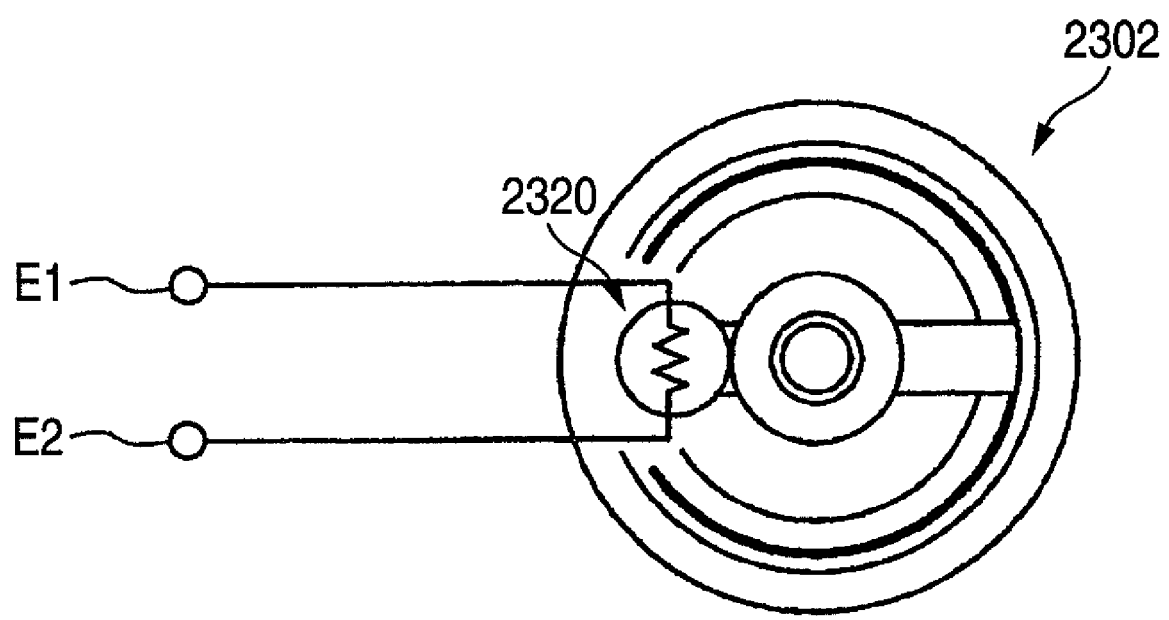
FIG. 41 is a schematic diagram showing an NTC thermistor incorporated in an electric motor.

FIG. 37 is a front view of an actuator according to a 3-3$^{rd}$ embodiment. FIG. 38 is a view of the actuator in FIG. 37 as viewed in a direction indicated by an arrow XXXVIII. FIG. 39 is a view of the configuration in FIG. 37 sectioned along the line XXXIX-XXXIX and as viewed in a direction indicated by arrows attached to the line. FIG. 40 is a view of the configuration in FIG. 37 sectioned along the line XXXX-XXXX and as viewed in a direction indicated by arrows attached to the line. FIG. 41 is a schematic view showing an NTC thermistor which is incorporated in an electric motor.

In FIG. 39, a cylindrical housing 2301 is made up of a housing main body 2301A made of aluminum, a cover member 2301B made of aluminum or resin which is assembled to an end face of the housing main body 2101A with bolts B (FIG. 28) and a motor bracket 2301C. The housing main body 2101A has a motor compartment 2301a and a screw shaft compartment 2301b in an interior thereof. A motor 2302 is disposed within the motor compartment 2301a. The motor 2302 is fixed to a plate-like motor bracket 2301C, and the motor bracket 2301C is attached to the housing main body 2301A in such a manner as to hold an outer ring of a ball bearing 2314, which will be described later, between the housing main body 2301A and to close the motor compartment 2301a and the screw compartment 2301b in the housing main body 2101A.

As is shown in FIGS. 37, 38, a plurality of fins 2301f are formed on a surface of an exterior portion of the housing main body 2301A which is adjacent to the motor compartment 2301a in such a manner as to extend in parallel with an axis of the motor. The fin 2301 is formed into a block shape and has a cross section which tapers towards its distal end (or which is formed into a trapezoidal shape). The fin 2301f which is formed into such a shape has not only a high cooling effect but also high rigidity and is therefore made difficult to fail, thereby making it possible to suppress deformation by heat and interference with other constituent components.

In FIG. 39, a rotational shaft 2302a of the electric motor 2302 projects from the motor bracket 2301C and a first gear 2303 made of metal is attached to a projecting end portion of the rotational shaft 2302a through press fitting in such a manner as to be disabled from its relative rotation. A second gear 2305 made of resin is disposed rotatably round a circumference of a long shaft 2304 planted in the motor bracket 2301C, and this second gear 2305 meshes with the first gear 2303 and a large gear portion 2306a of a third gear 2306.

The third gear 2306 made of resin has the large gear portion 2306a and a small gear portion 2306b which are formed coaxially and, furthermore, is attached to an end portion of a screw shaft 2307 through serrated connection in such a manner as to be disabled from its relative rotation. In addition, a support member 2308 is attached to the motor bracket 2301C in such a manner as to cover part of the third gear 2306. Here, the first gear 2303, the second gear 2305 and the third gear 2306 make up a first power transmission mechanism.

A fourth gear 2309 which is disposed adjacent to the second gear 2305 is supported rotatably round the circumference of the long shaft 2304. The fourth gear 2309 made of resin has a large gear portion 2309a which meshes with the small gear portion 2306b of the third gear 2306 and a small gear portion 2309b which are formed coaxially.

The small gear portion 2309b of the fourth gear 2309 meshes with a large gear portion 2311a of a fifth gear 2311 which is supported rotatably on a short shaft 2310 which is planted in the support member 2308 in parallel with the long shaft 2304. The fifth gear 2311 made of resin has the large gear portion 2311a and a small gear portion 2311b which are formed coaxially. The small gear portion 2311b meshes with a sixth gear 2312 which is disposed adjacent to the fifth gear 2311 and which is supported rotatably round the circumference of the long shaft 2304. Note that a bush may be disposed between each gear and the long shaft 2304 and the short shaft 2310 for smooth rotation.

A potentiometer 2313, which functions as an angle sensor, is fittingly disposed in a hole 2301d in the cover member 2301B and is fixed with machine screws SB (FIG. 38), and a measuring shaft 2313a thereof is coupled to the sixth gear 2312 so as to rotate together therewith. A distal end of the long shaft 2304 which extends in a cantilever-like fashion is supported by the potentiometer 2313 via the sixth gear 2312 and the measuring shaft 2313a or is supported by the hole 2301d. The potentiometer 2313 is such as to detect the angle of the measuring shaft 2313a over a predetermined range (for example, 90 degrees) with good accuracy. Here, the first gear 2302, the second gear 2305, the third gear 2306, the fourth gear 2309, the fifth gear 2311 and the sixth gear 2312 make up a second power transmission mechanism. The cover member 2301B has a function as a gear cover which hermetically closes the housing main body 2301A in such a manner as to prevent the infiltration of foreign matters into each gear. Note that in the event that resin materials of the gears which mesh with each other are made to differ from each other, wear and tear can preferably be suppressed.

In FIG. 39, the screw shaft 2307 is supported rotatably on the housing main body 2301A by the ball bearing 2314 at a right end portion as viewed in the figure. The screw shaft 2307 has an externally threaded groove 2307a which is formed on a left end portion thereof.

The screw shaft 2307 passes through a cylindrical nut 2315. An internally threaded groove 2315a is formed on an inner circumferential surface of the nut 2315 in such a manner as to confront the externally threaded groove 2307a, and a large number of balls 2316 are rollingly disposed in a spiral space (a rolling path) defined by both the threaded grooves 2307a, 2315a. A detent (not shown) is provided on the nut 2315 to prevent its rotation relative to the housing main body 2301A, so that the nut 2315 is allowed for its relative axial motion but is disabled from its relative rotation within the screw shaft compartment 2301b. Note that the nut 2315, which is an axially movable element, the screw shaft 2307, which is a rotational element, and the balls 2316, which are rolling elements, make up a ball screw mechanism, and this ball screw mechanism and the following drive shaft 2317 make up, in turn, a driving mechanism.

A left end of the screw shaft 2307 enters an interior of a tubular hole 2317a which is formed in the round rod-like drive shaft 2317. A right end of the drive shaft 2317 as viewed in the figure fits in the nut 2315 concentrically and is coupled thereto with a pin so as to move together therewith. The drive shaft 2317 is supported on the housing main body 2301A by a bush 2118 in such a manner as to move in the axial direction, and a seal 2119 is disposed leftwards (outwards) of the bush 2118 so as to prevent the infiltration of foreign matters such as sea water or dust from a gap between the housing main body 2301A and the drive shaft 2317. In addition, a hole 2317b for coupling to a link member 2011 is formed in an end portion of the drive shaft 2317 which projects from the housing main body 2301A.

In addition, as is shown in FIG. 41, terminals E1, E2 of an NTC thermistor 2320 which is provided in an interior of the electric motor 2302 are connected to an ECU by a wiring 2320a shown in FIG. 38. As is well known, the NTC thermistor detects a change in voltage when such a change in voltage is generated in response to the generation of heat from the electric motor and the ECU can measure the temperature of the electric motor 2302 based on a detection signal from the NTC thermistor 2320. In addition, a power supply wiring of the motor 2302 and the wiring of the NTC thermistor 2320 which are led out from the interior of the actuator may be connected to the ECU by being passed through a breather pipe, if the pipe is provided, in consideration of a layout for an outboard engine.

Next, the operation of this embodiment will be described.

The rotational force of the rotational shaft 2302a is transmitted to the measuring shaft 2313a of the potentiometer 2313 via the first gear 2303, the second gear 2305, the third gear 2306, the fourth gear 2309, the fifth gear 2311 and the sixth gear 2312. A signal in accordance with the rotation of the measuring shaft 2313a is inputted from the potentiometer 2313 into the ECU via the wiring 2313b. Determining based on the signal that the screw shaft 2307 has rotated a predetermined rotational amount, the ECU stops the supply of power to the motor 2302.

According to the embodiment, by providing the cooling fins 2301f on the external surface of the housing main body 2301A, heat generated by the electric motor 2302 accommodated in the hermetically closed housing can be dissipated to the outside with good efficiency. In particular, in the event that the actuator is used in an outboard engine, while the actuator is normally air cooled by the fins 2301f, when heat generated becomes too large, fresh water or sea water is introduced into the interior of the outboard engine so as to water cool the fins 2301f, thereby making it possible to obtain a maximum cooling effect as well.

On the other hand, since the NTC thermistor 2320 is provided in the electric motor 2302, the ECU can monitor how much heat is generated by detecting a voltage change due to heat generated by the electric motor 2302, whereby it becomes possible to know the accidental failure of the electric motor 2302 or the timing of repair or replacement of the actuator main body. Furthermore, since the working conditions of the electric motor 2303 can be grasped, when the actuator is used on a boat, the failure of the actuator can be prevented in advance by periodically replacing actuators before their service lives are reached. In addition, a temperature sensor may be used in place of the NTC thermistor.

3-4$^{th}$ Embodiment

Figure 42:
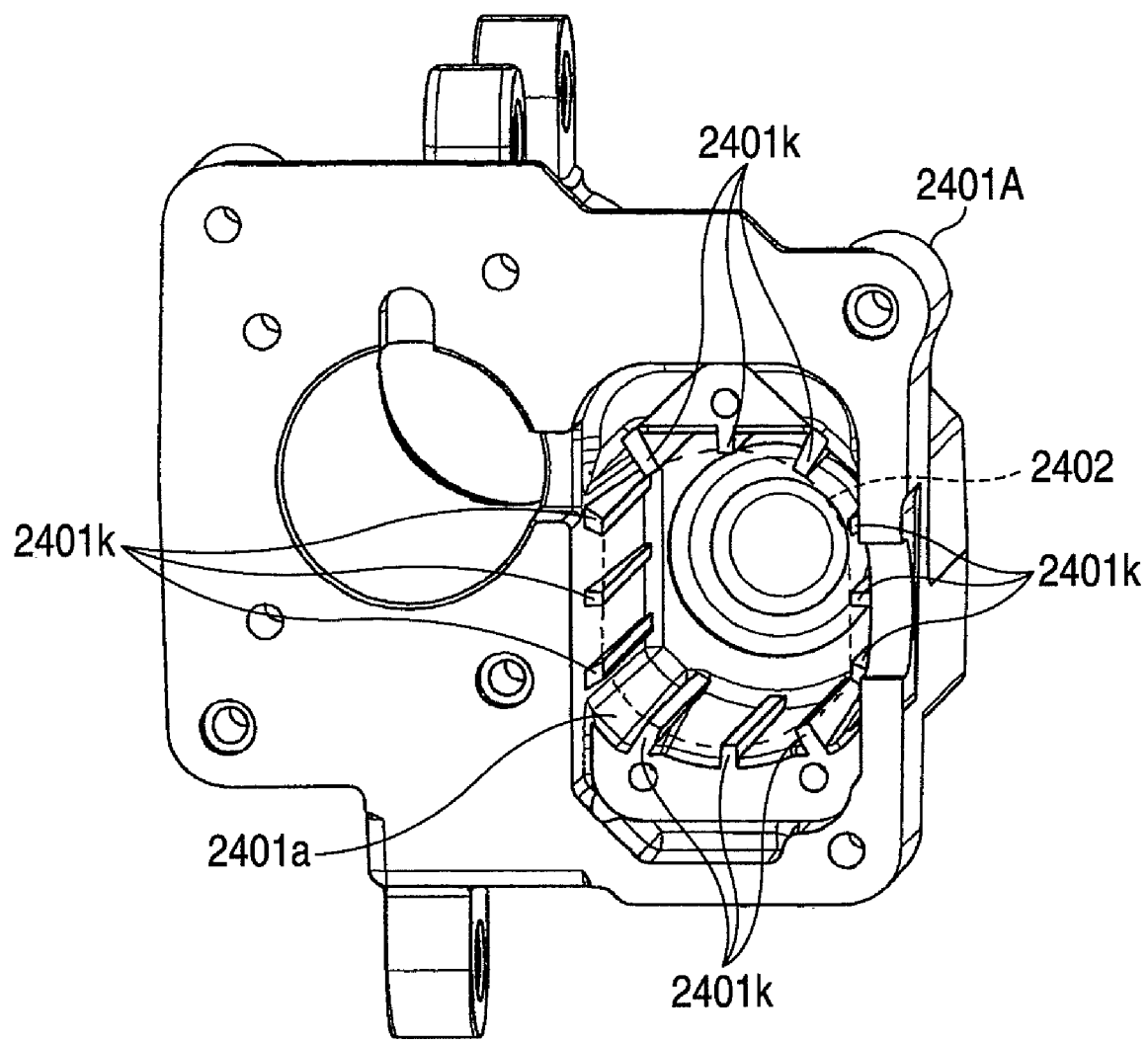
FIG. 42 is a perspective view of a housing main body of an actuator according to a 3-4$^{th}$ embodiment.
Figure 43:
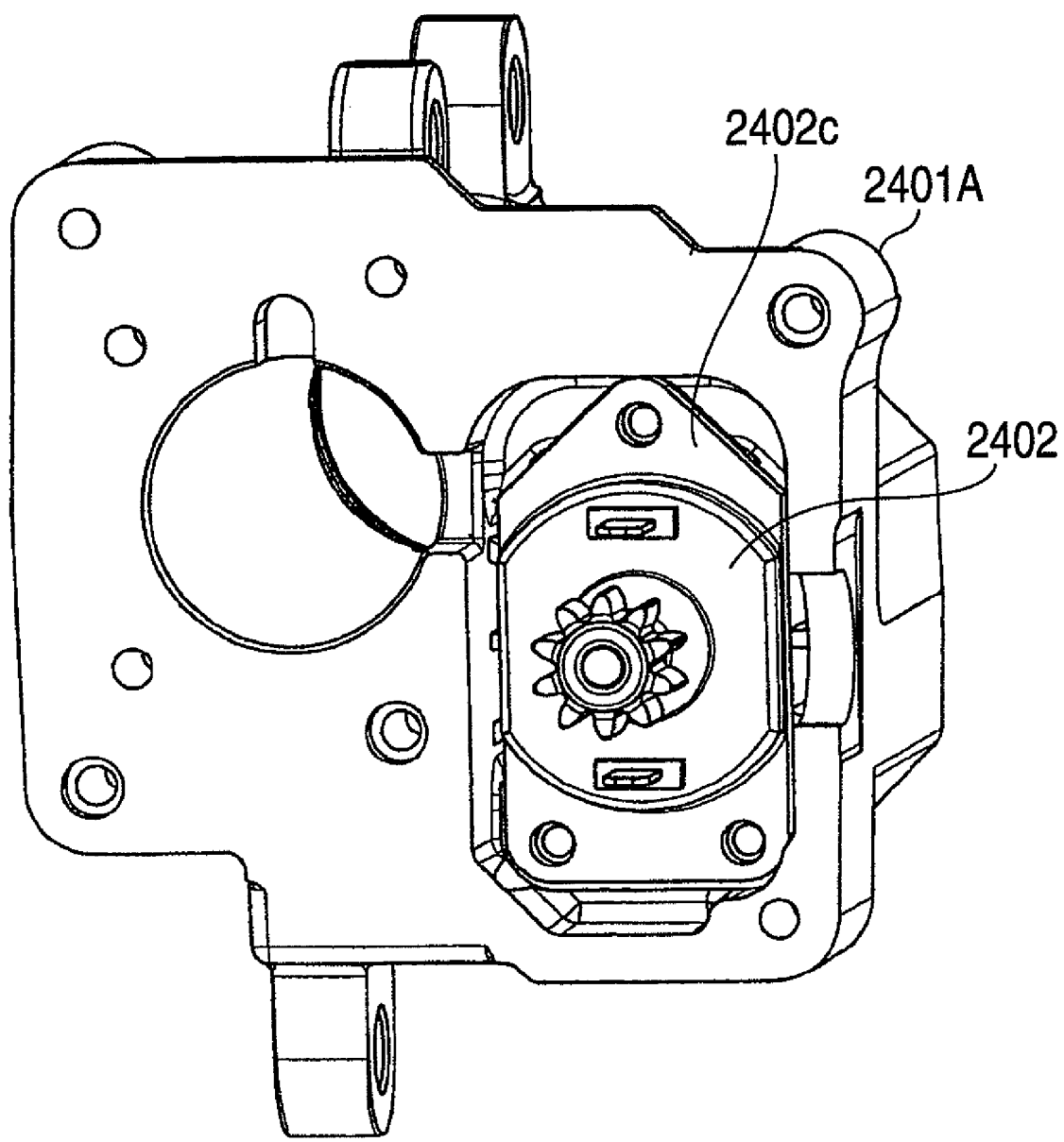
FIG. 43 is a perspective view showing a state in which a motor is assembled to the housing main body shown in FIG. 42.
Figure 44:
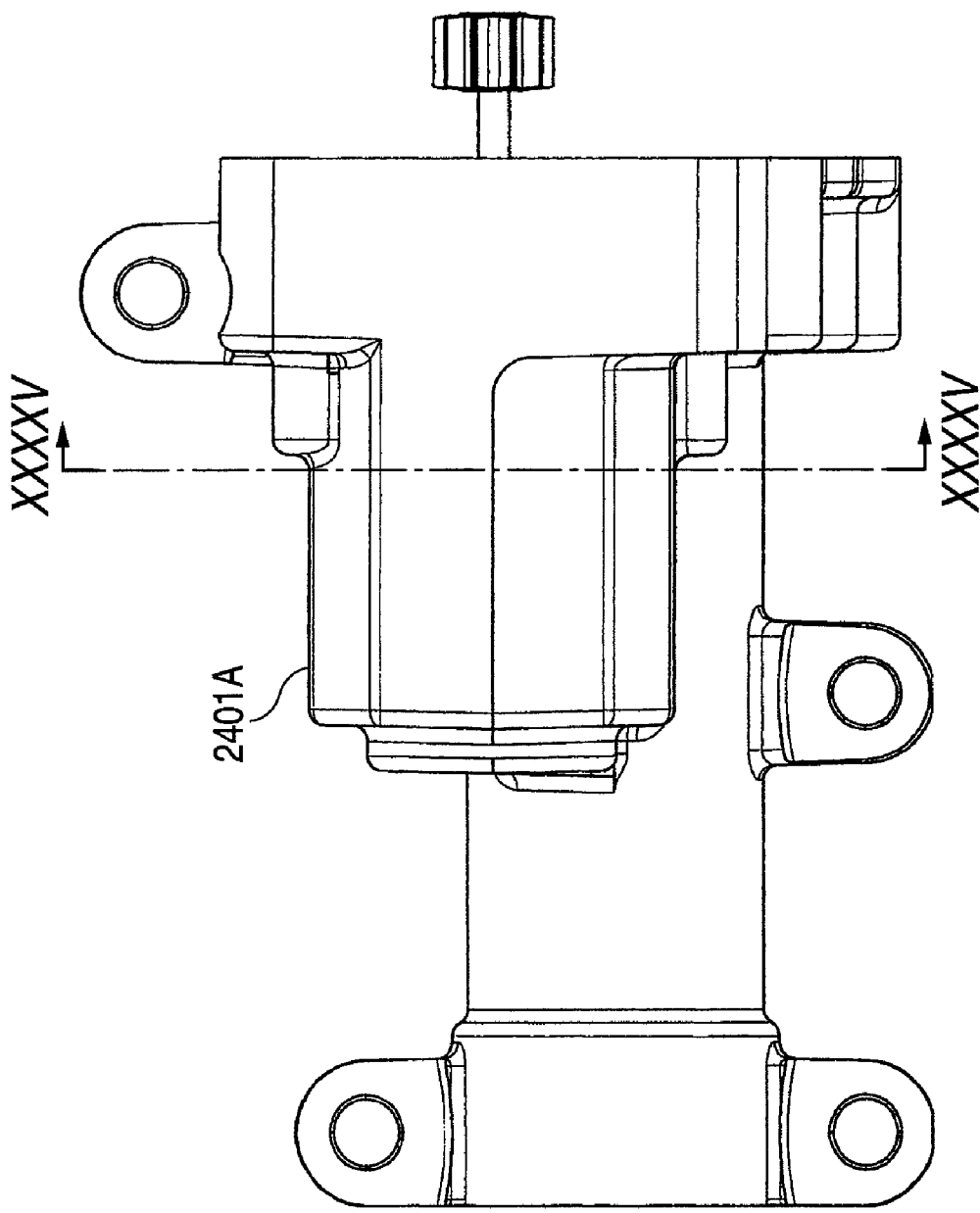
FIG. 44 is a side view of an assembly shown in FIG. 43.
Figure 45:
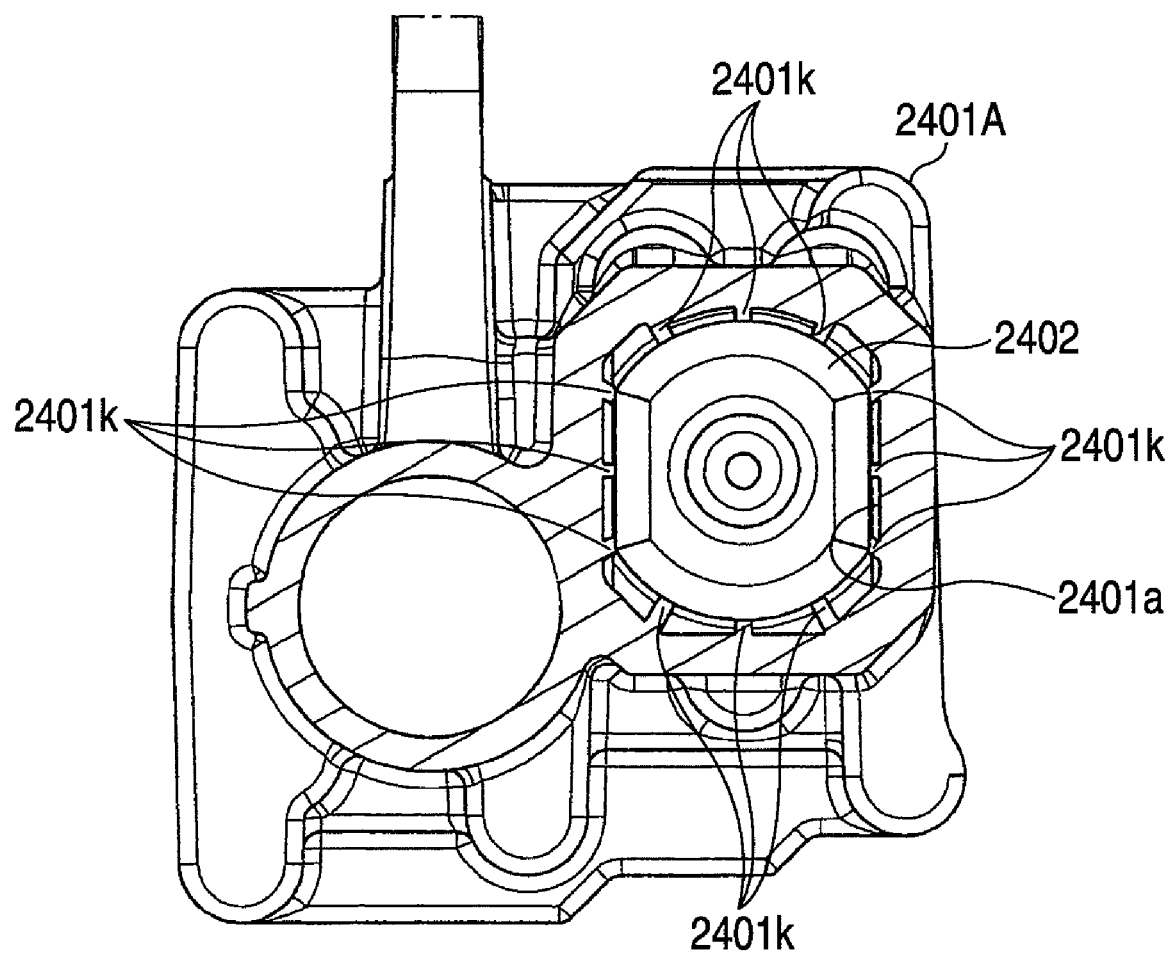
FIG. 45 is a view of the assembly shown in FIG. 44 sectioned along the line XXXXV-XXXXV and as seen in a direction indicated by arrows shown therein.

FIG. 42 is a perspective view of a housing main body of an actuator according to a 3-4$^{th}$ embodiment. FIG. 43 is a perspective view showing a state in which a motor is assembled on to a housing main body. FIG. 44 is a side view of the assembly shown in FIG. 43. FIG. 45 is a view of the assembly in FIG. 44 sectioned along the line XXXXV-XXXXV and as viewed in a direction indicated by arrows attached to the line.

In FIG. 42, in a housing main body 2401A, which can be used in the embodiment described above, ribs 2401k, functioning as raised portions, are formed on an inner circumference of a motor compartment 2401a which accommodates therein a motor 2402 (indicated by a dotted line in FIG. 42) in such a manner as to extend in an axial direction while being aligned at intervals. Aluminum is used for the housing main body 2401A from the viewpoints of weight reduction and workability, and the ribs 2401k are formed integrally with the housing main body 2401A through die casting. However, the material of the housing main body 2401A is not limited to aluminum. The other configurations of this embodiment are basically similar to those of the embodiment described above.

When the motor 2402 is assembled on to the housing main body 2401A by bolting a motor flange 2402c, the ribs 2401k are designed to be brought into contact with an exterior surface of the casing of the motor 2402 at distal ends thereof. Consequently, heat generated from the motor 2402 can be transmitted to the housing main body 2401A via the ribs 2401k, and furthermore, the heat so transmitted can be dissipated from an outer circumference of the housing main body 2401A, whereby the cooling effect can be exhibited, and even when load is exerted continuously to the motor, the increase in temperature of the motor can be suppressed, so as to avoid the malfunction of a sensor or the like. In addition, as has been described above, fins may be provided on the outer circumference of the housing main body 2401A or a cooling water jacket may be formed.

Thus, while the invention has been described heretofore by reference to the embodiments, the invention should not be construed as being limited to the embodiments described heretofore, and hence, the invention can, of course, be modified or improved variously. The actuator according to the invention can be applied not only to boats but also to vehicles and general industrial machines.

While the invention has been described in connection with the exemplary embodiments, it will be obvious to those skilled in the art that various changes and modifications may be made therein without departing from the spirit and scope of the invention, and it is aimed, therefore, to cover in the appended claims all such changes and modifications as fall within the spirit and scope of the invention.

What is claimed is:

1. An actuator for driving a driven member comprising:
a housing;
an electric motor mounted on the housing and comprising a rotational shaft;
a driving mechanism which drives the driven member by a rotational force being transmitted thereto from the rotational shaft;
a first power transmission mechanism comprising a plurality of gears for transmitting the rotational force of the rotational shaft of the electric motor to the driving mechanism;
a sensor which detects a rotational angle of a measuring shaft; and
a second power transmission mechanism comprising a plurality of gears for transmitting the rotational force of the rotational shaft to the measuring shaft of the sensor, wherein
at least one of the gears of the first power transmission mechanism and at least one of the gears of the second power transmission mechanism are supported by a single shaft extending through a center of said at least one of the gears of the first power transmission mechanism and a center of said at least one of the gears of the second power transmission mechanism, wherein
said at least one of the gears of the first power transmission mechanism and said at least one of the gears of the second power transmission mechanism are formed as separate pieces, wherein
said at least one of the gears of the first power transmission mechanism and said at least one of the gears of the second power transmission mechanism do not directly mesh each other, and wherein
the second power transmission mechanism includes a gear that is unrelated to the first power transmission mechanism.

2. The actuator as set forth in claim 1, wherein
the driving mechanism includes:
a rotational element which rotates relative to the housing;
an axially movable element which is coupled to the driven member; and
a ball screw mechanism which comprises rolling elements disposed between the rotational element and the axially movable element and which transforms a rotational motion of the rotational element into an axial motion of the axially movable element.

3. The actuator as set forth in claim 1, wherein
the second power transmission mechanism comprises a gear train of two or more gears.

4. The actuator as set forth in claim 1, wherein
the sensor is a potentiometer whose measuring shaft has a measurable range of 360 degrees or less.

5. The actuator as set forth in claim 1, wherein the housing is formed from a conductive material, and the electric motor is accommodated within the housing.

6. The actuator as set forth in claim 1, wherein
the housing is formed from a conductive material and the sensor is accommodated within the housing.

7. The actuator as set forth in claim 1, wherein
in the first power transmission mechanism, a material of one of the gears which mesh with each other is resin while a material of the other gear is metal.

8. The actuator as set forth in claim 1, wherein
the driving mechanism comprises a drive shaft which is movable relative to the housing for driving the driven member, and
a seal member disposed between the housing and the drive shaft has a double lip construction.

9. The actuator as set forth in claim 1, wherein said at least one gear of the first power mechanism is configured to be rotated relative to the said at least one gear of the second power mechanism on the single shaft.

10. An actuator for driving a driving rod comprising:
a housing;
an electric motor mounted on the housing and comprising a rotational shaft; and
a driving mechanism which drives the driving rod by the rotational force being transmitted thereto from the rotational shaft, wherein
the driving mechanism comprises:
a rotational element which rotates relative to the housing;
an axially movable element which is coupled to the driving rod; and
rolling elements which are disposed between the rotational element and the axially movable element, so as to transform a rotational motion of the rotational element into an axial motion of the axially movable element,
wherein the driving rod is slidably supported by a support member which fits in an inner circumference of the housing, and wherein
an opening is formed across an axial width and a radial width of the support member such that the support member has an incomplete annular shape.

11. The actuator as set forth in claim 10, wherein
the support member is formed by injection molding of a resin material.

12. The actuator as set forth in claim 11, wherein
the resin material is a polyacetal resin, or a material having water absorption properties that is the same as or lower than the water absorption properties of the polyacetal resin.

13. The actuator as set forth in claim 10, wherein
the support member is formed integrally by:
an outer tubular portion;
an inner tubular portion which is surrounded by the outer tubular portion; and
a central wall portion which couples the outer tubular portion and the inner tubular portion together in a central position therebetween, and
the outer tubular portion, the inner tubular portion and the central wall portion are each interrupted in part in the circumferential direction.

14. The actuator as set forth in claim 13, wherein
an interrupted amount of the outer tubular portion is smaller than an interrupted amount of the inner tubular portion or the central wall portion.

15. The actuator as set forth in claim 13, wherein
the inner tubular portion has chamfered portions at end portions on an inner circumferential side.

16. The actuator as set forth in claim 10, wherein
a projection which is brought into engagement with the recessed portion on the housing when the support member is mounted on the housing projects in the axial direction from the support member.

* * * * *